United States Patent
Bowman et al.

(10) Patent No.: US 8,032,837 B2
(45) Date of Patent: Oct. 4, 2011

(54) SYSTEM AND METHOD FOR CONTROLLING USER INTERFACE FEATURES OF A WEB APPLICATION

(75) Inventors: Gordon Bowman, Kemptville (CA); Peter Barrett, Ottawa (CA)

(73) Assignee: Corel Corporation, Ottowa (CA)

( * ) Notice: Subject to any disclaimer, the term of this patent is extended or adjusted under 35 U.S.C. 154(b) by 738 days.

(21) Appl. No.: 10/679,181

(22) Filed: Oct. 3, 2003

(65) Prior Publication Data

US 2004/0111673 A1   Jun. 10, 2004

(30) Foreign Application Priority Data

Dec. 9, 2002 (CA) .................................. 2414378

(51) Int. Cl.
*G06F 3/00* (2006.01)
*G06F 3/048* (2006.01)

(52) U.S. Cl. ......... 715/760; 715/234; 715/744; 715/765

(58) Field of Classification Search .......... 715/762–767, 715/788, 760, 744, 513, 234; 709/203, 219; 434/118; 345/333, 335, 356

See application file for complete search history.

(56) References Cited

U.S. PATENT DOCUMENTS

| | | | | |
|---|---|---|---|---|
| 5,631,844 A * | 5/1997 | Margrey et al. | ................. | 702/22 |
| 5,790,857 A * | 8/1998 | Clifford et al. | ............... | 715/700 |
| 5,822,580 A * | 10/1998 | Leung | ....................... | 707/103 R |
| 5,914,714 A | 6/1999 | Brown | ........................... | 345/339 |
| 6,014,138 A * | 1/2000 | Cain et al. | ..................... | 715/826 |
| 6,101,510 A | 8/2000 | Stone et al. | ................... | 707/513 |
| 6,188,401 B1 | 2/2001 | Peyer | ............................ | 345/335 |
| 6,266,681 B1 | 7/2001 | Guthrie | ......................... | 707/501 |
| 6,418,446 B1 | 7/2002 | Lection et al. | ............... | 707/103 |
| 6,446,256 B1 | 9/2002 | Hyman et al. | ................ | 717/143 |
| 6,484,149 B1 | 11/2002 | Jammes et al. | ................. | 705/26 |
| 6,493,733 B1 | 12/2002 | Pollack et al. | ............... | 707/513 |
| 6,981,212 B1 * | 12/2005 | Claussen et al. | ............. | 715/513 |
| 2002/0005867 A1 | 1/2002 | Gvily | ............................ | 345/760 |
| 2002/0018078 A1 | 2/2002 | Khan et al. | .................... | 345/762 |
| 2002/0023113 A1 | 2/2002 | Hsing et al. | ................... | 707/513 |
| 2002/0029296 A1 | 3/2002 | Anuff et al. | ................... | 709/311 |
| 2002/0073080 A1 | 6/2002 | Lipkin | ............................ | 707/3 |
| 2002/0083097 A1 | 6/2002 | Warrington | ................... | 707/513 |
| 2002/0109730 A1 | 8/2002 | Dardick | ........................ | 345/809 |
| 2002/0124071 A1 | 9/2002 | Proehl et al. | .................. | 709/223 |
| 2002/0129064 A1 | 9/2002 | Guthrie | ........................ | 707/513 |

(Continued)

OTHER PUBLICATIONS

Macromedia, Extending Dreamweaver, 2000, http://www.adobe.com/support/dreamweaver/extend.html.*

(Continued)

*Primary Examiner* — Nicholas Augustine
(74) *Attorney, Agent, or Firm* — Patterson & Sheridan, LLP

(57) ABSTRACT

A system and method of controlling user interface features of a web application is provided. The system comprises a collection of user interface control elements, a collection of skin templates comprising extensible markup language based markup contained as children of a container element, and a collection of control element instructions for performing actions associated with the control elements. Each control element comprises a namespace, common attributes for defining graphical features of the control element and for associating the control element with the internal state of the core control element, other attributes for defining attributes that affect the intrinsic behavior of the control, and a skin template reference attribute for referencing a skin template. Each instruction is associated with a control element.

18 Claims, 25 Drawing Sheets

U.S. PATENT DOCUMENTS

2002/0143659 A1   10/2002   Keezer et al. .................. 705/27
2002/0161805 A1   10/2002   Harris .......................... 707/530
2003/0120824 A1*  6/2003    Shattuck et al. ............. 709/313
2003/0203342 A1*  10/2003   Bowers ........................ 434/118
2004/0111673 A1*  6/2004    Bowman et al. ............. 715/513

OTHER PUBLICATIONS

"Dynamic Markup Language Whitepaper" Version 1,3, Jul. 2001, Copyright (c) 2000-2001, Rocklyte Systmes, pp. 1-16.

"Koala Bean Markup Language" Technical Notes, pp. 1-3.

* cited by examiner

The window element defines a top-level container element that can be either modal or modeless, and can be moveable or not.

In this sample, the button element and the text element are added as children of the window.

dSVG sample: ContextMenu element

Default Context Menu: (default attributes) - right-click within the circle and the Context Menu should appear.

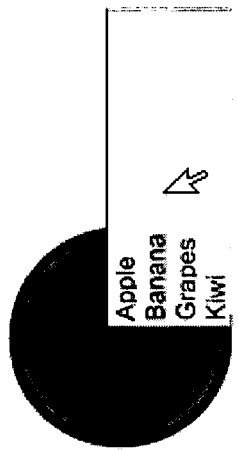

Default context menu - Right-click within the circle to display the context menu.

The list consists of items which can be added directly as child elements of the context menu.

The context menu is associated with the circle by adding a dsvg:contextMenu attribute to the circle which references the context menu.

Figure 24

SYSTEM AND METHOD FOR CONTROLLING USER INTERFACE FEATURES OF A WEB APPLICATION

FIELD OF THE INVENTION

The invention relates to web application development. In particular, the invention relates to a system and method for controlling user interface features of web applications.

BACKGROUND OF THE INVENTION

Web designers use markup languages to create and modify websites. Graphical user interfaces (GUIs), also known as user interface (UI) controls, are desirable for building web applications, as they allow the user to interact with the application in a standard, familiar way. UI controls are high-level constructs with data and function methods underlying a visual front-end. They behave in standard, expected manners-changing their states (e.g., selected, unselected, focussed, disabled, etc.), which usually have different appearances, in response to user interaction. For example, clicking on a pushbutton will cause the button to go into its down-state in response to the 'mousedown' event and back into its up-state in response to the 'mouseup' event. Another intrinsic behavior of UI controls is that they trigger the execution of predetermined actions in response to specified events, such as the user clicking on them with the mouse.

Hypertext markup language (HTML) is a commonly used markup language, or platform, with which to build web applications. HTML is limiting, with poor graphics support (only bitmaps, no vectors), its lack of absolute positioning, its small set of user interface (UI) controls and its inability to describe the appearance of those UI controls (the HTML browser decides on the appearance). Scalable vector graphics (SVG) is a language for describing two-dimensional graphics in extensible markup language (XML), which may soon become the platform of choice with which to build web applications. SVG provides an author with a rich set of vector graphics features (as well as bitmaps) and absolute control over their positioning.

SVG-based web applications create their own UI controls using SVG to describe the visual appearance and script to describe the data and function members, which provide the UI controls with the standard intrinsic behaviors discussed previously. This means, however, that non-developers cannot author the UI portion of the content, a fair amount of script for the UI controls must be transferred to the client (a significant problem for wireless devices) and the UI controls may seem to react sluggishly to user input, due to the nature of script being interpreted at run-time as opposed to native code (e.g. C or C++) being interpreted (and optimized) at compile time.

Using scripts to author the UI portion of Web content has limitations. Script requires programming ability. Many Web designers do not have the programming skills required to build UI controls via scripting. Aside from all the internal logic that a UI control requires, one must also know how to manipulate the DOM via the DOM methods so as to give the UI control a visual appearance and interactivity.

Script requires time to develop. Even for developers, creating a suite of robust, responsive UI controls requires a significant amount of script, which takes a significant amount of time to implement.

Script is difficult to auto-generate. One could attempt to assist Web designers by creating pre-canned scripts for the most commonly required functionality. However, supporting the insertion of pre-canned scripts via an integrated development environment (IDE) is both complicated and limiting. Auto-generated script cannot easily be customized afterwards, unless the IDE absolves itself of all responsibility should the designer make modifications.

Software exists that allows one to map input XML markup to output markup, automatically generating extensible stylesheet language transformation XSLT (the most commonly used XML markup language for transforming XML markup to a different form of markup). However, script is difficult to data-map.

Script relies on full DOM support. Scripts are only as powerful as the DOM methods that the viewer supports. Although it is desirable to have all viewers support the entire spectrum of DOM methods, they currently do not. Thus one must write script that only uses the API's supported by all viewers, in order to ensure that the script works on all viewers (i.e., one must program towards the lowest common denominator).

Script is complex. Creating a simple editable textBox control, for instance, could require thousands of lines of code, since SVG 1.1 does not support editable text. One has to intercept keyboard events, modify the data of existing 'text' elements, create new 'text' or 'tspan' elements for every line, support the Backspace and Delete keys, support auto-wrapping, etc. But inserting a simple 'textBox' element requires no programming and is only one line of markup.

Script is slower than native code. Scripts are interpreted, and thus provide slower performance than what would be possible with a natively-implemented markup language. Just having a script interpreter is a lot of overhead for a small device.

Script must use DOM interfaces. Scripts can only manipulate the DOM via the DOM methods, which are abstractions on top of the real object model used by the viewer. Natively-implemented markup could access the real object model directly, which may improve performance even more.

Script requires more data to transfer. Scripts greatly add to the amount of data needed to be transferred. This is a problem especially for small devices.

XUL is an XML markup language for UI controls created by the Mozilla group, specifically for use in their Mozilla HTML web browser. While XUL does offer an extensive list of UI controls, offers limited skinnability (control of appearance) and is not tied to a forms creation/processing/submission model, XUL is intended for use in HTML browsers and thus does not allow for absolute positioning nor absolute control of the appearance, cannot be easily hooked up to actions and cannot be easily used for forms. XUL is not supported in some SVG viewers.

XForms is another XML markup language which includes UI controls. XForms was designed for forms, however. XForms only supports UI controls needed for forms, does not allow for absolute control over their positioning and their appearance, cannot be easily hooked up to actions (except those that affect just its own UI controls and its "instance", or forms, data) and is very tightly tied to its forms model. XForms is not supported in some SVG viewers.

SUMMARY OF THE INVENTION

It is an object of the invention to provide a novel system and method of controlling user interface features of a web application that obviates or mitigates at least one of the problems described above.

In an aspect of the present invention, there is provided a system for controlling user interface features of a web application. The system comprises a collection of user interface control elements, a collection of skin templates comprising extensible markup language based markup contained as children of a container element, and a collection of control element instructions for performing actions associated with the control elements. Each control element comprises a namespace, common attributes for defining graphical features of the control element and for associating the control element with the internal state of the core control element, other attributes for defining attributes that affect the intrinsic behavior of the control, and a skin template reference attribute for referencing a skin template. Each instruction is associated with a control element.

In another aspect of the present invention, there is provided a system for controlling user interface features of a web application. The system comprises a collection of control element instructions for performing actions associated with the control elements, and an initialization function for directing the processing of one or more control elements in a document object model. Each instruction is associated with a control element.

In another aspect of the present invention, there is provided a method of controlling user interface features of a web application. The method comprises the steps of searching for a designated user interface control element in a document object model, and calling a script associated with the designated control element.

In another aspect of the present invention, there is provided a method of controlling user interface features of a web application. The method comprises the steps of adding a behavior element as a child of a user interface control element, receiving an event which is equal to an event attribute setting in the behavior element, and calling a script associated with the behavior element.

In another aspect of the present invention, there is provided a method of creating a customizable user interface control element having expected behaviours. The method comprises the steps of categorising user interface controls into fundamental core controls, determining variations of a core controls, determining common attributes of the core control, determining fundamental states for the core control, determining how to allow for absolute positioning of objects the core control, determining how to allow for absolute customization of appearance of the core control, assigning a reference link to the core control, determining templates for skins to allow for the absolute customization of appearance of the core control, determining how to associate behaviors to the core control, and creating a core control element.

BRIEF DESCRIPTIONS OF THE DRAWINGS

FIG. 24 shows a screen shot of an example of a contextMenu attribute, in accordance with the user interface control system.

DETAILED DESCRIPTION OF THE PREFERRED EMBODIMENT

Figure 1:
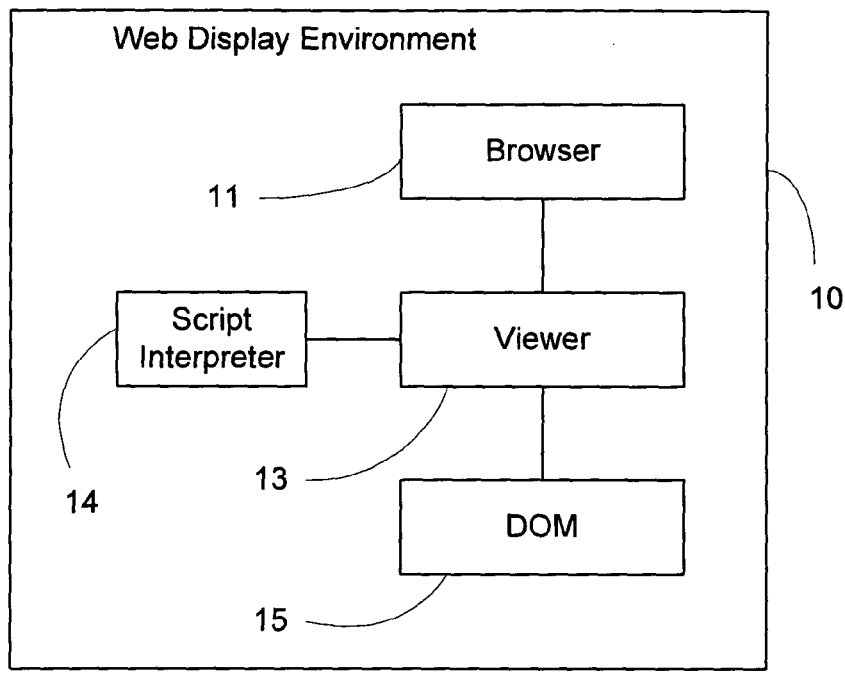
FIG. 1 shows a typical web display environment for displaying web pages and web applications.

FIG. 1 shows a typical web display environment 10 for displaying web pages and web applications. A web display environment 10 comprises a browser 11, a viewer 13, a script interpreter 14, and a document object model (DOM) 15. The browser 11 is the host application, which understands and visually renders hypertext markup language (HTML) and/or extensible hypertext markup language (XHTML). Examples of browsers include Netscape™ and Internet Explorer™. The browser 11 includes a window which is displayed on the display apparatus, such as a monitor, of an end user computer system. The browser 11 typically employs a plug-in architecture, in which third party software (known as the plug-in or viewer 13) can be associated with any file format that is not already natively supported by the browser 11 and is allowed to render that file within the host browser's 11 window. One type of file that the browser 11 may be asked to open is an SVG file having a ".svg" extension. The browser 11 does not natively support the SVG markup language (which is an XML language) and so passes the SVG file to the SVG viewer 13, which has associated itself to the SVG file format, via the rules of the plug-in architecture of the browser 11.

The viewer 13 comprises software code for parsing the SVG markup, creating a DOM, rendering that DOM to the browser's window, listening for events and dispatching them to their assigned handler script functions, and interpreting/executing those script functions. The viewer 13 uses the SVG file received from the browser 11 to create a DOM 15. The DOM is a hierarchical tree structure of objects in memory, representing the hierarchical XML markup in the XML text file. The DOM also contains methods (also known as functions or application programming interfaces (API's)) that allow it to be queried or modified. The viewer 13 may also have access to a script interpreter/engine 14, which can execute script code created by a programmer for the purpose of making the document non-static (e.g., animation) and/or interactive with the user (e.g., the user can create events with the mouse or keyboard, which cause something to happen) via manipulation of the DOM.

The following common data types are used in this specification:

<boolean>: A <boolean> is specified as either 'true' or 'false'.

<integer>: An <integer> is specified as an optional sign character ('+' or '−') followed by one or more digits "0" to "9". If the sign character is not present, the number is non-negative.

Unless stated otherwise for a particular attribute or property, the range for a <integer> encompasses (at a minimum)−2147483648 to 2147483647.

Within the SVG DOM, an <integer> is represented as an long or an SVGAnimatedInteger.

<number> (real number value): The specification of real number values is different for property values than for XML attribute values.

The Cascading Style Sheets, level 2 (CSS2) Specification-a style sheet language that allows one to attach style (e.g., fonts, spacing and aural cues) to structured documents (e.g., HTML documents and XML applications)—states that a property value which is a <number> is specified in decimal notation (i.e., a <decimal-number>), which consists of either an <integer>, or an optional sign character followed by zero or more digits followed by a dot (.) followed by one or more digits. Thus, for conformance with CSS2, any property in SVG which accepts <number> values is specified in decimal notation only.

For SVG's XML attributes, to provide as much scalability in numeric values as possible, real number values can be provided either in decimal notation or in scientific notation (i.e., a <scientific-number>), which consists of a <decimal-number> immediately followed by the letter "e" or "E" immediately followed by an <integer>.

Unless stated otherwise for a particular attribute or property, a <number> has the capacity for at least a single-precision floating point number (ICC32) and has a range (at a minimum) of −3.4e+38F to +3.4e+38F.

It is recommended that higher precision floating point storage and computation be performed on operations such as coordinate system transformations to provide the best possible precision and to prevent round-off errors.

Conforming High-Quality SVG Viewers are required to use at least double-precision floating point (ICC32) for intermediate calculations on certain numerical operations.

Within the SVG DOM, a <number> is represented as a float or an SVGAnimatedNumber.

<length>: A length is a distance measurement. The format of a <length> is a <number> optionally followed immediately by a unit identifier. (Note that the specification of a <number> is different for property values than for XML attribute values.)

If the <length> is expressed as a value without a unit identifier (e.g., 48), then the <length> represents a distance in the current user coordinate system.

If one of the unit identifiers is provided (e.g., 12 mm), then the <length> is processed according to the description in Units.

Percentage values (e.g., 10%) depend on the particular property or attribute to which the percentage value has been assigned. Two common cases are: (a) when a percentage value represents a percent of the viewport (refer to the section that discusses Units in general), and (b) when a percentage value represents a percent of the bounding box on a given object (refer to the section that describes Object bounding box units).

Within the SVG DOM, a <length> is represented as an SVGLength or an SVGAnimatedLength.

<coordinate>: A <coordinate> represents a <length> in the user coordinate system that is the given distance from the origin of the user coordinate system along the relevant axis (the x-axis for X coordinates, the y-axis for Y coordinates).

Within the SVG DOM, a <coordinate> is represented as an SVGLength or an SVGAnimatedLength since both values have the same syntax.

<uri> (Uniform Resource Identifiers [URI] references): A URI is the address of a resource on the Web. For the specification of URI references in SVG, see URI references.

Within the SVG DOM, <uri> is represented as a DOMString or an SVGAnimatedString.

UI controls comprise a persistent object in memory, which gets instantiated when the UI control element is processed, as well as the visible SVG elements defined via a skin/template, which can exist within a 'def' block in the SVG file or in a separate file. The skins follow specific formats. The appearance for every state is described in SVG markup within a group 'g' container with an 'id' attribute equal to 'up', 'down', 'hover', 'focus' or 'disabled'. Within each of these containers, the individual components of that UI control are defined via predefined ID's. For instance, a slider control uses components specified with the ID's "label", "body", "skinSliderBar", "skinSliderThumb", "tickMajor", "tickMinor", "tickLabelMajor", "tickLabelMinor" and "mask". The markup within these containers, however, is completely customizable. The intrinsic behaviors of UI controls make no a priori assumptions regarding the nature of the appearance, except insofar as the obvious, such the element with id="label" must be either a 'text' or 'tspan' element. When the UI control is instantiated, the skin is retrieved and used, along with the attributes of the UI control element, to create the visible SVG objects in the DOM that make up the appearance. For instance, the slider skin's "tickMajor" markup will be cloned as many times as required, based on the 'slider' element's 'tickMajor' attribute, and positioned appropriately.

Because there are no assumptions made regarding the SVG markup comprising a UI control's skin, the skins contain 'constraint' elements, to be resized "intelligently". When a UI control element's 'width' and/or 'height' attribute is set, the desired dimensions of the UI control are compared to the existing dimensions of its bounding box and, if different, a transform is applied to the visible markup. With no constraints defined in the skin, this could cause unwanted side effects, such as the label also being stretched, or the stroke-widths appearing to be thicker or thinner. Constraints can be defined in the skin to counteract these effects due to scaling.

Figure 2:
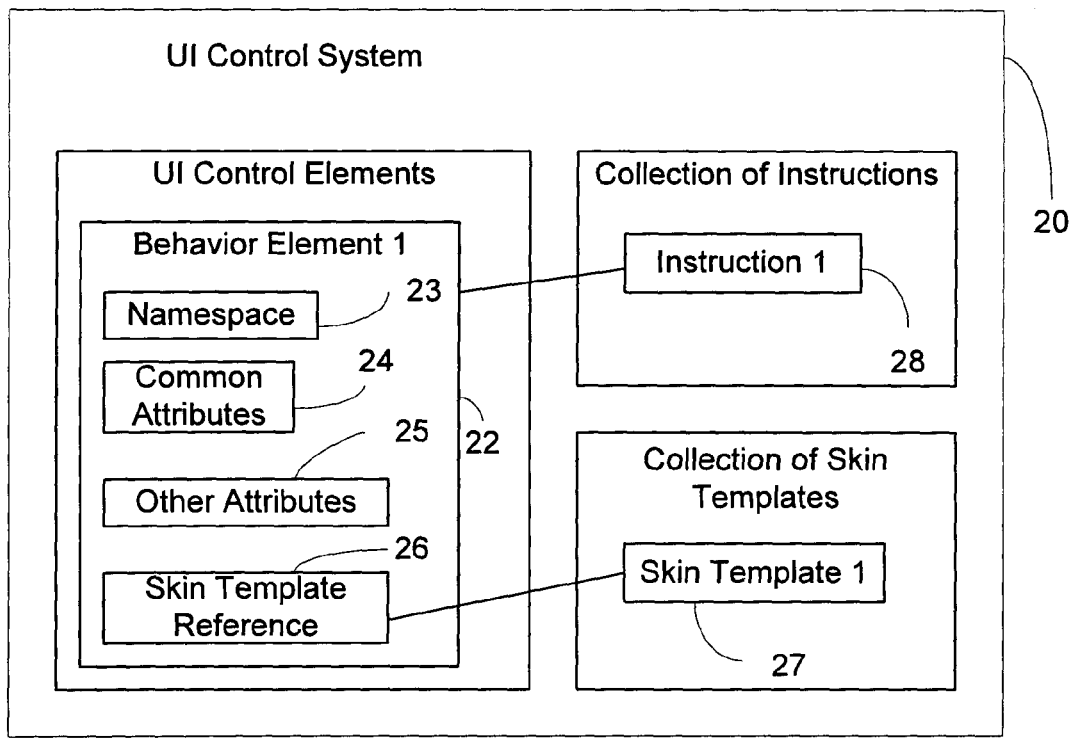
FIG. 2 shows a user interface control system, in accordance with an embodiment of the present invention.

FIG. 2 shows a system for controlling user interface features of a web application 20 in accordance with an embodiment of the present invention. The user interface (UI) control system 20 comprises a collection (or set) of UI control elements 22, a collection of UI control skin templates 27, and a collection of UI control instructions 28. Each UI control element 22 comprises a namespace 23, common attributes 24, other attributes 25, and a skin template reference attribute 26. The namespace 23 is what the UI control element 22 is called (e.g., button, combobox, slider, etc.). As these UI control elements 22 are not currently part of the scalable vector graphics (SVG) specification, their name 23 may be prefixed with a namespace (e.g., "dsvg:") so that the viewer's extensible markup language (XML) parser allows it to be part of the DOM. The common attributes 24 are the attributes that are common to every UI control element 22, which define the graphical features of the UI control elements 22 (e.g., width="100"), define the UI control's label or associated text (e.g., label="OK") and position, define the initial state of the UI control element 22 (e.g., disabled="true") and override the default appearance of specific states (described in the associated skin) with new appearances described elsewhere (e.g., down="#skinAlternateDown"). The other attributes 25 define the attributes that are specific to each particular UI control element 22, which affect the intrinsic behavior of the UI control (e.g., toggle="true" causes a button control to become a "sticky" button, staying down or up after each click). An example of an event occurs when a user clicks on a UI control element displayed in a window of a browser. The skin template reference attribute 26 provides a reference to the location of the UI control skin template 27 which the UI control element 22 may access.

The UI control skin templates 27 are associated with the UI control elements 22. Preferably, there is a one-to-one relationship between UI control elements 22 and UI control skin templates 27. A UI control skin template 27 is designed to allow for absolute customization of appearance of the UI control. The skin template 27 is referenced via an 'xlink:href' attribute (or skin template reference attribute) 26 which is a common attribute of the UI control elements 22. The skin template 27 comprises SVG markup (which can reference bitmap images) contained as children of a 'g' element (a group/container element), where there is one group per state (e.g. 'up', 'down', 'disabled', etc.). The skin templates 27 may be stored as files referenced by the UI control elements 22. Designers may modify or replace a skin templates 27 as desired.

Each UI control's instructions 28 (associated data and function members), which define the control's intrinsic behaviors, may be supplied via script or as native code in the viewer 13, which is indirectly associated to the UI control element 22. For example, instructions (or scripts) 28 may include toggling a button's state between 'up' and 'down' when clicked upon with the mouse, or translating (panning) the contents of the document within the display window when the thumb of a scrollbar is dragged with the mouse. A UI control element 22 may be handled at parse time (i.e., when the DOM is first created), or after parse time. At parse time, an event may trigger a call to the instructions 28 associated to the UI control element 22, so as to instantiate it immediately. Alternatively, UI control elements 22 may be handled via native code during parse time.

After parse time, an initialization function may be run to find each UI control element 22 and run its associated instructions 28 (script or another supported programming language) that creates that particular element-both the visual front-end (as SVG elements in a document object model (DOM)) and the back-end (an object in memory, with data and function members). The initialization function may contain instructions for traversing each node in the DOM and for searching and calling functions associated with UI control elements 22 having names following a predetermined naming convention.

An alternative UI control system comprises an initialization file, the skin templates 27 and the scripts 28 of the UI control system 20. The collection of UI control elements are provided independently from the alternative UI control system as markup syntax for a designer (or developer, or any user) to use when modifying an XML file, such as an SVG document.

The following is an example of a UI control element 22:
<dsvg:button
id="myRectangularRadioButton"
xlink:href="dsvg/skinButton_Default.svg#skinButton"
label="Click me!"
width="50"
height="40"
x="10"
y="20"
toggle="true"
group="myRadioButtons"
checked="true"
labelX="0"
labelY="−3"
/>

The 'button' element defines a UI control that can be clicked to trigger an action. The 'button' element may be a push button, a checkbox (i.e., a sticky/toggle button) or a radiobutton, depending on the attributes of the element.

The 'button' element contains the namespace 23:

dsvg:button which follows the naming convention of adding "dsvg:" as a prefix (associated to a particular namespace earlier in the file) to the element name, so that the viewer's XML parser will allow these non-standard elements in the DOM. As will be described below, this naming convention can also assist the system 20 to search for UI control elements 22, i.e., all UI control elements 22 having this prefix in their namespace 23. The 'button' element also contains common attributes 24 (or standard attributes) such as 'id', 'label', 'x', 'y', 'width', 'height, etc. The 'button' element also contains the skin template reference attribute 'xlink:href' which is also common to UI control elements 22. The attributes common to all UI control elements 22 will be described below.

The 'toggle' attribute specifies whether the button is a toggle/sticky button or not, i.e. whether the button toggles between 'up' and 'down' states when clicked on or instead switches to the 'down' state when the mouse button is pressed and then back to the 'up' state when the mouse button is released. A checkbox has toggle="true". If the 'toggle' attribute is not specified, then preferably, the default is 'false'. The 'group' attribute is the name of the group to which the button belongs. If the 'group' attribute is provided, and toggle="true", then this results in the functionality of a radiobutton, where selecting any of the radiobuttons belonging to that group results in the other radiobuttons in that group becoming unselected. The 'checked' attribute specifies whether the button is down/checked/selected (true) or up/unchecked/unselected (false). Preferably, the default is set to "false". The 'labelX' attribute specifies the x-coordinate of the label relative to the 'y' attribute. If the 'labelX' attribute is not provided, the label's position is determined by the skin 27. The 'labelY' attribute specifies the y-coordinate of the bottom edge of the label, relative to the 'x' attribute. If the 'labelY' attribute is not provided, the label's position is determined by the skin 27.

Other example of UI control elements 22 will be described below.

The following is the syntax for the 'button' skin template 27 corresponding with the above example:

```
<?xml version="1.0"?>
<svg>
  <g id="skinButton">
    <g id="label">
      <text x=" " y=" " style=" "> </text>
    </g>
    <g id="up" display="all">
    </g>
    <g id="down" display="none">
    </g>
    <g id="hit" display="none">
    </g>
    <g id="hover" display="none">
    </g>
    <g id="focusUP" display="none">
    </g>
    <g id="focusDown" display="none">
    </g>
    <g id="disabledUp" display="none">
    </g>
    <g id="disabledDown" display="none">
    </g>
  </g>
</svg>
```

As can be seen in the skin template shown above, a separate group is defined for each possible state of the UI control, where the specific state is identified via the 'id' attribute. The 'display' attributes are not actually required, as the button's associated script sets them itself, but by making the 'up' group visible and the other invisible, it allows the 'up' state to be easily viewed separately in a viewer, so that the designer can easily get a feel for what the button looks like.

The following is the syntax of an example of a 'button' skin, in accordance with the above example:

```
<?xml version="1.0"?>
<svg>
  <g id="skinButton">
    <g id="label">
      <text x="50" y="13" style="font-family:'Tahoma'; stroke:none;font-size:12;text-anchor:middle">
      </text>
    </g>
    id="up" display="all">
      <rect x="0" y="0" width="100" height="18" style="fill:rgb(230,230,230);stroke:none"/>
      <polyline points="0,18 0,0 100,0" style="stroke-width:1;stroke:white;fill:none"/>
      <polyline points="0,18 100,18 100,0" style="stroke-width:1;stroke:black;fill:none"/>
    </g>
    <g id="down" display="none">
      <rect x="0" y="0" width="100" height="18" style="fill:rgb(230,230,230);stroke:none"/>
      <polyline points="0,18 0,0 100,0" style="stroke-width:1;stroke:black;fill:none"/>
      <polyline points="0,18 100,18 100,0" style="stroke-width:1;stroke:white;fill:none"/>
    </g>
    id="hover" display="none">
      <rect x="0" y="0" width="100" height="18" style="fill:rgb(230,230,230);stroke:none"/>
      <polyline points="0,18 0,0 100,0" style="stroke-width:2;stroke:white;fill:none"/>
      <polyline points="0,18 100,18 100,0" style="stroke-width:2;stroke:black;fill:none"/>
      <rect x="1" y="1" width="98" height="16" style="fill:none;stroke:#199DBF"/>
    </g>
    <g id="disabled" style="opacity:0.5" display="none">
      <rect x="0" y="0" width="100" height="18" style="fill:rgb(230,230,230);stroke:none"/>
      <polyline points="0,18 0,0 100,0" style="stroke-width:1;stroke:white;fill:none"/>
      <polyline points="0,18 100,18 100,0" style="stroke-width:1;stroke:black;fill:none"/>
    </g>
  </g>
</svg>
```

As can be seen in the sample skin file above, the label uses the Tahoma font, with a size of 12, and its middle appears 50 units to the right and 13 units below the top-left corner of the button, as defined by its 'x' and 'y' attributes. Its states are drawn using light-gray rectangles and black and white polylines, and the 'hover' state (which appears when the mouse cursor is overtop of the button) includes an extra light-gray rectangle with a blue outline/stroke.

Other examples of UI control elements 22 will be described below.

The following is an example of SVG markup used in association with an embodiment of the UI control system 20.

```
<?xml version="1.0"?>
<!DOCTYPE svg PUBLIC "-//W3C//DTD SVG 20000303 Stylable//EN" "http://www.w3.org/TR/2000/03/WD-SVG-20000303/DTD/svg-20000303-st ylable.dtd">
<svg xmlns:dsvg="http://corel.org/dsvg" onload="dsvgInit (evt)" width="256" height="256">
  <script type="text/ecmascript" xlink:href="dsvg/dSVG.js"/>
  <script type="text/ecmascript" xlink:href="dsvg/BaseUI.js"/>
  <script type="text/ecmascript" xlink:href="dsvg/button.js"/>
  <script type="text/ecmascript" xlink:href="dsvg/constraint.js"/>
  <!-- Create a grey background. -->
  <rect x="0" y="0" width="512" height="512" style="fill: rgb(230,230,230)"/>
  <!-- Create various types of buttons, with no associated behaviours. -->
  <dsvg:button id="myPushButton" label="Click me!" x="50.5" y="10.5" xlink:href="dsvg/skinButton_Windows.svg#skinButton"/>
  <dsvg:button id="myCheckbox" label="Check me!" x="50.5" y="50.5" toggle="true" xlink:href="dsvg/skinCheckbox_Default.svg#skinCheckbox"/>
  <dsvg:button id="myRadioButton1" selected="true" label="Check me!" x="50.5" y="100.5" toggle="true"
``` group="myGroup" checked="true" xlink:href="dsvg/skinRadioButton_Default.svg#skinRadioButton"/>
    <dsvg:button id="myRadioButton2" label="No, me!" x="50.5" y="125.5" toggle="true" group="myGroup" xlink:href="dsvg/skinRadioButton_Default.svg#skinRadioButton"/>
    <dsvg:button id="myBigPushButton" label="Look how big I am!" x="50.5" y="150.5" width="150" height="100" xlink:href="dsvg/skinButton_Windows.svg#skinButton"/>
</svg>

Figure 3:
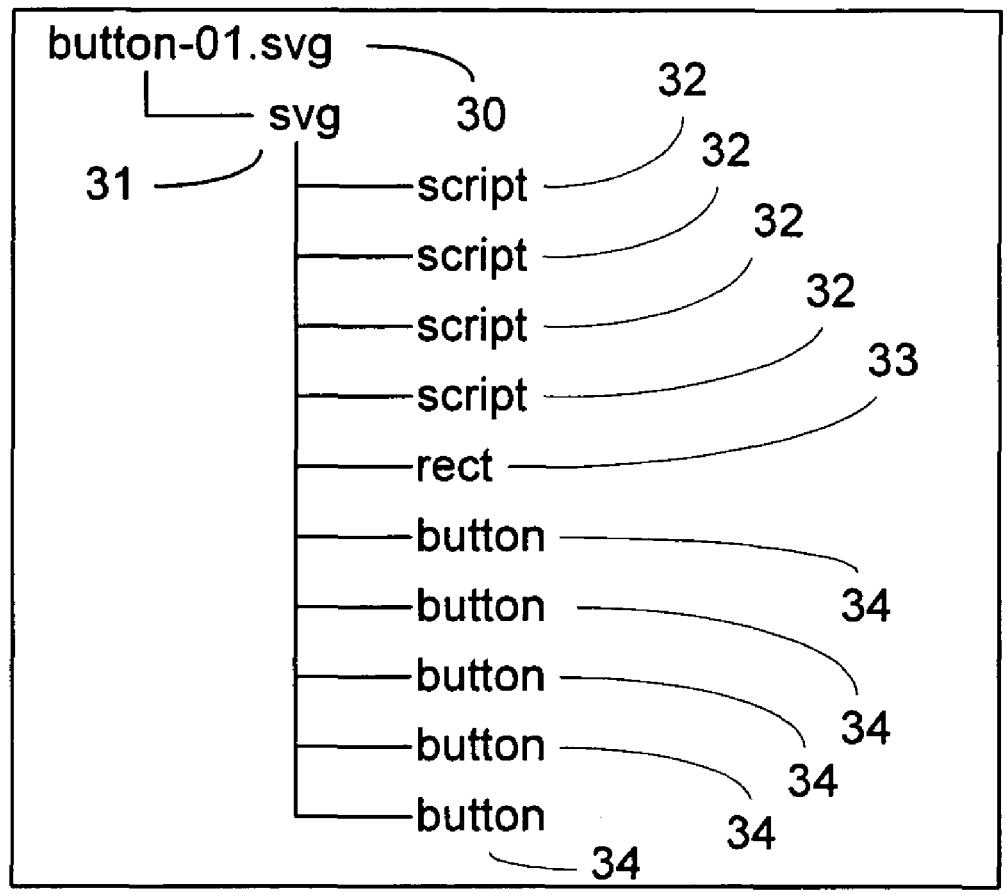
FIG. 3 is a node representation of a document object model of an example of a file used in the user interface control system, in accordance with the user interface control system.

FIG. 3 is a node representation of the DOM of the above button-01.svg 30. The DOM contains a node for the root 'svg' element 31. The DOM representation also contains script nodes 32 and a rect (rectangle) node 33 and UI control element nodes 34 for buttons (button). The <dsvg:button> UI control element 34 contains the prefix "dsvg:" in the name 23.

Figure 4A:
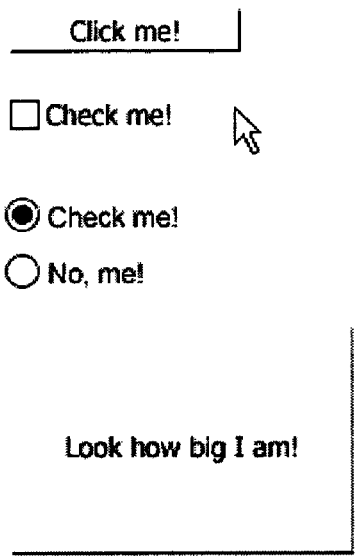
FIGS. 4A to 4D are screen shots of an example of the display of a user interaction with an example of a file used in the user interface control system, in accordance with the user interface control system.
Figure 4B:
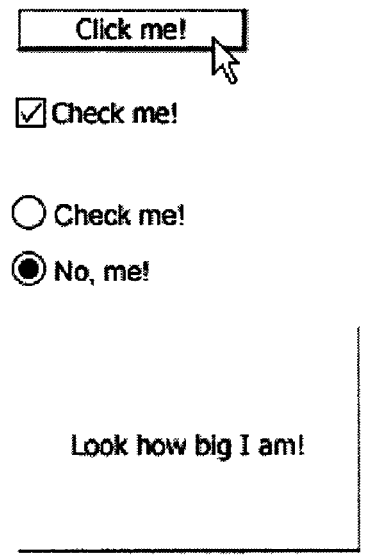
Figure 4C:
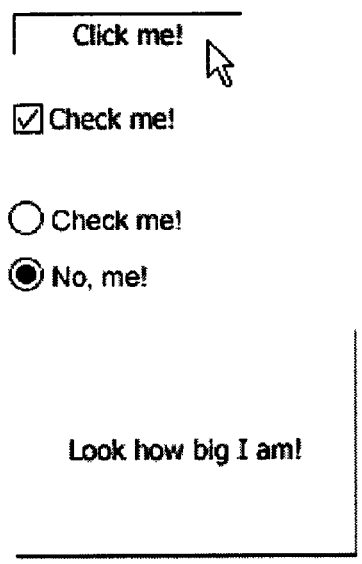
Figure 4D:
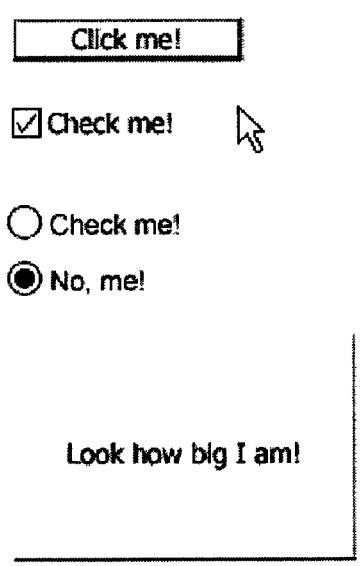

FIGS. 4A to 4D are screen shots of the file button-01.svg. FIG. 4A is a screen shot of the file button-01.svg in its initial state, with the mouse cursor not over any buttons. FIG. 4B is a screen shot of the display after the user has clicked on the checkbox, clicked on the bottom radiobutton, and is now hovering over the top push-button. FIG. 4C is a screen shot of the display when the user is pressing the mouse button down on the top button. FIG. 4D is a screen shot of the display when the user has let go of the mouse button and moved it away from the UI controls, leaving the top button in its 'focus' state (since it is the last-used UI control). Since the skin template used by the top button does not have an appearance defined for the 'focus' state, the 'hover' state's appearance is used instead.

Figure 5:
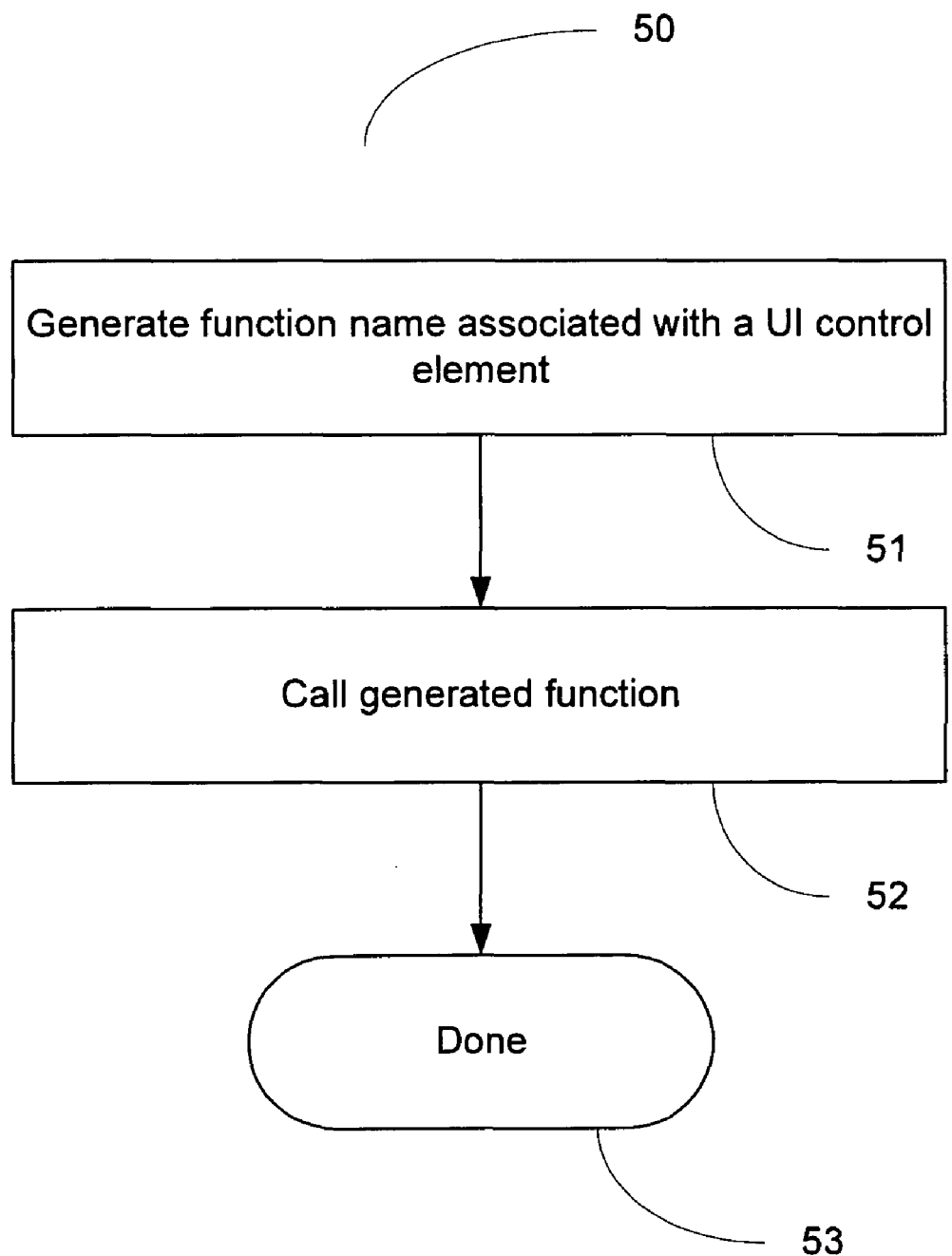
FIG. 5 is a flowchart of an example of a method of creating a user interface control of a web application, in accordance with an embodiment the user interface control system.

FIG. 5 shows an example of a method of creating UI control of a web application at parse time (50), in accordance with the UI control system 20. The method (50) begins with generating a function name associated with a UI control element (51). Next, the function is called (52). The method is done (53).

Figure 6:
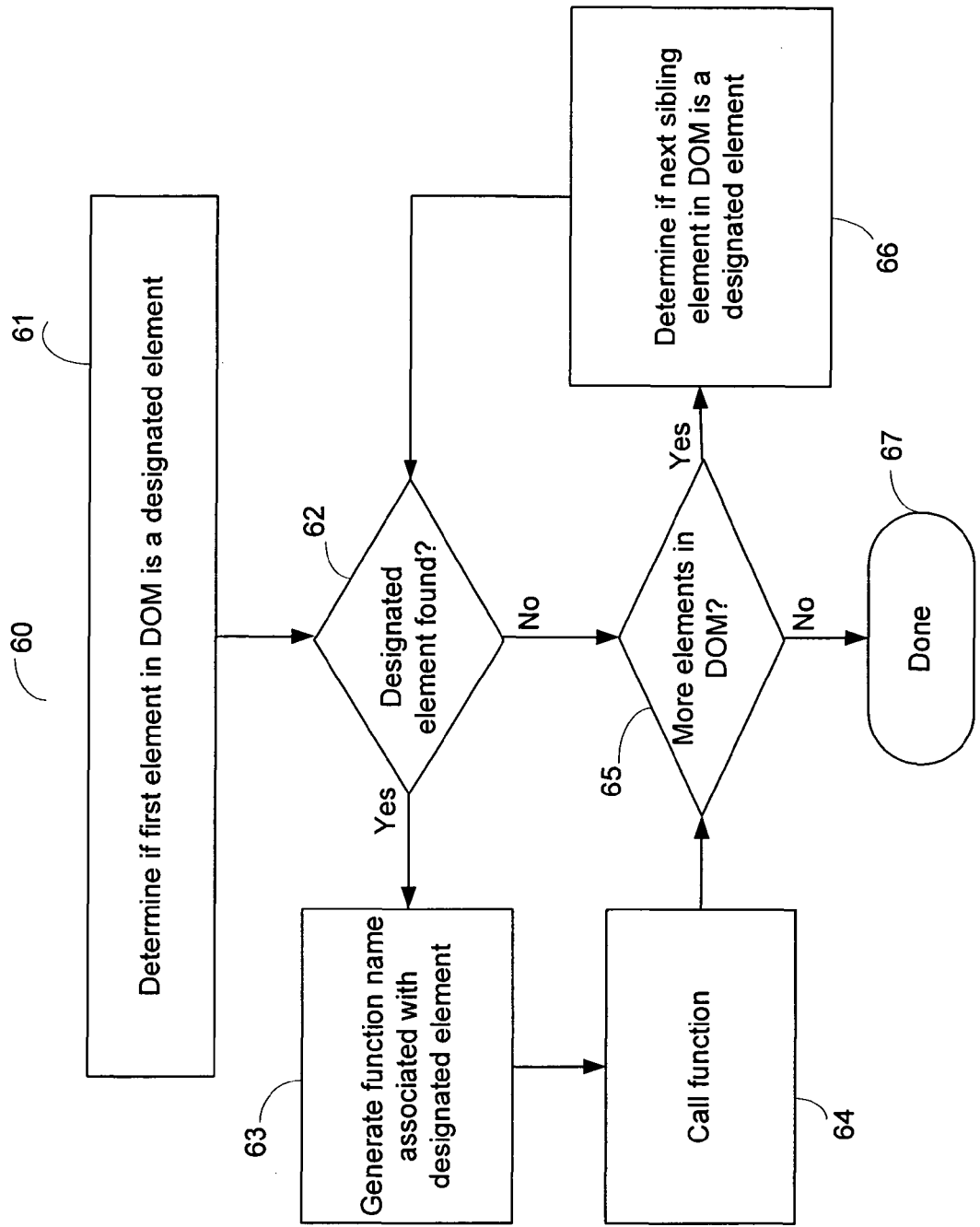
FIG. 6 is a flowchart of an example of a method of creating user interface controls of a web application at load time, in accordance with the user interface control system.

FIG. 6 shows another example of a method of creating UI controls of a web application at load time (60), in accordance with the UI control system 20. An initialization function is executed/run by a viewer script interpreter 14, in response to an "onload" event that the viewer generates when it loads an initial file. This can be achieved by adding an onload="dsvgInit( )" attribute to the root 'svg' element. The method (60) begins with the initialization function searching the DOM (beneath the root 'svg' element) for a designated UI control element (61). A designated UI control element is a UI control element with a predetermined prefix (which is associated to a particular namespace using the 'xmlns' attribute of the root 'svg' element) to the name of the name of the UI control element in the DOM. Whether or not the first DOM element is a designated UI control element is determined (61). If the first element is a designated UI control element (62) (e.g., dsvg:button), then a function name associated with the designated UI control element is generated (63) and the function is called (64). If a designated UI control element is not found (62), or after a generated function is called (64), the method determines if there are more elements in the DOM to search (65). If there are more elements in the DOM (65), the initialization function determines if the next sibling element is a designated element (66). Steps (62) to (66) are repeated until all elements in the DOM are searched. Once there are no more elements in the DOM to search (65), then the method is done (67).

The method described in FIG. 6 will be described using the examples of FIGS. 2, 3, and 4A to 4D. The viewer's script interpreter will execute the dsvgInit( ) function at load time (i.e., after the DOM has been built and the scripts retrieved and loaded into memory), which will traverse each node in the DOM (66), searching for elements whose names 23 begin with the "dsvg:" prefix (i.e., searching for designated UI control elements 22). The <dsvg:button> node is found. Using a priori knowledge of the naming conventions for elements and functions, the string "dsvgButton(element, evt)" is created, turned into a function and called. This function finds all of the attributes of the 'dsvg:button' element, whose corresponding DOM object was passed in as the parameter 'element', and retrieves their values using the getAttribute( ) DOM API. It then creates a new instance of the button class-creating an object in memory, which contains data and function methods that provide the instructions for how to build its visual front-end and how to behave in response to events generated by the user. Using the value of the 'xlink:href' attribute 26, it retrieves the skin template 27 (which may be in a separate file) and uses it to create the visual front-end of the button by creating the SVG elements in the DOM, in accordance with the skin template 27, and modifying them using some of the other attributes 24, such as 'x', 'y', 'width', 'height', 'label', etc. Other attributes, such as 'toggle' are used to set up how the button will behave and react to user input, which requires that appropriate event listeners be placed (using the addEventListener( ) DOM API) on each group containing the visual appearance of each state, so that the user can interact with the button. Once the dsvgButton( ) function has completed its instructions, the initialization function then looks for more designated UI control elements 22. It finds four more designated UI control elements 22 and handles them in the same manner as it handled the first. After that, the initialization function does not find any more designated UI control elements 22, and so its job is finished.

When the user positions the mouse pointer over any of the buttons (FIGS. 4A to 4B), the viewer creates an "onmouseover" event, which the event listener hears and dispatches to the button class's appropriate handler function. If the button was in an 'up' state, this function sets the button's state to be the 'hover' state, causing the visual appearance to change to the appearance associated with the 'hover' state. Since only the 'g' element containing the associated appearance for the 'up' state has an 'onmouseover' event listener, only the 'up' state will respond to that event by putting the button in the 'hover' state. If the button is in the 'hover' state and the user moves the mouse pointer away from the button, the "onmouseout" event is generated and passed to its handler function, which changes the button's state back to whatever it was before it was changed to the 'hover' state.

When the user clicks the mouse pointer down over any of the buttons (FIGS. 4A to 4B), the viewer creates an "onmousedown" event, which the event listener hears (if the button is not in a 'disabledUp' or 'disabledDown' state, as the appearances associated with these states have no "onmousedown" event listeners) and dispatches to the button class's appropriate handler function. If the button is a toggle-button (i.e., if its 'toggle' attribute equals 'true'), then the "onmousedown" handler function sets the button's state to be 'down' if it was in the 'up' state (previous to the 'hover' state) or sets it to be 'up' if it was in the 'down' state (previous to the 'hover' state), which causes the visual appearance to change appropriately. If the button is a radio-button (it's a toggle-button but also has a 'group' attribute defined), then the "onmousedown" handler function will be called, if the button was in the 'up' state, causing the button to switch to the 'down' state, causing its visual appearance to change appropriately and also causing whichever button belonging to the same radiogroup that was previously in the 'down' state to switch to the 'up' state.

If the button is a push-button (i.e., its 'toggle' attribute equals 'false'), then the "onmousedown" handler function sets the button's state to be 'down' if it was in the 'up' state (previous to the 'hover' state). When the user lets go of the mouse button, the viewer generates the "onmouseup" event, whose handler function sets the button back to the 'up' state.

If a toggle-button's state changes from 'up' to 'down' or from 'down' to 'up', or a push-button's state changes from 'up' to 'down' and then 'up' again, then the processActions( ) handler function is called, which searches all the children of the 'button' element, looking for any elements that begin with the "dsvg:" prefix. It does not find any, and so its job is done.

In the example described above, the function was dynamically generated, i.e., a string was created, having the same prefix as the designated element (without the colon) and the same name as the designated element (except with the first letter capitalized) and with the designated element's object and the trigger event object passed in as two parameters. The skin template 27 and the script 28 or set of instructions for the operations of the generated function is stored in a predetermined format either in the document text file or in a separate text file on a file system or webserver, and is loaded into memory by the viewer at load time. Alternatively, the initialization function may search for elements that begin with the "dsvg:" prefix and, using an 'if or 'switch' statement, determine the appropriate predetermined function to call, which again are expected to have been already loaded in memory by the viewer.

It is advantageous, though, for the function names to be generated dynamically, so that the main script file containing the initialization function does not need to be updated whenever a new type of UI control element 22 has been created and is available for use. As well, while the functions 28 that handle each type of UI control element 22 could be stored all in one file, it is advantageous to store them in separate files and reference them in the document only if their corresponding UI control element 22 is being used, so that only the code that is required is actually transmitted.

In order for UI control elements 22 to execute desired actions, behavior elements may be inserted as children of the UI control elements 22 (the observer elements). The behavior element will be executed sequentially for each behavior element whose 'event' attribute's value matches the observer element's event (e.g., onmouseover, onclick, etc.). If the 'event' attribute is not provided, 'onclick' will be assumed. In the example below, clicking on the 'Red' button will colour the circle red, while clicking on the 'Blue' button will colour the circle blue.

```
<button id="buttonRed" x="10" y="10" label="Red"
    xlink:href="#skinButton">
    <setAttribute elementID="myCircle" name="fill"
        value="red"/>
</button>
<button id="buttonBlue" x="10" y="40" label="Red"
    xlink:href="#skinButton">
    <setAttribute elementID="myCircle" name="fill"
        value="red"/>
</button>
<circle id="myCircle" x="100" y="10" r="5"
    fill="green"/>
```

Alternatively, the behavior elements can (optionally) be grouped as children of an <action> element, which can be hooked up to the observer element using a <listener> element. For example:

```
<button id="buttonRed" x="10" y="10" label="Red"
    xlink:href="#skinButton"/>
<button id="buttonBlue" x="10" y="40" label="Red"
    xlink:href="#skinButton"/>
<circle id="myCircle" x="100" y="10" r="5"
    fill="green"/>
<action id="setRed">
    <setAttribute elementID="myCircle" name="fill"
        value="red"/>
</action>
<action id="setRed"
    <setAttribute id="setBlue" elementID="myCircle"
        name="fill" value="blue"/>
</action>
<listener event="onclick"
    observerElementID="buttonRed"
    handlerID="setRed"/>
<listener event="onclick"
    observerElementID="buttonBlue"
    handlerID="setBlue"/>
```

Figure 7:
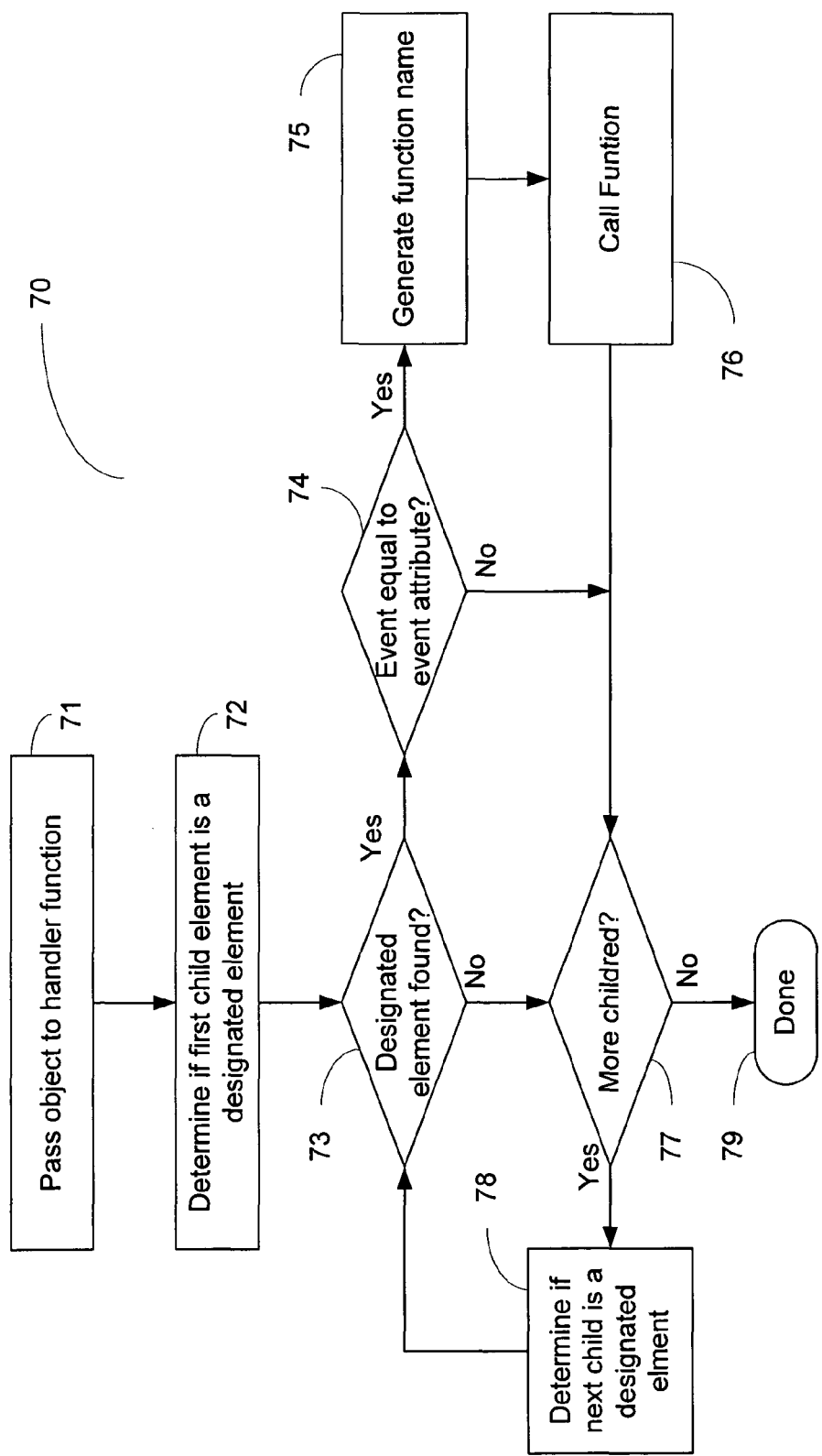
FIG. 7 is a flowchart of a method of creating user interface controls of a web application in response to an event, in accordance with the user interface control system.

FIG. 7 shows an example of a method of creating UI controls for a web application in response to an event (70), in accordance with the UI control system 20. The UI control system 20 is built on top of an event-driven architecture, such as SVG, and XML. Once an event occurs on an SVG element (i.e., the observer element), the method (70) begins with passing the event object to a handler function (71). The handler function determines if the first child element of the SVG element associated with the object is a designated element (72). If a designated element is found (73), then the handler function determines if the event attribute 24 of the designated element is equal to the event that has occurred (74). If the event attribute 24 of the designated element is equal to the event which triggered this method (70), then the name of the function associated with the designated element is automatically generated (75) (in accordance with a predetermined function naming convention) and called (76). Preferably, the predetermined function naming convention is similar to the predetermined element naming convention. If a designated element is not found (73), or if the event attribute 24 of the designated element does not match the trigger event (74), or after a generated function is called (76), the event handler determines if there are more child elements of the observer element to search (77). If there are more child elements of the observer element (77), the event handler determines if the next child is a designated element (78). Steps (73) to (78) are repeated until all child elements of the observer element are searched. Once there are no more child elements to search (77), then the handler function is done (79).

An initialization file may also search for attributes in elements that are not UI control elements 22. Scripts 28 may be created and associated with the 'dsvg' attribute in the same manner as with UI control elements. Script functions 28 for 'dsvg' attributes only operate on the object associated with the existing element to which a 'dsvg' attribute is added. A designer may add the 'dsvg' attribute in an SVG file, or any other XML file to be parsed by the viewer 13.

Figure 8:
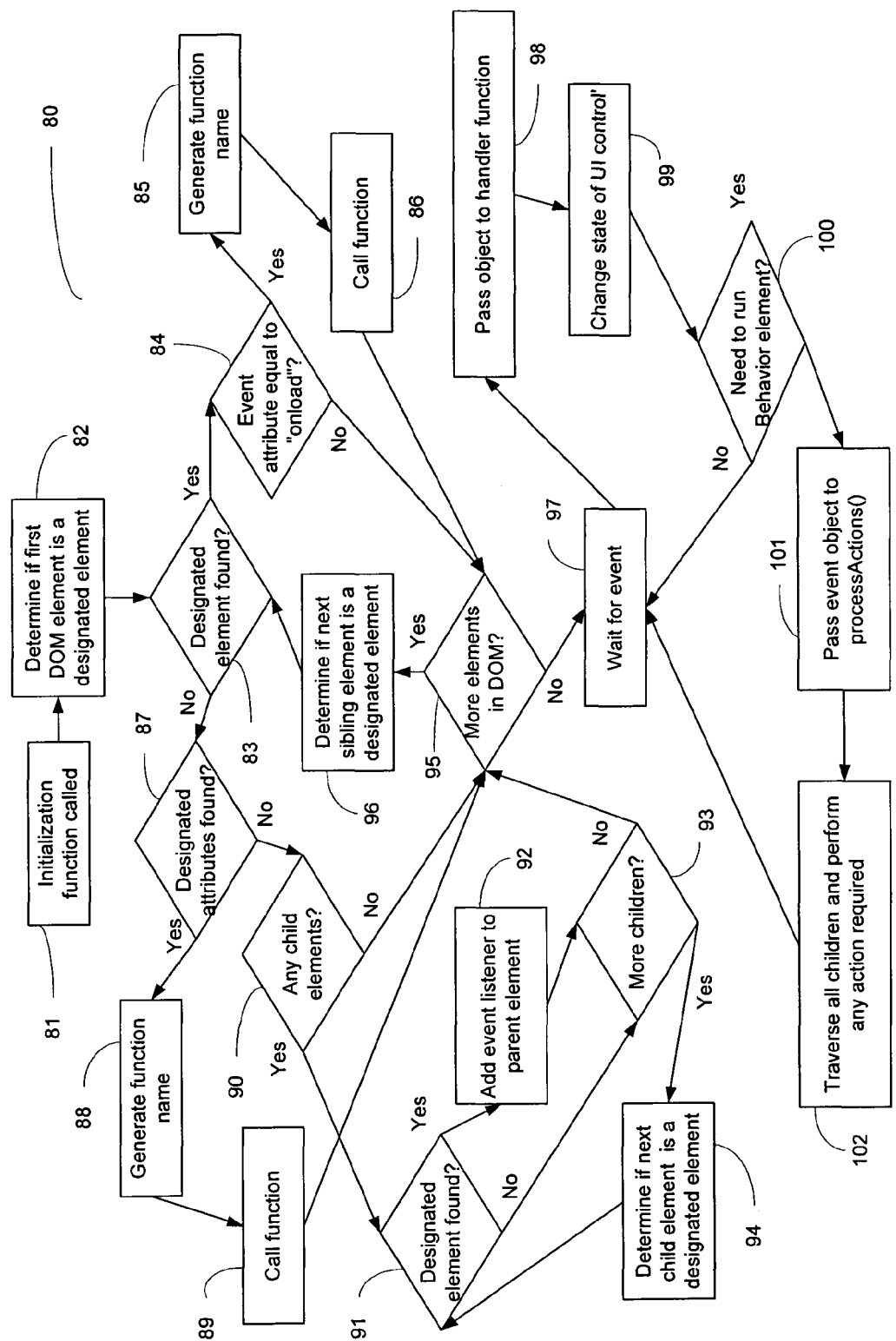
FIG. 8 shows another example of an method of controlling user interface features of a web application, in accordance with the user interface control system.

FIG. 8 shows another example of a method of controlling UI features of a web application (80), in accordance with the UI control system 20. After a user (or designer) marks up an SVG file using the markup syntax of the UI control system and the SVG file is loaded into a viewer 13, the viewer 13 creates an "onload" event which is received by an <svg> element. The method (80) begins with an initialization function. A dsvgInit( ) initialization function is called (81) by the viewer's script interpreter, which traverses the nodes of the DOM of the SVG file. The initialization function determines if the first DOM element is a designated element (82). If a designated element is found (83) and the 'event' attribute of the designated element is set to "onload" (84), then the name of the function associated with the designated element is automatically generated (85) (in accordance with a predetermined function naming convention) and called (86). Preferably, the predetermined function naming convention is similar to the predetermined element naming convention. If a designated element is not found (83), the initialization function determines if the regular SVG element contains any designated attributes (87) (which begin with the "dsvg:" prefix). If any designated attributes are found (87) (e.g., dsvg:toolTip="#skinTooltip_traditional"), then the names of the functions associated with the designated attributes are automatically generated (88) (again, in accordance with a predetermined function naming convention) and called (89).

If a designated attribute is not found (87), then the initialization file determines if the regular SVG element has any child elements (90). If the regular SVG element has a child element (90) and the child element is a designated element 22 (91), then the initialization file determines the value of the designated element's 'event' attribute (i.e., the event that will trigger the execution of the designated element's associated function) and adds that event listener to the parent SVG element (92) (via the addEventListener( ) DOM API). If the child element is not a designated element 22 (91), then the initialization file determines if there are any other children of the regular SVG element (93). If there are more children (93), then the initialization file searches the next child of the regular SVG element (94). Steps (91) to (94) repeat until there are no more children of the regular SVG element.

If there are no more children of the regular SVG element (93), or after a generated function is called (86, 89), or if the event attribute of a designated element is not equal to "onload" (84), or there are no more child elements in a regular SVG element to search (90), the initialization file determines if there are more elements in the DOM to search (95). If there are more elements in the DOM (95), the initialization file determines if the next sibling element is a designated element (96). Steps (93) to (96) are repeated until all elements in the DOM are searched. Once there are no more elements in the DOM to search (95), then the initialization function is done and the viewer 13 waits for an event to occur (97).

Once an event occurs on an SVG element (i.e., the observer element), that event object is passed to any handler function with which it has been associated (98). The handler function changes the UI control's state (99) to whatever it should be, according to the logic inherent in the specific UI control, which causes the visual appearance to change (the 'g' element containing the SVG for the previous state gets its 'display' attribute set to 'none', while the 'g' element containing the SVG for the new state gets its 'display' attribute set to 'all'). If the UI control's logic dictates that this change in state requires that any associated behavior elements be run (100), then the event object is passed to the processActions( ) handler function (101). The processActions( ) handler function traverses all children of the UI control element and performs any action required (102). If the UI control's logic does not dictate that the change in state requires any associated behavior elements to be run (100) or after the processActions( ) handler function has performed the required actions (102), then the event handler function is done and the viewer waits for another event to occur (97).

Referencing Attributes

To create an application, a designer often desires to reference the current value of another element's attributes. An expression syntax is created to allow the attribute values of elements to be dynamic. With expressions, attribute values can be dependent on the real-time values of other attributes in the DOM. This syntax is intended to be simpler to use than XPath and ECMAScript, and to provide a subset of their most commonly used features.

In one embodiment of an expression syntax, expressions are denoted by the %% characters. Whatever is contained with the % characters gets evaluated. The basic unit of reference is elementID@attributeName. For example, %myRectangle@width % would be resolved to the numeric value of the width attribute of the element //.[@id="myRectangle"] (as denoted with the)(Path expression). This syntax is therefore intended to be used in documents where elements have unique ID's. Note that the attributeName can have a namespace prefix for any namespace declared in the document.

Preferably, the following unit pattern is used for the expression syntax:

elementID@attributeName |
elementID@nameSpace:attributeName

Some behaviors, like 'loadXML', can create document fragments. These are named at the time of creation and can be referred to within %% expressions, as follows:

docID.elementID@nameSpace:attributeName

Special attribute extensions include a bounding box, CDATA (the text between the opening and closing tags, e.g. <text>This is the CDATA</text>), and event attributes. The bounding box extensions include the following:
elementID@bbox.x : returns the x-coordinate of the element's bounding box (i.e. the left)
elementID@bbox.y : returns the y-coordinate of the element's bounding box (i.e. the top)
elementID@bbox.width : returns the width of the element's bounding box elementID@bbox.height : returns the height of the element's bounding box
A CDATA extension includes:
elementID@cdata : returns the text content of the element
Event Attribute extensions included the following:
@event.type: returns the type of event that triggered the behavior (e.g. 'mouseover', 'SVGResize', 'keypress', etc.)
@event.targetNodeName: returns the nodeName of the element that was the target of the event that triggered the behavior
@event.targetID: returns the 'id' attribute of the element that was the target of the event that triggered the behavior
@event.currentTargetNodeName: returns the nodeName of the element that observed the event that triggered the behavior
@event.currentTargetID: returns the 'id' attribute of the element that observed the event that triggered the behavior
@event.shiftKey: returns 'true' if the Shift-key is pressed, 'false' otherwise.
@event.ctrlKey: returns 'true' if the Ctrl-key is pressed, 'false' otherwise.
@event.keyCode: returns the keyCode attribute of the 'keydown' or 'keyup' event that triggered the behavior.

@event.keyID: returns the key identifier—a string representation of the keyCode attribute of the 'keydown' or 'keyup' event that triggered the behavior (e.g. 'Space', 'Enter', 'a').

@event.charCode: returns the charCode attribute of the 'keypress' event that triggered the behavior.

@event.char: returns the string representation of the charCode attribute of the 'keypress' event that triggered the behavior (e.g. 'A' or 'a').

The real event object has 'target' and 'currentTarget' attributes, which are node objects. Since these would only be useful in a scripting environment, the "virtual" event attributes 'targetNodeName', 'targetID', 'currentTargetNodeName' and 'currentTargetID' are provided.

A keyCode event attribute may be automatically generated in response to the 'keydown' and 'keyup' events. For ease of authoring, dSVG offers a "virtual" event attribute called 'keyID', which is a string identifier for the various keys. These keyID's resemble, as closely as possible, the key identifiers listed in the W3C Working Draft of the DOM Level 3 Events Specification (http://www.w3.org/TR/2003/WD-DOM-Level-3-Events-20030331/keyset.html).

An attribute consists of constant string data concatenated with evaluated expressions delimited by % symbols (a double %% acts as an escape). For example:

attribute="constant_one%expression_one%constant_two%expression_two%constant_three"

Each resolution expects an expression of the form:

%complex_expression% where complex_expression can be of the form:

%simple_expression% or:

%simple_expression (complex_expression) simple_expression%

Parentheses are resolved from innermost to outermost. Note that open parentheses require leading whitespace to distinguish them from functions.

An example of a simple expression is:

simple_expression=[string, Unit_Pattern, function, variable] (OpCode [string, Unit_Pattern, function, variable])*

An example of a string is:

string='some string data' resolves to some string data

An example of a function is:

function=functionName( params ): resolves to a function return value

The following ECMA math functions are available:
abs; acos; asin; atan; atan2; ceil; cos; exp; floor; log; max; min; pow; random; sin; sqrt; and tan.

Other available functions are:

factorial;

doublefactorial;

gcd (greatest common divisor);

ln;

log10;

if( boolean expression , if_true_expression , if_false_expression );

substring( string, index_start, index_end ); and length( string ).

An example of a variable is:

variable ( form: $variableName )=%expression%

Variables refer to 'variable' elements and are intended as a convenient way of building and (re)using complex expressions, or simply for storage. It is the author's responsibility to not create self referential variables or circular variable references.

Operation codes (OpCodes) include:

+ : addition

− : subtraction

* : multiplication

/ : division

, : list separator (ie. for parameters)

== : boolean equals

>= : boolean greater than or equal to

<= : boolean less than or equal to

!= : boolean not equal to

Expressions using opcodes resolve any Unit_Patterns, functions, variables and strings and then follow standard ecma expression rules.

Syntax Expression Example #1

```
<?xml version="1.0" standalone="no"?>
<!DOCTYPE svg SYSTEM "../SVGdSVG.dtd">
<svg xmlns:xlink="http://www.w3.org/1999/xlink" xmlns:dsvg="http://www.corel.com/schemas/2002/dSVG"
height="410px" width="744px" onload="init(evt)" viewBox="0 0 744 410">
  <script type="text/ecmascript" xlink:href="dsvg/dSVG.js"/>
  <script type="text/ecmascript" xlink:href="dsvg/baseUI.js"/>
  <script type="text/ecmascript" xlink:href="dsvg/constraint.js"/>
```

```
<script type="text/ecmascript" xlink:href="dsvg/fo-
cus.js"/>
<script type="text/ecmascript" xlink:href="dsvg/setAt-
tribute.js"/>
<script type="text/ecmascript" xlink:href="dsvg/set-
Style.js"/>
<script type="text/ecmascript" xlink:href="dsvg/set-
Transform.js"/>
<!-- template -->
<rect height="40" width="744" y="0" x="0"
fill="#5f86B1" id="title_rect"/>
<text y="25" x="20" font-weight="bold" font-size="18"
fill="white" id="text_1">dSVG sample behavior: focus—
with added attributes focusGroup and focus</text>
<text y="365" x="20" font-size="12"
id="content">Content of file: dsvg:focus, dsvg:setTrans-
form, dsvg:setAttribute, dsvg:setStyle, (added attributes
dsvg:focus, dsvg:focusGroup)</text>
<text y="380" x="20" font-size="12" id="expected">The
dsvg:focusGroup attribute adds the ability to store the ID of
similar type elements that are assigned to that group.</text>
<text y="395" x="20" font-size="12"
id="depend">Default focus can be given to an element (red
circle above) by adding the dsvg:focus attribute to that ele-
ment.</text>
<line y2="340" x2="744" y1="340" x1="0" stroke-
width="2" stroke="#5f86B1" fill="#5f86B1"
id="bottom_line"/>
<!-- adding behavior -->
<text y="250" x="20" font-size="12" id="desc">The red,
blue, green circles are part of the focusGroup. The orange
circle is not.</text>
<text y="150" x="200" font-size="12" id="desc_
2">Click on the red, green and blue circles to set focus.
</text>
<text y="170" x="200" font-size="12" id="desc_
3">Hover over the 'red', 'green' and 'blue' text elements to
set focus.</text>
<dsvg:focus elementID="redCircle" event="onclick"
id="circleGroup">
<dsvg:setTransform scale="1.2" vAlign="middle"
    hAlign="middle" absolute="true"
    elementID="%circleGroup@elementID %"/>
<dsvg:setTransform scale="1" vAlign="middle"
    hAlign="middle" absolute="true"
    elementID="%circleGroup@previousID %"/>
<dsvg:setAttribute value="%(circleGroup@elementID)
    @fill%Text" attribute="elementID"
    elementID="textGroup"/>
</dsvg:focus>
<dsvg:focus event="onmouseover" id="textGroup">
<dsvg:setStyle value="%(textGroup@elementID)@cdata
    %" property="fill"
    elementID="%textGroup@elementID %"/>
<dsvg:setStyle value="black" property="fill"
    elementID="%textGroup@previousID %"/>
<dsvg:setAttribute value="%(textGroup@elementID)
    @cdata %Circle" attribute="elementID"
    elementID="circleGroup"/>
</dsvg: focus>
<circle dsvg:focus="true" dsvg:
focusGroup="circleGroup" r="30" cy="100" cx="50"
fill="red" id="redCircle"/>
<circle dsvg:focusGroup="circleGroup" r="30"
cy="200" cx="50" fill="blue" id="blueCircle"/>
<circle dsvg:focusGroup="circleGroup" r="30"
cy="100" cx="150" fill="green" id="greenCircle"/>
<circle r="30" cy="200" cx="150" fill="orange"
id="orangeCircle"/>
<text dsvg:focus="true" dsvg:focusGroup="textGroup"
y="80" x="200" id="redText">red</text>
<text dsvg:focusGroup="textGroup" y="80" x="250"
id="blueText">blue</text>
<text dsvg:focusGroup="textGroup" y="80" x="300"
id="greenText">green</text>
<text y="80" x="350">orange</text>
</svg>
```

Hovering the mouse over the 'text' element with id="blueText causes the behaviors within the second 'focus' element to be run. When the first 'setStyle' behavior is run, its 'value' attribute, which is equal to:

%(textGroup@elementID)@cdata % resolves to:

%blueText@cdata % which then further resolves to:

blue

Syntax Expression Example #2

```
<dsvg:button xlink:href="dsvg/
skinButton_Windows.svg#skinButton" autoScale="true"
disabled="false" selected="false" toggle="false"
height="18" width="100" y="70" x="80"
label="Evaluate" id="button1"> <dsvg:alert
message="%button1@label=='false', 'is selected', 'is not
selected') %"/></dsvg:button>
```

Pushing the button will run the 'alert' behavior. Its 'message' attribute, which is equal to:
 message="%button1@label +'button'+if
    (button1@selected=='false', 'is selected', 'is not
    selected')

which resolves to:
 "button1@label +'button'+if(false , 'is selected', 'is not
    selected')
which further resolves to:

Evaluate button is selected

The expression syntax allows a user to refer to real-time values of any attribute of any element in any accessible document or documentFragment easily without a complex syntax like XPath and without script. It also allows a user to manipulate them with mathematical operators and functions, as well as to concatenate them with strings. For instance, if a user had a circle element with id="myCircle" and a dSVG textBox element with id="myTextBox", the user could set the circle's fill colour to be the value of the textBox as follows: <dsvg: setAttribute elementID="myCircle" attribute="fill" value="%myTextBox@value %"/>.

Figure 9:
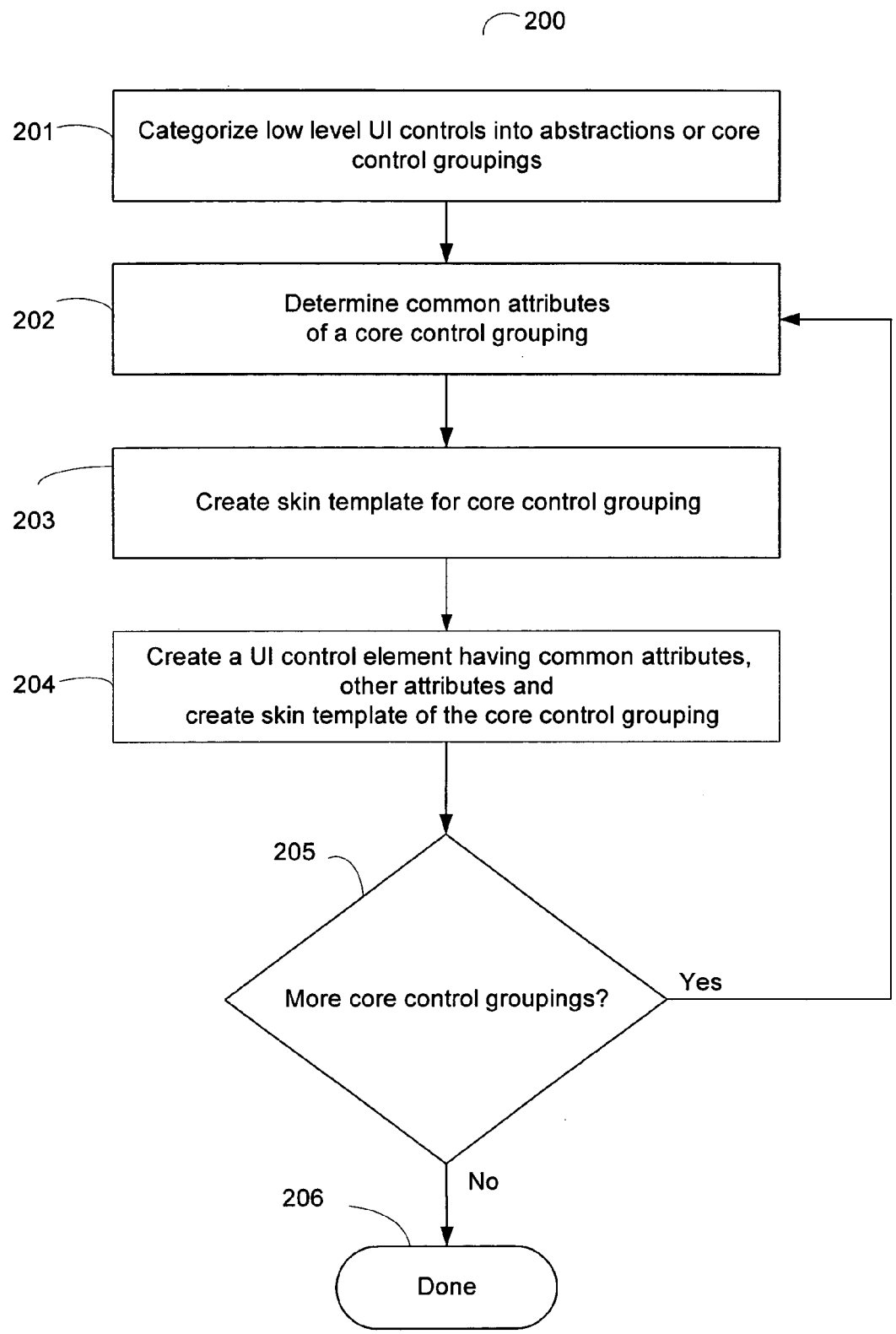
FIG. 9 shows an example of a method of creating an element for controlling user interface features of a web application, in accordance with the user interface control system.

FIG. 9 shows an example of a method of creating an element for controlling user interface features of a web application (210) in accordance with the UI control system 20. The method (210) begins with categorising low level UI controls into abstractions or fundamental core UI control groupings (211). Next, common attributes of a core UI control grouping are determined (212). Next, other attributes 25 of the core UI control grouping are determined (213). Next, a skin template for the core UI control grouping is created (214). Next, a core UI control element 22 having the common attributes 24 and 26, other attributes 25 is create along with a skin template 27 of the UI control grouping (215). The method is done (216).

Figure 10:
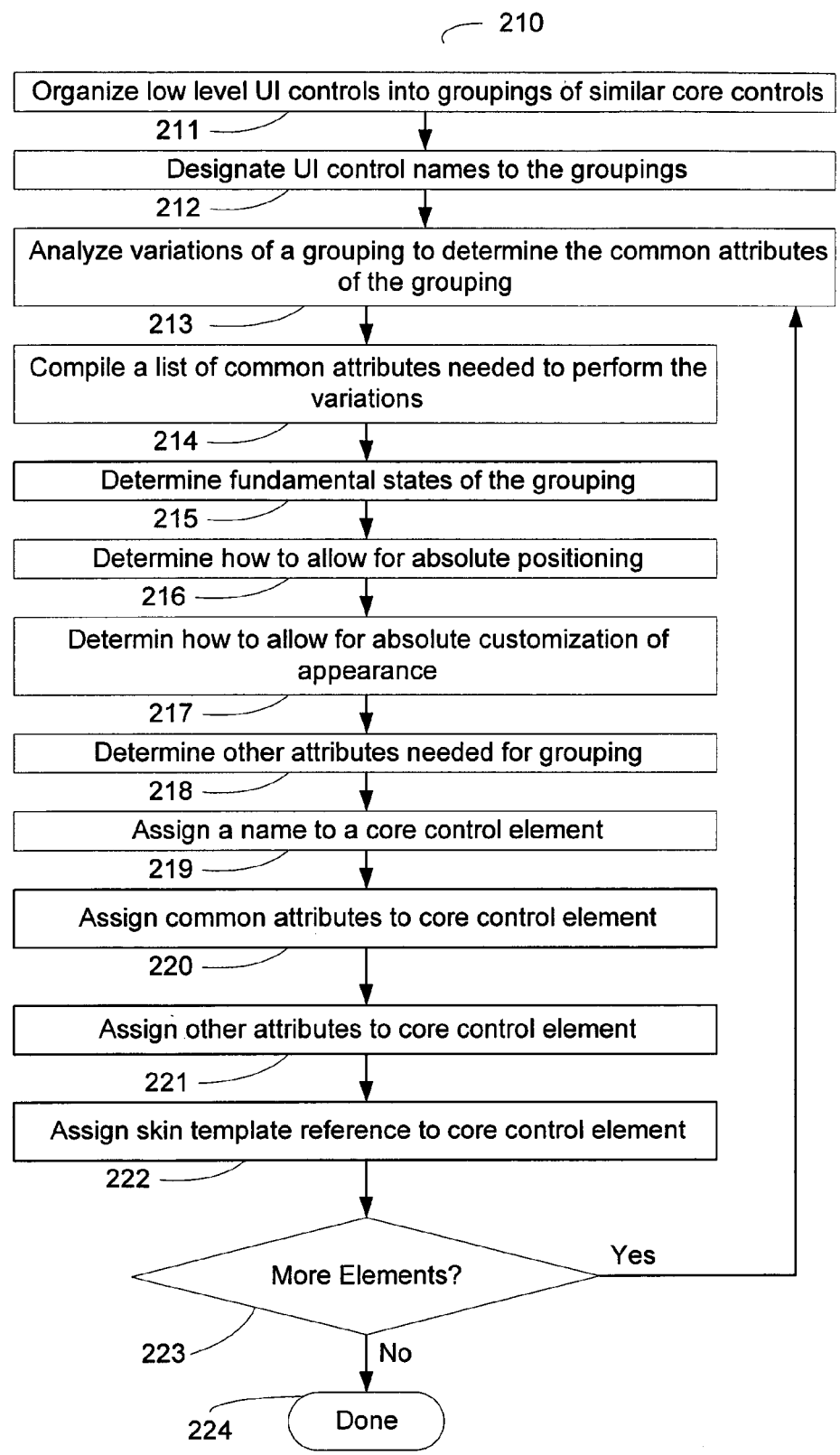
FIG. 10 shows an example of a method of creating a plurality of elements for controlling user interface features of a web application, in accordance with the user interface control system.

FIG. 10 shows an example of a method of creating a plurality of elements for controlling user interface features of a web application (220) in accordance with the UI control system 20. The method (220) begins with organizing low level UI control elements 22 into groupings of similar UI control elements (221). Next, core UI control names are designated to the groupings (222). Next, variations of a grouping are analyzed to determine common attributes of the grouping (223). A list of common attributes used to describe the variations is compiled (224). Next, fundamental states of the core UI control grouping are determined (225). These fundamental states include different appearances that supply the intrinsic behavior of the core UI control (e.g., a UI control in a 'disabled' state does nothing when clicked upon). The fundamental states include "up", "down", "hover", "hit", "focusUP", "focusDown", "disabledUp" and "disabledDown". Once the fundamental states are determined (225), a method of allowing for absolute positioning of UI controls is determined (226). For example, providing x and y co-ordinates. Next, a method of allowing for absolute customization of appearance of the core UI control is determined (227), so that the appearance of the UI controls is in no way determined by the viewer or by the script that creates the UI controls. This step (227) goes beyond a simple modification of styling properties, which would allow you to specify the UI control's fill-colour or stroke-colour, for instance. Instead, the appearance for each possible state is defined within a skin template, whose location is defined by the 'xlink:href' attribute, in the same manner in which the 'xlink:href' is typically used within regular SVG markup (e.g., xlink:href="dsvg/skinButton_Default.svg#skinButton" means that the skin template is an element whose 'id' attribute is "skinButton" within the file skinbutton_Default.svg within the dsvg directory). Within the skin template 27, a 'g' element (group container element) can exist for each possible state, within which any SVG markup is allowed (note that if the UI control system 20 is used within an SVG viewer, the skin template must contain SVG markup; if the UI control system 10 is used within a different viewer, the markup within the skin template must conform to the markup that the viewer expects). Thus the UI control's back-end (the script object, with data and function members) has no pre-conceived notions of what the UI control actually looks like for its various states. This poses problems for resizing the UI controls based on the 'width' and 'height' attributes, however. It is a simple matter to compare the UI control's width and height with the desired width and height, and from that calculate the scaling that is required in the x- and y-directions, and then apply those scale factors to the UI control's visual front-end (a modified version of the skin template) via a transformation (in SVG, using the 'transform' attribute). But that causes the UI control to not only change dimensions, but it also stretches or squishes all the visual elements and changes their absolute positions with respect to one another—the label may be stretched or squished and may be further from or closer to the UI control than originally intended, the stroke-width's may be thicker or thinner, the button in a comboBox, may be stretched, etc. The solution is to give the designer the capability of defining the constraints, directly in the skin template, that will provide the detailed information needed to "intelligently" resize the UI control. For example, one might specify that the label always remain unscaled and that its position always be 3 pixels above the UI control, or that the stroke-width always be equal to 1, or that the button of a comboBox always has its width automatically adjusted so as to preserve its original aspect ratio.

Even if instead of applying the scale factors to the UI control via a transformation, the scale factors were instead used to directly modify all of the coordinates for all of the various types of elements used for the UI control's appearance (e.g., rect, circle, path, line, polyline, etc.), that could still result in some of the same problems. For instance, the designer might intend for the label's position and/or size to scale or not. Thus the constraints must still be defined within the skin template. Once all of the above determinations have been performed, other attributes 25 that the core UI control element needs are determined (228). A core UI control element 22 is then created. A namespace is assigned to a core UI control element 22 pursuant to a naming convention (229). Next the common attributes 24, of the UI control grouping are assigned to the core UI control element 22 (230). The other attributes 25 of the UI control grouping are then assigned to the core UI control element 22 (231). Finally, the skin template reference 26 is assigned to the core UI control element 22 (232). The skin template 27 comprises descriptions of the visual appearance of each state for the UI control. The set of instructions (i.e., the script) 28 that creates the UI control's back-end (i.e., the object in memory with data and function members, which determine how to construct the UI control using the skin template 27, what intrinsic behaviors to exhibit and how to interact with the user) are not directly associated to the UI control element 22, but rather are indirectly associated to the UI control element 22 via the initialization function (i.e., the UI control element 22 does not actually reference the script function 28 or the script file 28 that creates and controls the UI control). The core UI control element's 22 set of instructions (script) 28 may be stored in an independent file. Once all core UI control elements 22 have been created (233), the method is done (234). Other steps may be added to the method (220). Default settings may be initiated for the core UI control elements 22, if desired.

There are many advantages to the UI control system 20. The UI control system 20 encompasses general UI controls desired to build web applications. The UI control system 20 allows for absolute positioning, absolute control of the appearance, and may easily be hooked up to actions, defined via markup or script functions, that affect any element in a DOM. The UI control system 20 may be used for forms. However, the control system 20 is not tied to a model specifically intended for forms (i.e., does not force the author to jump through hoops to create an application which does not use forms).

The UI control system 20 assists web designers with no programming skills to create dynamic, interactive web applications. It also aids experienced programmers to create dynamic, interactive web applications much more easily and rapidly. Because the UI control system 20 involves an XML markup language (as opposed to just script functions), the attributes and data and even the elements themselves can be made to be data-driven at run-time, using (at design-time) existing or new software that allows one to visually map input XML markup to output XML markup, resulting in an extensible stylesheet language transformation (XSLT) code (or any other language useful for XML transformations) which will actually modify the UI control elements 20 based on the input XML data/markup.

The UI control system 20 can also be natively-implemented, accessing the exposed DOM API's in the same manner as the script implementation. A native implementation could be much faster because unlike script, which gets interpreted at run-time, native code (e.g. C++ or C) gets interpreted at compile time and gets optimized by the compiler. The natively-implemented UI control system 20 could also access any unexposed, lower-level object model API's directly, rather than the exposed higher-level DOM API's, which could further improve performance. If natively implemented, the amount of data needed to be transferred may be greatly reduced, since there is no script that needs to be transmitted, which is especially beneficial for wireless devices with low bandwidth and small memory. Using a markup language for the UI control elements 22 is also beneficial because it allows for the possibility of further reducing the file size by creating a binary version of the markup language that employs opcodes-predetermined arrangements of bits (1's and 0's) that correspond to particular element names and attributes. Unlike textual markup, which must be parsed (compared to predetermine strings/text to establish the meaning of the text) in order to create the DOM, binary opcodes can be compared to identical binary opcodes, which is much faster than string comparisons, in order to build the DOM much faster.

The UI control system 20 according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

List of UI Control Elements, Attributes, and Skin Templates

Some examples of UI control elements 22, common attributes 24 and 26, skin templates 27 and examples of skins, in accordance with the UI control system 20, are provided below. Other UI control elements, attributes and skins may be created. The provided UI control elements, attributes and skins are examples of one implementation of a DOM manipulation markup language.

Attributes Common to All UI Controls (24 and 26)

```
<!ENTITY % stdUIAttrs
"
id                  ID              #IMPLIED
label               %Text           #IMPLIED
x                   %Coordinate;    '0'
y                   %Coordinate;    '0'
width               %Length;        #IMPLIED
height              %Length;        #IMPLIED
preserveAspectRatio %Boolean;       'false'
xmlns:xlink         CDATA           #FIXED
                                    'http://www.w3.org/1999/xlink'
xlink:href          %URI;           #IMPLIED
labelX              %Coordinate;    #IMPLIED
labelY              %Coordinate;    #IMPLIED
disabled            %Boolean;       'false'
autoScale           %Boolean;       'false'
stateHover          ID;             #IMPLIED
stateFocus          ID;             #IMPLIED
stateUp             ID;             #IMPLIED
stateDown           ID;             #IMPLIED
stateDisabled       ID;             #IMPLIED" >
``` id="name"
  Standard XML attribute for assigning a unique name to an element. Refer to the "Extensible Markup Language (XML) 1.0" Recommendation [XML10].

label='<string>'
  The text associated with the UI control, the position of which is determined by the skin, unless overridden by the 'labelX' and 'labelY' attributes.
x="<coordinate>"
  The x-axis coordinate of the side of the UI control, which has the smaller x-axis coordinate value in the current user coordinate system. Usually, this means the left side.
  If the attribute is not specified, the effect is as if a value of "0" were specified.
y="<coordinate>"
  The y-axis coordinate of the side of the UI control, which has the smaller y-axis coordinate value in the current user coordinate system. Usually, this means the top.
  If the attribute is not specified, the effect is as if a value of "0" were specified.
width="<length>"
  The width of the UI control.
  If the attribute is not specified, the width is determined from the skin.
  A negative value is an error. A value of zero disables rendering of the control.
height="<length>"
  The height of the UI control.
  If the attribute is not specified, the height is determined from the skin.
  A negative value is an error. A value of zero disables rendering of the control.
preserveAspectRatio="(true | false)"
  If true, and 'width' or 'height' is supplied, the other dimension is automatically calculated so as to preserve the UI control's aspect ratio.
  If both 'width' and 'height' are supplied, this attribute is ignored.
  If the attribute is not specified, it is assumed to be false.
xlink:href="<uri>"
  A reference to the skin's parent element, stored either internally in the <defs> block, or in an external file.
  If the attribute is not specified, the control is not rendered.
labelX="<coordinate>"
  The x-axis coordinate of the side of the label, which has the smaller x-axis coordinate value in the current user coordinate system (usually the left side), relative to the (x,y) coordinates of the UI control.
  If the attribute is not specified, the label's x-position is determined by the skin.
labelY="<coordinate>"
  The y-axis coordinate of the side of the label, which has the smaller y-axis coordinate value in the current user coordinate system (usually the top), relative to the (x,y) coordinates of the UI control.
  If the attribute is not specified, the label's y-position is determined by the skin.
disabled="(true | false)"
  If true, the UI control is set to its disabled state and cannot be used.
autoScale="(true | false)"
  If true, the UI control is scaled to account for the difference between the transforms on the main document and the skin document, due to the 'viewBox' and 'preserveAspectRatio' attributes on each document's root 'svg' element. The resulting UI control will appear exactly the same size in the main document as it appeared in the skin document.

stateHover="name"
: The ID of the UI control's child element 'state', which refers to a skin to be used for the 'hover' state's appearance.
: If the attribute is not specified, the skin's default 'hover' state appearance is used.

stateFocus="name"
: The ID of the UI control's child element 'state', which refers to a skin to be used for the 'focus' state's appearance.
: If the attribute is not specified, the skin's default 'focus' state appearance is used.

state_focus_up="name"
: Specifies the ID of the UI control's<state> child element, to override the appearance of the "focus up" state, as defined in the skin.

state_focus_down="name"
: Specifies the ID of the UI control's<state> child element, to override the appearance of the "focus_down" state, as defined in the skin.

stateUp="name"
: The ID of the UI control's child element 'state', which refers to a skin to be used for the 'up' state's appearance.
: If the attribute is not specified, the skin's default 'up' state appearance is used.

stateDown="name"
: The ID of the UI control's child element 'state', which refers to a skin to be used for the 'down' state's appearance.
: If the attribute is not specified, the skin's default 'down' state appearance is used.

state_hit="name"
: Specifies the ID of the UI control's<state> child element, to override the appearance of the "hit" state, as defined in the skin.

stateDisabled="name"
: The ID of the UI control's child element 'state', which refers to a skin to be used for the 'disabled' state's appearance.
: If the attribute is not specified, the skin's default 'up' state appearance is used.

state_disabled_up="name"
: Specifies the ID of the UI control's <state> child element, to override the appearance of the "disabled up" state, as defined in the skin.

state_disabled_down="name"
: Specifies the ID of the UI control's <state> child element, to override the appearance of the "disabled down" state, as defined in the skin.

UI Control Elements 22

The 'aggregate' element
: The 'aggregate' element defines a container for other SVG and dSVG elements. It is used to create custom controls, often composed of other UI controls, which can be easily inserted into any document. Any child 'variable' elements are considered to be properties of the aggregate. Any child 'action' elements are considered to be methods of the aggregate. Properties and methods are accessible via the dSVG expression syntax.

```
<!ENTITY % aggregateExt" ">
<!ELEMENT dsvg:aggregate (dsvg:state|%behaviors;)*>
<!ATTLIST dsvg:aggregate
%stdDSVGAttrs;
%stdUIAttrs;
viewBox %ViewBoxSpec.datatype #IMPLIED>
```
Attribute definitions:
viewBox='<string>'
: The same as the 'viewBox' attribute in the SVG specification. A list of four numbers <min-x>, <min-y>, <width> and <height>, separated by whitespace and/or a comma, which specify a rectangle in user space that should be mapped to the bounds of the viewport established by the given element, taking into account the 'preserveAspectRatio' attribute. If specified, an additional transformation is applied to all descendants of the given element to achieve the specified effect.

Figure 11:
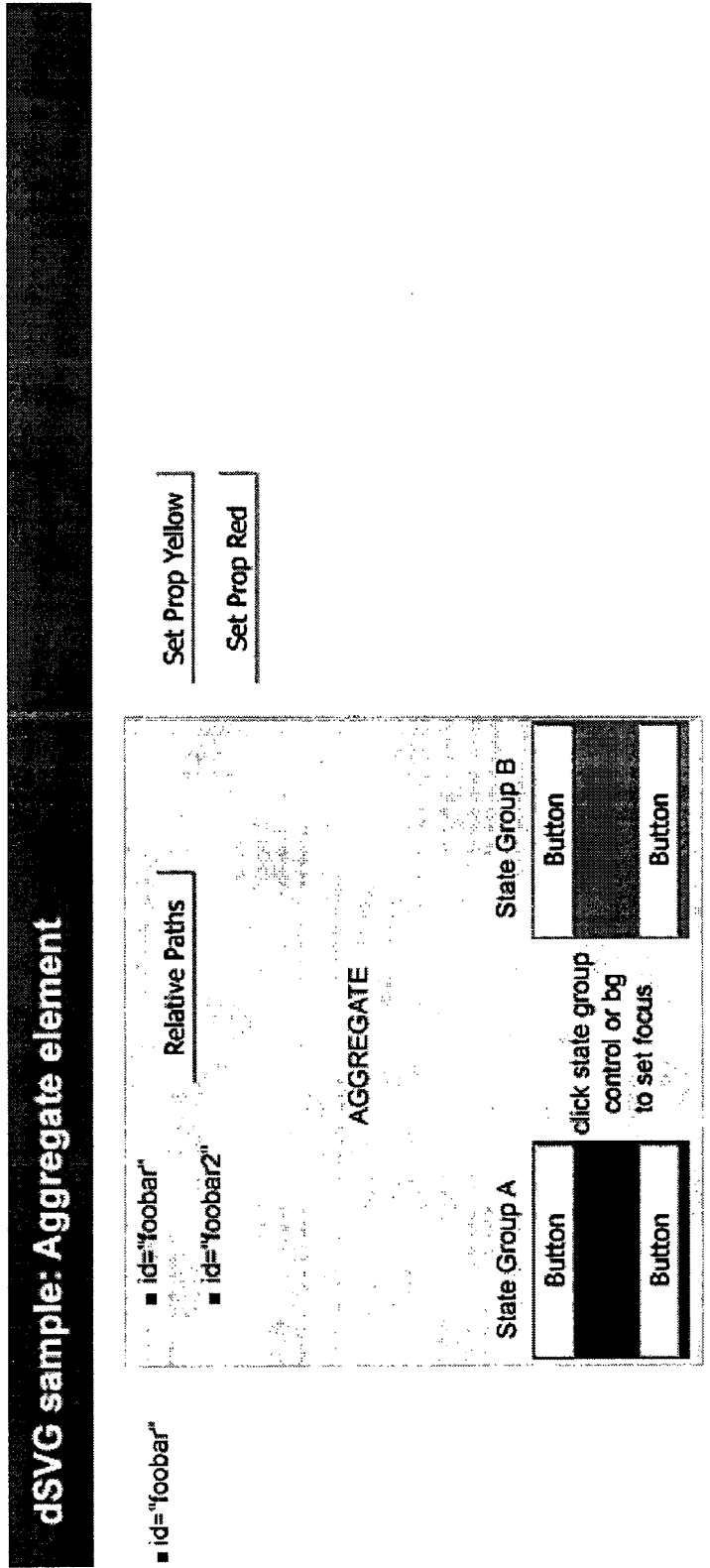
FIG. 11 shows a screen shot of an example of an aggregate element, in accordance with the user interface control system.

FIG. 11 shows a screen shot of an example of the use of an aggregate element. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG20"
xmlns:xlink="http://www.w3.org/1999/xlink" height="450" width="744"
onload="init(evt)" viewBox="0 0 744 450">
    <script type="text/ecmascript" xlink:href="dSVG20/dSVG.js"/>
    <script type="text/ecmascript" xlink:href="dSVG20/baseUI.js"/>
    <script type="text/ecmascript" xlink:href="dSVG20/constraint.js"/>
    <script type="text/ecmascript" xlink:href="dSVG20/window.js"/>
    <script type="text/ecmascript" xlink:href="dSVG20/windowBase.js"/>
    <script type="text/ecmascript" xlink:href="dSVG20/button.js"/>
    <script type="text/ecmascript" xlink:href="dSVG20/scrollbar.js"/>
    <script type="text/ecmascript" xlink:href="dSVG20/slider.js"/>
    <script type="text/ecmascript" xlink:href="dSVG20/attributeDrag.js"/>
    <script type="text/ecmascript" xlink:href="dSVG20/aggregate.js"/>
    <script type="text/ecmascript" xlink:href="dSVG20/contextMenu.js"/>
    <script type="text/ecmascript" xlink:href="dSVG20/listbox.js"/>
    <script type="text/ecmascript" xlink:href="dSVG20/combobox.js"/>
    <script type="text/ecmascript" xlink:href="dSVG20/textbox.js"/>
    <script type="text/ecmascript" xlink:href="dSVG20/alert.js"/>
    <script type="text/ecmascript" xlink:href="dSVG20/setAttribute.js"/>
    <script type="text/ecmascript" xlink:href="dSVG20/run.js"/>
    <!-- Adding Template -->
    <g id="template">
    <rect height="40" width="744" y="0" x="0"
        fill="#5f86B1"
id="rect_Title"/>
    <text y="25" x="20" font-weight="bold" font-size="18"
        fill="white"
id="TITLE">dSVG sample: Aggregate element
    </text>
    <line y2="350" x2="744" y1="350" opacity="1.0"
        stroke-width="2"
stroke="#5F86B1" fill="#5F86B1" id="bottomLine"/>
    <text y="370" x="20" font-size="12"
        id="defaut_ex">The aggregate
element defines a top-level container element
```

```
</text>
<text y="390" x="20" font-size="12" id="small_ex">In
    this sample, the buttons on the left and the blue rectangle
    are in stateGroup 'a'
</text>
<text y="405" x="20" font-size="12" id="small_ex2">
    and the buttons on the right and the red rectangle are in
        stateGroup 'b'
</text>
<text y="425" x="20" font-size="12" id="small_ex3">
    The relative paths button drills into the alert statements
        inside itself to demonstrate use of 'this' keyword
</text>
<text y="440" x="20" font-size="12" id="small_ex4">
    and into the fills of rectangles 'foobar' and 'foobar2' to
        demonstrate use of 'aggregate' keyword.
</text>
</g>
<!-- adding controls -->
<dsvg:alert id="one" message="outside aggregate"/>
<rect id="foobar" x="2" y="70" width="5" height="5"
fill="green"/><text              y="75"             x="10"
id="text1">id="foobar"</text>
    <dsvg:button                         xlink:href="dSVG20/
skinButton_Windows.svg#skinButton"       autoScale="true"
height="18" width="100" y="70" x="420" label="Set Prop
Yellow" id="button_1">
        <dsvg:setAttribute elementID="%MyAggregate/Fill1%"
            attribute="value" value="yellow"/>
    </dsvg:button>
    <dsvg:button                         xlink:href="dSVG20/
skinButton_Windows.svg#skinButton"       autoScale="true"
height="18" width="100" y="100" x="420" label="Set Prop
Red" id="button_1">
        <dsvg:setAttribute elementID="%MyAggregate/Fill1%"
            attribute="value" value="red"/>
    </dsvg:button>
    <dsvg:aggregate     autoScale="true"       height="200"
width="400" y="50" x="90" id="MyAggregate">
        <dsvg:variable id="Fill1" name="Fill1" value="blue">
            <dsvg:action id="changeFill">
                <dsvg:setAttribute    elementID="%this@id%Fill"
                    attribute="fill" value="%this/Fill1@value%"/>
            </dsvg:action>
        </dsvg:variable>
    <rect id="foobar" x="35" y="15" width="5" height="5"
fill="blue"/><text y="20" x="45" id="text1">id="foobar"
</text>
    <rect id="foobar2" x="35" y="45" width="5" height="5"
fill="red"/><text             y="50"            x="45"
id="text1">id="foobar2"</text>
    <rect x="5" y="5" width="310" height="275" opac-
ity="0.3" id="MyAggregateFill" fill="green"/>
    <text y="120" x="120" id="text1">AGGREGATE</
text>
        <text      y="190"      x="18"     id="text2"      dsvg:
stateGroup="a">State Group A</text>
        <rect     id="stateABackGround"     x="8"     y="198"
width="104" height="75" fill="blue" opacity="0.5" dsvg:
stateGroup="a"/>
        <dsvg:button dsvg:stateGroup="a" xlink:href="dSVG20/
skinButton_Windows.svg#skinButton"       autoScale="true"
height="18" width="100" y="200" x="10" label="Button"
id="button_1"><dsvg:alert id="stateOne" message="State
A 1"/></dsvg:button>
        <dsvg:button dsvg:stateGroup="a" xlink:href="dSVG20/
skinButton_Windows.svg#skinButton"
autoScale="true" height="18" width="100" y="250"
x="10" label="Button" id="button_2"><dsvg:alert
id="stateTwo" message="State A 2"/></dsvg:button>
        <text     y="225"      x="115"      id="text2"      dsvg:
stateGroup="b">click state group</text>
        <text     y="240"      x="125"      id="text2"      dsvg:
stateGroup="b">control or bg</text>
        <text     y="255"      x="125"      id="text2"      dsvg:
stateGroup="b">to set focus</text>
        <text     y="190"      x="218"      id="text2"      dsvg:
stateGroup="b">State Group B</text>
        <rect    id="stateBBackGround"     x="208"     y="198"
width="104" height="75" fill="red" opacity="0.5"
dsvg:stateGroup="b"/>
        <dsvg:button dsvg:stateGroup="b" xlink:href="dSVG20/
skinButton_Windows.svg#skinButton"
autoScale="true" height="18" width="100" y="200"
x="210" label="Button" id="button_1"><dsvg:alert
id="stateThree" message="State B 1"/></dsvg:button>
        <dsvg:button dsvg:stateGroup="b" xlink:href="dSVG20/
skinButton_Windows.svg#skinButton"
autoScale="true" height="18" width="100" y="250"
x="210" label="Button" id="button_2"><dsvg:alert
id="stateFour" message="State B 2"/></dsvg:button>
    <dsvg:alert id="one" message="inside aggregate"/>
    <dsvg:button                         xfink:href="dsvg20/
        skinButton_Windows.svg#skinButton"            y="20"
        x="140" label="Relative Paths" id="button">
        <dsvg:alert id="one" message="inside button (one)"/>
        <dsvg:alert id="two" message="inside button (two)"/>
        <dsvg:alert id="three" message="THIS/one@message:%
            this/one@message %"/>
        <dsvg:alert id="four" message="THIS/two@message:%
            this/two@message %"/>
        <dsvg:alert      id="five"      message="AGGREGATE/
            foobar@fill % aggregate/foobar@fill %"/>
        <dsvg:alert      id="six"      message="AGGREGATE/
            foobar2@fill % aggregate/foobar2@fill %"/>
        <dsvg:alert id="seven" message="THIS@x: % this@x
            %"/>
        <dsvg:alert id="eight" message="AGGREGATE@x: %
            aggregate@x %"/>
    </dsvg:button>
    </dsvg:aggregate>
</svg>
```

The 'button' element

The 'button' element defines a control that can be clicked to trigger an action. It can be a push button, a checkbox (same as a sticky/toggle button) or a radiobutton, depending on its attributes.

```
<!ENTITY % buttonExt " " >
<!ELEMENT dsvg:button (dsvg:state|%behaviors;)* >
<!ATTLIST dsvg:button
%stdDSVGAttrs;
%stdUIAttrs;
toggle         %Boolean;        #IMPLIED
group          %Text;           #IMPLIED
selected       %Boolean;        #IMPLIED >
```

Attribute definitions:

toggle="(true | false)"

Specifies whether the button is a "toggle" (i.e. "sticky") button, meaning that it toggles between "up" and "down" states when clicked on. A checkbox has toggle="true".

If the attribute is not specified, the default is 'false'.
group='<string>'
 The name of the radio group that the button belongs to.
 If the attribute is specified, the button behaves as a radio button, in which only one of the buttons associated with this radioGroup can be checked at a time.
 If the attribute is not specified, the button behaves as either a push button or a toggle button.
selected="(true | false)"
 Specifies the initial state of the button as being down/checked (true) or up/unchecked (false). This attribute is automatically updated to reflect the current state of the control whenever the user clicks on the button, so that its state can be referenced externally.
 If the attribute is not specified, the default is 'false'.
Skin template:

```
<?xml version="1.0"?>
<svg xmlns:dsvg="http://www.corel.com/schemas/2002/dSVG"
xmlns:xlink="http://www.w3.org/1999/xlink">
    <g id=" ">
    <g id="label">
        <text x=" " y=" "> </text>
    </g>
    <g id="up" display="all"/>
    <g id="down" display="none"/>
    <g id="hover" display="none"/>
    <g id="focus" display="none"/> <g id="disabled" display="none"/>
    </g>
</svg>
```

Figure 12:
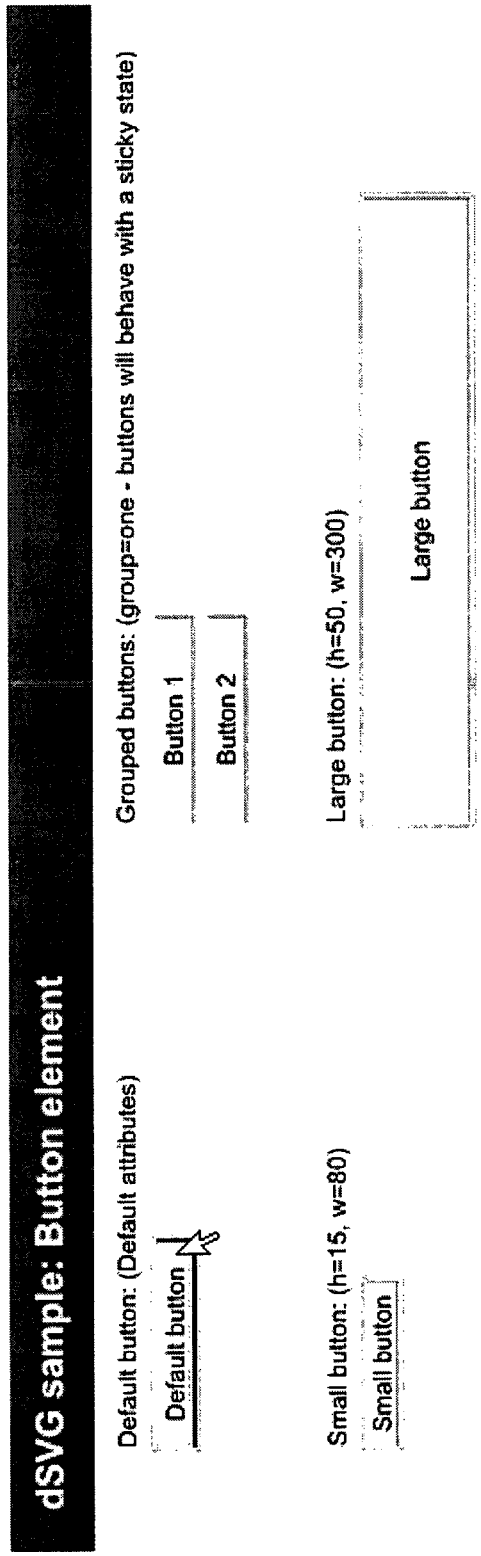
FIG. 12 shows a screen shot of an example of a button element, in accordance with the user interface control system.

FIG. 12 shows several push and toggle buttons of varying sizes, with no associated behaviors. The example is provided below:

```
<?xml version="1.0" standalone="no"?>
<!DOCTYPE svg SYSTEM "../SVGdSVG.dtd">
<svg xmlns:dsvg="http://www.corel.com/schemas/2002/dSVG11"
xmlns:xlink="http://www.w3.org/1999/xlink"
height="450px" width="744px"
onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/button.js"/>
    <!-- Adding Template -->
    <g id="template">
    <rect height="40" width="744" y="0" x="0" fill="#5f86B1" id="rect_Title"/>
    <text y="25" x="20" font-weight="bold" font-size="18" fill="white" id="TITLE">dSVG sample: Button element</text>
    <line y2="350" x2="744" y1="350" opacity="1.0" stroke-width="2" stroke="#5F86B1" fill="#5F86B1" id="bottomLine"/>
    <text y="370" x="20" font-size="12" id="defaut_ex">Default button—This button has all of its attributes set to default values.</text>
    <text y="395" x="20" font-size="12" id="group_ex">Grouped buttons—Buttons can belong to a group. If grouped, and toggle="true", this results in the functionality of a radio button.</text>
    <text y="420" x="20" font-size="12" id="large_ex">Small and large buttons—Change the size of a control by specifying new values for the height and width attributes.</text>
    <text y="60" x="50" id="default text">Default button: (Default attributes)</text>
    <text y="60" x="350" id="grouped">Grouped buttons: (group=one—buttons will behave with a sticky state)</text>
    <text y="160" x="50" id="small">Small button: (h=15, w=80)</text>
    <text y="160" x="350" id="large">Large button: (h=50, w=300)</text>
    <text y="340" x="20" font-weight="bold" font-size="10" fill="black" id="Note">*Note: The red outlines are not part of the controls. They are used to identify the dimensions for each control.</text>
    </g>
    <!-- adding controls -->
    <dsvg:button xlink:href="dsvg11/skinButton_Windows.svg#skinButton" autoScale="true" height="18" width="100" y="70" x="50" label="Default button" id="default"/>
    <rect height="22" width="104" y="68" x="48" stroke="red" fill="none" id="rect_default"/>
    <dsvg:button xlink:href="dsvg11/skinButton_Windows.svg#skinButton" autoScale="true" group="one" height="18" width="100" y="70" x="350" label="Button 1" id="default_g1"/>
    <dsvg:button xlink:href="dsvg11/skinButton_Windows.svg#skinButton" autoScale="true" group="one" height="18" width="100" y="95" x="350" label="Button 2" id="default2_g1"/>
    <dsvg:button xlink:href="dsvg11/skinButton_Windows.svg#skinButton" autoScale="true" height="15" width="80" y="170" x="50" label="Small button" id="small 1"/>
    <rect height="19" width="84" y="168" x="48" stroke="red" fill="none" id="rect_small"/>
    <dsvg:button xlink:href="dsvg11/skinButton_Windows.svg#skinButton" autoScale="true" height="50" width="300" y="170" x="350" label="Large button" id="large_button"/>
    <rect height="54" width="304" y="168" x="348" stroke="red" fill="none" id="rect_large"/>
</svg>
```

The 'calendar' element
 The 'calendar' element defines a calendar control, displaying the specified month of the specified year.
Attribute definitions:
year="integer"
 Specifies the year for the calendar to display.
month="integer"
 Specifies the month for the calendar to display.
selectable="(all | weekdays | weekends)"
 Specifies what days can be selected by the user.
multiSelect="(true | false)"

Specifies whether the user can select multiple days (true) or not (false).

The 'checkBox' element

The 'checkBox' element defines a sticky/toggle button that can be clicked to trigger an action.

```
<!ENTITY % checkBoxExt " " >
<!ELEMENT dsvg:checkBox (dsvg:state|%behaviors;)* >
<!ATTLIST dsvg:checkBox
%stdDSVGAttrs;
%stdUIAttrs;
selected          %Boolean;          #IMPLIED >
```

Attribute definitions:

selected="(true | false)"

Specifies the initial state of the checkBox as being checked (true) or unchecked (false). This attribute is automatically updated to reflect the current state of the control whenever the user clicks on the checkBox, so that its state can be referenced externally.

If the attribute is not specified, the default is 'false'.

Skin template:

```
<?xml version="1.0"?>
<svg  xmlns:dsvg="http://www.corel.com/schemas/2002/dSVG"
xmlns:xlink="http://www.w3.org/1999/xlink">
    <g id=" ">
    <g id="label">
        <text x=" " y=" "></text>
    </g>
    <g id="up" display="all"/>
    <g id="down" display="none"/>
    <g id="hover" display="none"/>
    <g  id="focus"  display="none"/><g  id="disabled"
        display="none"/>
    </g>
</svg>
```

Figure 13:
FIG. 13 shows a screen shot of an example of a checkBox element, in accordance with the user interface control system.

FIG. 13 shows several checkBoxes of various sizes, with no associated behaviors. The example is provided below:

```
<?xml version="1.0" standalone="no"?>
<!DOCTYPE svg SYSTEM "./SVGdSVG.dtd">
<svg  xmlns:dsvg="http://www.corel.com/schemas/2002/dSVG11"
xmlns:xlink="http://www.w3.org/1999/xlink"
height="450px" width="744px"
onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/button.js"/>
    <!-- Adding Template -->
    <g id="template">
    <rect  height="40"  width="744"  y="0"  x="0"
        fill="#5f86B1" id="rect_Title"/>
    <text y="25" x="20" font-weight="bold" font-size="18"
        fill="white" id="TITLE">dSVG sample: CheckBox element</text>
    <line  y2="350"  x2="744"  y1="350"  opacity="1.0"
        stroke-width="2" stroke="#5F86B1" fill="#5F86B1"
        id="bottomLine"/>
    <text    y="370"    x="20"    font-size="12"
        id="defaut_ex">Default check box—When you select the check box, it toggles between true (selected) and false (deselected).</text>
    <text    y="395"    x="20"    font-size="12"
        id="small_ex">Small and large check boxes—Change the size of a control by specifying new values for the height and width
        attributes.</text>
    <text y="340" x="20" font-weight="bold" font-size="10"
        fill="black" id="Note">*Note: The red outlines are not part of the controls. They are used to identify the dimensions for each
        control.</text>
    <g>
    <!-- adding controls -->
    <dsvg:checkBox               xlink:href="dsvg11/skinCheckbox_Default.svg#skinCheckBox"
autoScale="true" height="12" width="12" y="70" x="50"
label="Default check box: (h=12, w=12)" id="default"/>
        <rect    height="16"    width="16"    y="68"    x="48"
stroke="red" fill="none"/>
    <dsvg:checkBox               xlink:href="dsvg11/skinCheckbox_Default.svg#skinCheckBox"
autoScale="true" height="10" width="10" y="160" x="50"
label="Small check box: (h=10, w=10)" id="small"/>
        <rect    height="14"    width="14"    y="158"    x="48"
stroke="red" fill="none"/>
    <dsvg:checkBox               xlink:href="dsvg11/skinCheckbox_Default.svg#skinCheckBox"
autoScale="true" height="40" width="40" y="250" x="50"
label="Large check box: (h=40, w=40)" id="large"/>
        <rect    height="44"    width="44"    y="248"    x="48"
stroke="red" fill="none"/></svg>
```

The 'comboBox' element

The 'comboBox' element defines a comboBox control, used to display a list of items, from which only one can be selected. It is a composite control, utilizing 'textBox', 'button', 'contextMenu' and 'slider' controls.

```
<!ENTITY % comboBoxExt " " >
<!ELEMENT comboBox (dsvg:state|%behaviors;|dsvg:item)*>
<!ATTLIST comboBox
%stdDSVGAttrs;
%stdUIAttrs;
editable        %Boolean;        #IMPLIED
rows            %Integer;        #IMPLIED
value           %Text;           #IMPLIED
data            %Text;           #IMPLIED
sort            %Text;           #IMPLIED >
```

Attribute definitions:

editable="(true | false)"

Specifies whether the comboBox is editable (true) or not (false). If editable, typing text and pressing Enter results in a new 'item' element being created as a child of the 'comboBox' element. Its 'label' attribute gets set to the text just entered, which results in the new item being displayed at the bottom of the list.

If the attribute is not specified, the default is 'true'.

rows="<integer>"

Specifies the number of rows to be displayed in the dropdown list.

If the attribute is not specified, the dropdown list will show all items, if possible.

value='<string>'

The value of the currently selected item's 'value' attribute, which is displayed.

If the attribute is specified, the item whose 'value' attribute matches the 'comboBox' element's 'value' attribute is the initially-selected item.

If the attribute is not specified, the item whose 'data' attribute matches the 'comboBox' element's 'name' attribute is the initially-selected item.

If neither 'value' nor 'name' is specified, and 'editable' is set to 'false', the first item in the list is the initially-selected item.

If neither 'value' nor 'name' is specified, and 'editable' is set to 'true', there is no initially-selected item.

data='<string>'

The value of the currently selected item's 'name' attribute, which is not displayed.

If the 'value' attribute is specified, this attribute is not used to specify the initially-selected item.

If the attribute is specified, and 'value' is not, the item whose 'name' attribute matches the 'comboBox' element's 'name' attribute is the initially-selected item.

If neither 'name' nor 'value' is specified, and 'editable' is set to 'false', the first item in the list is the initially-selected item.

If neither 'name' nor 'value' is specified, and 'editable' is set to 'true', there is no initially-selected item.

sort="(ascending | descending | none)"

The type of sorting to be done on the items in the list.

If the 'sort' attribute is not specified, the default is 'none'.

Skin template (composite):

```
<?xml version="1.0"?><svg xmlns:dsvg="http://www.corel.com/schemas/2002/dSVG" xmlns:xlink="http://www.w3.org/1999/xlink"><g id=" "><use id="TextBoxSkin" xlink:href=" " x=" " y=" "/><use id="ButtonSkin" xlink:href=" " x=" " y=" "/><use id="DropDownSkin" xlink:href=" " x=" " y=" "/><g id="label"><text id="skinComboBoxDefault_bodyText" x=" " y=" "></text>
</g>
<g>
</svg>
```

Figure 14:
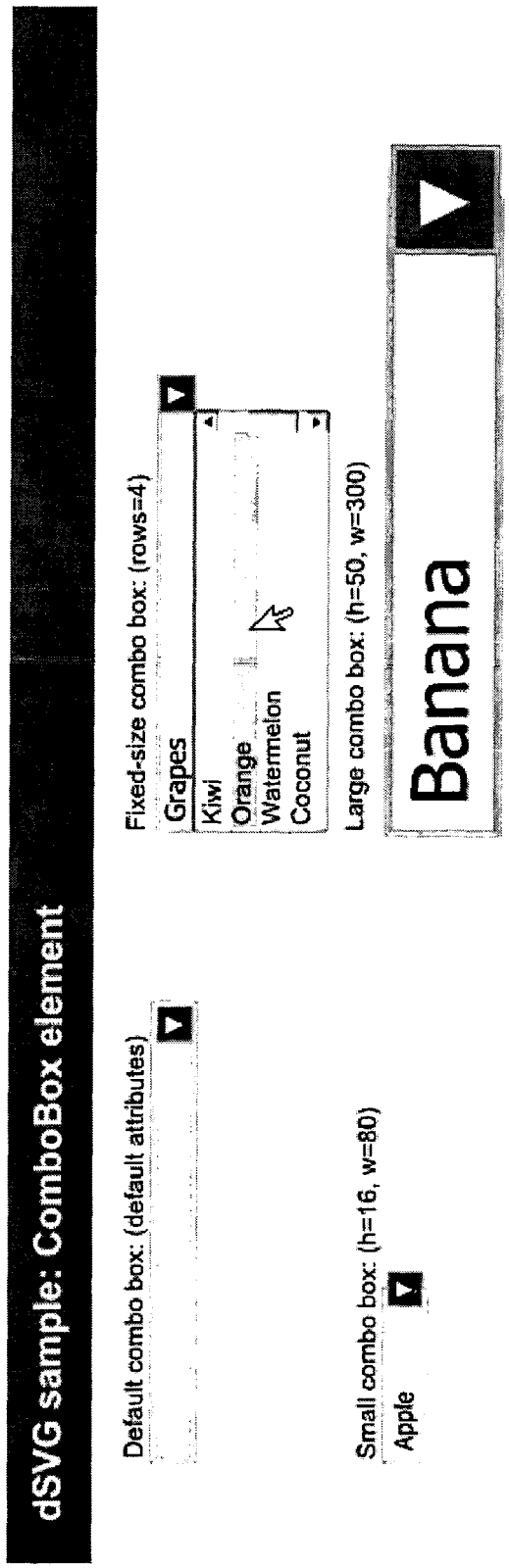
FIG. 14 shows a screen shot of an example of a comboBox element, in accordance with the user interface control system.

FIG. 14 show four comboBoxes of various sizes, with no associated behaviors. In this example, the default combo box has 3 child item elements: Apple, Banana, Grapes. The combo box in this example displays a maximum of 4 items. If the number of items exceeds 4, a scrollbar is enabled. The size of a control is changed by specifying new values for the height and width. The example is provided below:

```
<?xml version="1.0" standalone="no"?>
<!DOCTYPE svg SYSTEM "./SVGdSVG.dtd">
<svg xmlns:dsvg="http://www.corel.com/schemas/2002/dSVG11"
xmlns:xlink="http://www.w3.org/1999/xlink"
height="450px" width="744px"
onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/combobox.js"/>
    <script type="text/ecmascript" xlink:href="dsvg11/textbox.js"/>
    <script type="text/ecmascript" xlink:href="dsvg11/button.js"/>
    <script type="text/ecmascript" xlink:href="dsvg11/contextMenu.js"/>
    <script type="text/ecmascript" xlink:href="dsvg11/slider.js"/>
    <script type="text/ecmascript" xlink:href="dsvg11/listBox.js"/>
    <script type="text/ecmascript" xlink:href="dsvg11/scrollbar.js"/>
    <!-- Adding Template -->
    <g id="template">
    <rect height="40" width="744" y="0" x="0" fill="#5f86B1" id="rect_Title"/>
    <text y="25" x="20" font-weight="bold" font-size="18" fill="white" id="TITLE">dSVG sample: ComboBox element</text>
    <line y2="350" x2="744" y1="350" opacity="1.0" stroke-width="2" stroke="#5F86B1" fill="#5F86B1" id="bottomLine"/>
    <text y="370" x="20" font-size="12" id="defaut_ex">Default combo box—The default combo box has 3 child item elements: Apple, Banana, Grapes.</text>
    <text y="395" x="20" font-size="12" id="small_ex">Fixed-size combo box—This combo box displays a maximum of 4 items. If the number of items exceeds 4, a scrollbar is enabled.</text>
    <text y="420" x="20" font-size="12" id="large_ex">Small and large combo boxes—Change the size of a control by specifying new values for the height and width.</text>
    <text y="340" x="20" font-weight="bold" font-size="10" fill="black" id="Note">*Note: The red outlines are not part of the controls. They are used to identify the dimensions for each control.</text>
    <g>
    <!-- adding controls -->
    <dsvg:comboBox selected="false"
xlink:href="dsvg11/skinComboBox_Composite.svg#skinComboBox"
autoScale="true" disabled="false" rows="4" height="17" width="217" y="70" x="50" label="Default combo box: (default attributes)" id="comboBox_default"><dsvg:item value="Apple" data="plu_1" id="item_1"/><dsvg:item value="Banana" data="plu_2" id="item_2"/><dsvg:item value="Grapes" data="plu_3" id="item_3"/>
    </dsvg:comboBox>
    <rect height="21" width="221" y="68" x="48" stroke="red" fill="none" id="rect_default"/>
    <dsvg:comboBox selected="false"
xlink:href="dsvg11/skinComboBox_Composite.svg#skinComboBox"
autoScale="true" disabled="false" editable="true" rows="4" height="17" width="217" y="70" x="350" label="Fixed-size combo box: (rows=4)" id="comboBox_fixed">
        <dsvg:item value="Apple" data="plu_1" id="item_1">
            <dsvg:itemData value="red" name="color"/>
            <dsvg:itemData value="$1.27" name="price"/>
        </dsvg:item>
        <dsvg:item value="Banana" data="plu_2" id="item_2">
            <dsvg:itemData value="yellow" name="color"/>
            <dsvg:itemData value="$0.59" name="price"/>
        </dsvg: item>
        <dsvg:item value="Grapes" data="plu_3" id="item_3">
            <dsvg:itemData value="purple" name="color"/>
            <dsvg: itemData value="$2.19" name="price"/>
```

```
</dsvg:item>
<dsvg:item value="Kiwi" data="plu_4" id="item_4">
    <dsvg:itemData value="brown" name="color"/>
    <dsvg:itemData value="$0.89" name="price"/>
</dsvg:item>
<dsvg:item value="Orange" data="plu_5" id="item_5">
    <dsvg:itemData value="orange" name="color"/>
    <dsvg:itemData value="$1.99" name="price"/>
</dsvg:item>
<dsvg:item value="Watermelon" data="plu_6" id="item_6">
    <dsvg:itemData value="green" name="color"/>
    <dsvg:itemData value="$2.39" name="price"/>
</dsvg:item>
<dsvg:item value="Coconut" data="plu_7" id="item_7">
    <dsvg:itemData value="brown" name="color"/>
    <dsvg:itemData value="$3.99" name="price"/>
</dsvg:item>
<dsvg:item value="Peach" data="plu_8" id="item_8">
    <dsvg:itemData value="peach" name="color"/>
    <dsvg:itemData value="$2.39" name="price"/>
</dsvg:item>
</dsvg:comboBox>
<dsvg:comboBox selected="false"
xlink:href="dsvg
11/skinComboBox_Composite.svg#skinComboBox"
autoScale="true" disabled="false" height="16" width="80"
y="180" x="50" label="Small combo box: (h=16, w=80)"
id="comboBox_small"><dsvg:item value="Apple"
data="plu_1" id="item_1"/><dsvg:item value="Banana"
data="plu_2" id="item_2"/><dsvg:item value="Grapes"
data="plu_3" id="item_3"/>
</dsvg:comboBox>
<rect height="20" width="84" y="178" x="48"
stroke="red" fill="none" id="rect_small"/>
<dsvg:comboBox selected="false"
xlink:href="dsvg11/
skinComboBox_Composite.svg#skinComboBox"
autoScale="true" disabled="false" height="50"
width="300" y="180" x="350" label="Large combo box:
(h=50, w=300)" id="comboBox_large"><dsvg:item
value="Apple" data="plu_1" id="item_1"I><dsvg:item
value="Banana" data="plu_2"
    id="item 2"/>
</dsvg:comboBox>
<rect height="54" width="304" y="178" x="348"
stroke="red" fill="none" id="rect_large"/>
</svg>
```

The 'contextMenu' element

The 'contextMenu' element defines a menu that is associated with a particular element or group of elements via the 'contextMenu' attribute. The contextMenu appears at the position of the mouse pointer when right-clicking on an element.

```
<!ENTITY % contextMenuExt " " >
<!ELEMENT contextMenu (dsvg:state|%behaviors;|dsvg:item)*>
<!ATTLIST contextMenu
%stdDSVGAttrs;
%stdUIAttrs;
value          %Text;       #IMPLIED
data           %Text;       #IMPLIED
cols           %Integer;    #IMPLIED
colSpace       %Integer;    #IMPLIED
```

-continued

```
eventSource    ID;          #IMPLIED
sort           %Text;       #IMPLIED >
```

Attribute definitions:
cols="<integer>"
  The number of columns to be displayed in the contextMenu.
colSpace="<integer>"
  The number of user units to separate each column.\
value='<string>'
  The value of the selected item's 'value' attribute, which is displayed.
data='<string>'
  The value of the selected item's 'data' attribute, which is not displayed.
eventSource=name
  The ID of the element that triggered the contextMenu to appear. This attribute gets automatically populated for reference purposes. It should never be set via markup. If the attribute is not specified, the default is 'true'.
sort="(ascending | descending | none)"
  The type of sorting to be done on the items in the list.
  If the 'sort' attribute is not specified, the default is 'none'.
Skin template:

```
<?xml version="1.0"?>
<svg xmlns:dsvg="http://www.corel.com/schemas/2002/
dSVG"><g id=" "><g id="skinContextMenu_top"
display="all"></g><g id="skinContextMenu_middle"
display="all"><text id="label" x=" " y=" "></text></g><g
id="skinContextMenu_middle_hover"
display="none"><text id="label" x=" " y=" "></text>
</g><g id="skinContextMenu_middle_selected"
display="none"><text id="label" x=" " y=" "></text>
</g><g id="skinContextMenu_bottom" display="all">
    </g>
    </g>
</svg>
```

Figure 15:
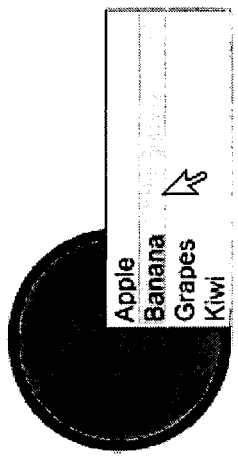
FIG. 15 shows a screen shot of an example of a contextMenu element, in accordance with the user interface control system.

FIG. 15 shows a contextMenu associated to a circle, with no associated behaviors. In this example, a right-click within the circle displays the context menu by default. The lists consists of items which can be added directly as child elements of the context menu. The context menu is associated with the circle by adding a contextMenu attribute to the circle which references the context menu. The example is provided below:

```
<?xml version="1.0" standalone="no"?>
<!DOCTYPE svg SYSTEM "./SVGdSVG.dtd">
<svg xmlns:xlink="http://www.w3.org/1999/xlink"
xmlns:dsvg="http://www.corel.com/schemas/2002/
dSVG11" height="450px"
width="744px" onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg 11/constraint.js"/>
    <script type="text/ecmascript" xlink:href="dsvg11/contextMenu.js"/>
    <script type="text/ecmascript" xlink:href="dsvg 11/attributeContextMenu.js"/>
    <script type="text/ecmascript" xlink:href="dsvg 11/attributeNativeContextMenu.js"/>
    <script type="text/ecmascript" xlink:href="dsvg 11/listbox.js"/>
```

```
<!--Begin Template-->
<g id="template">
    <rect height="40" width="744" y="0" x="0"
        fill="#5f86B1" id="rect_Title"/>
    <text y="25" x="20" font-weight="bold" font-size="18"
        fill="white" id="TITLE">dSVG sample: ContextMenu
        element</text>
    <line y2="350" x2="744" y1="350" opacity="1.0"
        stroke-width="2" stroke="#5F86B1" fill="#5F86B1"
        id="bottomLine"/>
    <text y="370" x="20" font-size="12"
        id="defaut_ex">Default context menu—Right-click
        within the circle to display the context menu.</text>
    <text y="395" x="20" font-size="12"
        id="additional_ex">The list consists of items which can
        be added directly as child elements of the context
        menu.</text>
    <text y="420" x="20" font-size="12" id="Final_ex">The
        context menu is associated with the circle by adding a
        dsvg:contextMenu attribute to the circle which refer-
        ences the context menu.</text>
    <text y="60" x="20" id="regular">Default Context
        Menu:</text>
    <text y="60" x="150" font-size="10" id="regular_desc">
        (default attributes)—right-click within the circle and the
        Context Menu should appear.</text>
</g>
<!--adding the controls-->
<dsvg:contextMenu
xlink:href="dsvg11/
skinContextMenu_Default.svg#skinContextMenu"
autoScale="true"    label="Red    Circle    Menu"
id="contextMenu1">
    <dsvg:item value="Apple" data="plu_1" id="item_1">
        <dsvg:itemData value="red" name="color"/>
        <dsvg:itemData value="$1.27" name="price"/>
    </dsvg:item>
    <dsvg:item value="Banana" data="plu_2" id="item_
        2">
        <dsvg:itemData value="yellow" name="color"/>
        <dsvg:itemData value="$0.59" name="price"/>
    </dsvg:item>
    <dsvg:item value="Grapes" data="plu_3" id="item_3">
        <dsvg:itemData value="purple" name="color"/>
        <dsvg:itemData value="$2.19" name="price"/>
    </dsvg:item>
    <dsvg:item value="Kiwi" data="plu_4" id="item_4">
        <dsvg:itemData value="brown" name="color"/>
        <dsvg:itemData value="$0.89" name="price"/>
    </dsvg: item>
</dsvg:contextMenu>
<circle    dsvg:contextMenu="contextMenu1"    r="50"
cy="130" cx="130" stroke-width="5" stroke="darkblue"
fill="#5f86B1" id="circle_blue"/>
</svg>
```

The 'date' element

The 'date' element defines properties for a particular date for its parent calendar control. It must be a child of a 'calendar' element.

Attribute definitions:

id="name"

Standard XML attribute for assigning a unique name to an element.

year="integer"

Specifies the year for this particular date.

month="integer"

Specifies the month for this particular date.

day="integer"

Specifies the day for this particular date.

name="string"

Specifies a hidden string to associate with this particular date (which, unlike 'id', does not need to be unique). e.g. "HOLIDAY".

selectable="(true | false)"

Specifies whether this particular date is selectable (true) or not (false).

label="string"

Specifies the text label to be displayed for this particular date.

The 'dialog' element

The 'dialog' element defines a window container, specifically for the purpose of collecting data which can be accepted or cancelled. It has inherent Accept/OK, Cancel, Help and Info buttons.

Attribute definitions:

showTitle="(true | false)"

Specifies whether to display a titlebar (true) or not (false). If true, the title is obtained from the 'label' attribute.

showMinimizeButton="(true | false)"

Specifies whether to display the minimize button or not.

showMaximizeButton="(true | false)"

Specifies whether to display the maximize button or not.

showCloseButton="(true | false)"

Specifies whether to display the close button or not.

showAcceptButton="(true | false)"

Specifies whether to display the Accept/OK button or not.

showCancelButton="(true | false)"

Specifies whether to display the Cancel button or not.

showHelpButton="(true | false)"

Specifies whether to display the Help button or not.

showInfoButton="(true | false)"

Specifies whether to display the Information button or not.

modal="(true | false)"

Specifies whether the window is modal (true) or modeless (false).

movable="(true | false)"

Specifies whether the window is movable (true) by clicking on the titlebar and dragging, or not (false).

state="(minimized | maximized | normal)"

Specifies the initial state of the window. If the Minimize or Maximize buttons are pressed, this attribute is automatically updated.

The 'frame' element

The 'frame' element defines a container element.

Attribute definitions:

xlink:href="<uri>"

Specifies the document to display within the 'frame' container.

The 'item' element

The 'item' element defines a selectable item in a context-Menu, comboBox, listBox or listView control.

```
<!ENTITY % itemExt " " >
<!ELEMENT item (dsvg:itemData)*>
<!ATTLIST item
    id       ID;       #IMPLIED
    value    %Text;    #IMPLIED
    data     %Text;    #IMPLIED >
```

Attribute definitions:

id="name"

Standard XML attribute for assigning a unique name to an element.

value='<string>'

The value of the selected item's 'value' attribute, which is displayed.

data='<string>'

The value of the selected item's 'data' attribute, which is not displayed.

The 'itemData' element

The 'itemData' element defines extra information for an item in a contextMenu, comboBox, listBox or listView control.

```
<!ENTITY % itemDataExt " " >
<!ELEMENT itemData (dsvg:itemData)*>
<!ATTLIST itemData
    id      ID;         #IMPLIED
    value   %Text;      #IMPLIED
    name    %Text;      #IMPLIED >
```

Attribute definitions:

id="name"

Standard XML attribute for assigning a unique name to an element.

value='<string>'

The value of the selected item's 'value' attribute, which is displayed.

data='<string>'

The value of the selected item's 'data' attribute, which is not displayed.

The 'listBox' element

The 'listBox' element defines a single-column list of selectable items.

```
<!ENTITY % listBoxMenuExt " " >
<!ELEMENT listBox (dsvg:state|%behaviors;|dsvg:item)*>
<!ATTLIST listBox
    %stdDSVGAttrs;
    %stdUIAttrs;
    rows    %Integer;   #IMPLIED
    value   %Text;      #IMPLIED
    data    %Text;      #IMPLIED
    sort    %Text;      #IMPLIED >
```

Attribute definitions:

rows="<integer>"

The number of rows to be displayed in the listBox.

value='<string>'

If an 'item' child element exists with a matching 'value' attribute, that item is considered to be selected. The 'data' attribute is automatically set to match the 'data' attribute of that 'item' element, overriding the existing 'data' attribute, if provided. When an item is selected, this attribute is automatically updated to match the value of the selected item's 'value' attribute. If this attribute is modified, the item with a matching 'value' attribute is selected.

data='<string>'

If an 'item' child element exists with a matching 'data' attribute, and the listView element's 'value' attribute is not provided, that item is considered to be selected. The 'value' attribute is automatically set to match the 'value' attribute of that 'item' element. When an item is selected, this attribute is automatically updated to match the value of the selected item's 'data' attribute. If this attribute is modified, the item with a matching 'data' attribute is selected.

sort="(ascending | descending | none)"

The type of sorting to be done on the items in the list.

If the 'sort' attribute is not specified, the default is 'none'.

Skin template:

```
<?xml version="1.0"?><svg xmlns:dsvg="http://www.corel.com/schemas/2002/dSVG"><g id=" "><g id="skinContextMenu_top" display="all"></g><g id="skinContextMenu_middle" display="all"></g><g id="skinContextMenu_middle_hover" display="none"></g><g id="skinContextMenu_middle_selected" display="none"></g><g id="skinContextMenu_bottom" display="all">
    </g>
    </g>
</svg>
```

Figure 16:
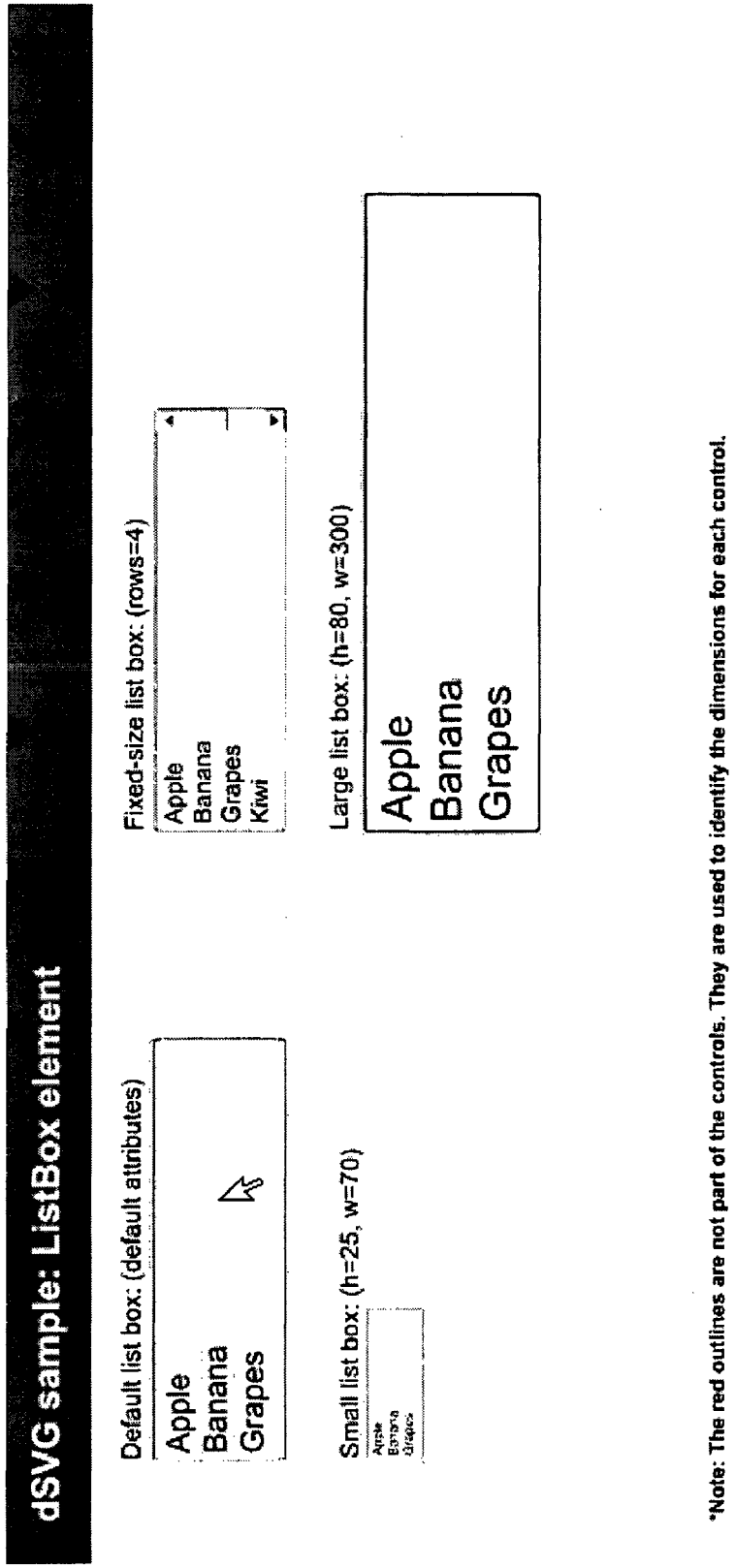
FIG. 16 shows a screen shot of an example of a listBox element, in accordance with the user interface control system.

FIG. 16 show a listBox with three items, with no associated behaviors. In this example, the list box has 3 child items elements by default: Apple, Banana, Grapes. The list box in this example displays a maximum of 4 items. If the number of items exceeds 4, a scrollbar is enabled. The size of a control is changed by specifying new values for the height and width. The example is provided below:

```
<?xml version="1.0" standalone="no"?>
<!DOCTYPE svg SYSTEM "./SVGdSVG.dtd">
<svg xmlns:dsvg="http://www.corel.com/schemas/2002/dSVG11"
    xmlns:xlink="http://www.w3.org/1999/xlink"
    height="450px" width="744px"
    onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/listbox.js"/>
    <script type="text/ecmascript" xlink:href="dsvg11/button.js"/>
    <script type="text/ecmascript" xlink:href="dsvg11/contextMenu.js"/>
    <script type="text/ecmascript" xlink:href="dsvg11/scrollbar.js"/>
    <script type="text/ecmascript" xlink:href="dsvg11/slider.js"/><!--Adding Template-->
    <g id="template">
    <rect height="40" width="744" y="0" x="0" fill="#5f86B1" id="rect_Title"/>
    <text y="25" x="20" font-weight="bold" font-size="18" fill="white" id="TITLE">dSVG sample: ListBox element</text>
    <line y2="350" x2="744" y1="350" opacity="1.0" stroke-width="2" stroke="#5F86B1" fill="#5F86B1" id="bottomLine"/>
    <text y="370" x="20" font-size="12" id="defaut_ex">Default list box—This list box has 3 child item elements: Apple, Banana, Grapes.
    </text>
    <text y="395" x="20" font-size="12" id="fixed_ex">Fixed-size list box—This list box displays a maximum of 4 items. If the number of items exceeds 4, a scrollbar is enabled.
```

```
</text>
<text y="420" x="20" font-size="12"
    id="large_ex">Small and large list boxes—Change the
    size of a control by specifying new values for the height
    and width.
</text>
<text y="340" x="20" font-weight="bold" font-size="10"
    fill="black" id="Note">*Note: The red outlines are not
    part of the controls. They are used to identify the dimen-
    sions for each control.
</text>
</g><!--adding controls-->
<dsvg:listBox          xlink:href="dsvg11/
skinListBox_Composite.svg#skinListBox"
autoScale="true" height="60" width="198" y="70" x="50"
label="Default    list    box:    (default    attributes)"
id="listbox_default">
    <dsvg:item value="Apple" data="plu_1" id="item_1">
    </dsvg:item>
    <dsvg:item value="Banana" data="plu_2" id="item_
        2">
    </dsvg:item>
    <dsvg:item value="Grapes" data="plu_3" id="item_3">
    </dsvg:item>
</dsvg:listBox>
<rect height="64" width="202" y="68" x="48" opac-
    ity="0.5" stroke="red" fill="none" id="rect_default"/>
<dsvg:listBox           xlink:href="dsvg11/
skinListBox_Composite.svg#skinListBox"
autoScale="true" rows="4" height="60" width="198"
y="70" x="350" label="Fixed-size list box: (rows=4)"
id="listbox_fixed">
    <dsvg:item value="Apple" data="plu_1" id="item_1">
    </dsvg:item>
    <dsvg:item value="Banana" data="plu_2" id="item_
        2">
    </dsvg:item>
    <dsvg:item value="Grapes" data="plu_3" id="item_3">
    </dsvg:item>
    <dsvg:item value="Kiwi" data="plu_4" id="item_4">
    </dsvg:item>
    <dsvg:item value="Orange" data="plu_5" id="item_
        5">
    <dsvg:item>
    <dsvg:item    value="Watermelon"    data="plu_6"
        id="item_6">
    </dsvg:item>
    <dsvg:item value="Coconut" data="plu_7" id="item_
        7">
    </dsvg: item>
    <dsvg:item value="Peach" data="plu_8" id="item_8">
    </dsvg:item>
</dsvg:listBox>
<dsvg:listBox     selected="true"     xlink:href="dsvg11/
skinListBox_Composite.svg#skinListBox"
autoScale="true" disabled="false" value="val1" rows="4"
height="25" width="70" y="170" x="50" label="Small list
box: (h=25, w=70)" id="listbox_small">
    <dsvg:item value="Apple" data="plu_1" id="item_1">
    <dsvg:item>
    <dsvg:item value="Banana" data="plu_2" id="item_
        2">
    </dsvg:item>
    <dsvg:item value="Grapes" data="plu_3" id="item_3">
    </dsvg:item>
</dsvg:listBox>
<rect height="29" width="74" y="168" x="48" opac-
    ity="0.5" stroke="red" fill="none" id="rect_small"/>
<dsvg:listBox     selected="true"     xlink:href="dsvg11/
skinListBox_Composite.svg#skinListBox"
autoScale="true"    disabled="false"    height="80"
width="300" y="170" x="350" label="Large list box: (h=80,
w=300)" id="listbox_large">
    <dsvg:item value="Apple" data="plu_1" id="item_1">
    </dsvg:item>
    <dsvg:item value="Banana" data="plu_2" id="item_
        2">
    </dsvg:item>
    <dsvg:item value="Grapes" data="plu_3" id="item_3">
    </dsvg:item>
</dsvg:listBox>
<rect height="84" width="304" y="168" x="348" opac-
    ity="0.5" stroke="red" fill="none" id="rect_large"/>
</svg>
```

The 'listView' element

The 'listView' element defines a multi-column list of selectable items.

```
<!ENTITY % listViewMenuExt " " >
<!ELEMENT listView (dsvg:state|%behaviors;|dsvg:item)*>
<!ATTLIST listView
%stdDSVGAttrs;
%stdUIAttrs;
rows          %Integer;          #IMPLIED
cols          %Integer;          #IMPLIED
colSpace      %Integer;          #IMPLIED
value         %Text;             #IMPLIED
data          %Text;             #IMPLIED
sort          %Text;             #IMPLIED >
```

Attribute definitions:

rows="<integer>"

The number of rows to be displayed in the listBox.

cols="<integer>"

The number of columns to be displayed in the listBox.

colSpace="<integer>"

The number of user units to separate each column.

value='<string>'

If an 'item' child element exists with a matching 'value' attribute, that item is considered to be selected, in which case the 'data' attribute is automatically set to match the 'data' attribute of that 'item' element, overriding the existing 'data' attribute, if provided. When an item is selected, this attribute is automatically updated to match the value of the selected item's 'value' attribute. If this attribute is modified, the item with a matching 'value' attribute is selected.

data='<string>'

If an 'item' child element exists with a matching 'data' attribute, and the listView element's 'value' attribute is not provided, that item is considered to be selected, in which case the 'value' attribute is automatically set to match the 'value' attribute of that 'item' element. When an item is selected, this attribute is automatically updated to match the value of the selected item's 'data' attribute. If this attribute is modified, the item with a matching 'data' attribute is selected.

sort='<string>'

If an 'item' child element exists with a matching 'data' attribute, and the listView element's 'value' attribute is not provided, that item is considered to be selected, in which case the 'value' attribute is automatically set to match the 'value' attribute of that 'item' element. When an item is selected, this attribute is automatically updated to match the value of the selected item's 'data' attribute. If this attribute is modified, the item with a matching 'data' attribute is selected.
sort="(ascending | descending | none)"
 The type of sorting to be done on the items in the list.
 If the 'sort' attribute is not specified, the default is 'none'.
Skin template:

```
<?xml version="1.0"?><svg xmlns:dsvg="http://www.corel.com/schemas/2002/dSVG" xmlns:xlink="http://www.w3.org/1999/xlink"><g id=" "><use id="MenuSkin" xlink:href=" " x=" " y=" "/><use id="ScrollSkin" xlink:href=" " x=" " y=" "/><g id="label"><text id="skinListBox_label" x=" " y=" ">
</text>
  </g>
  </g>
</svg>
```

Figure 17:
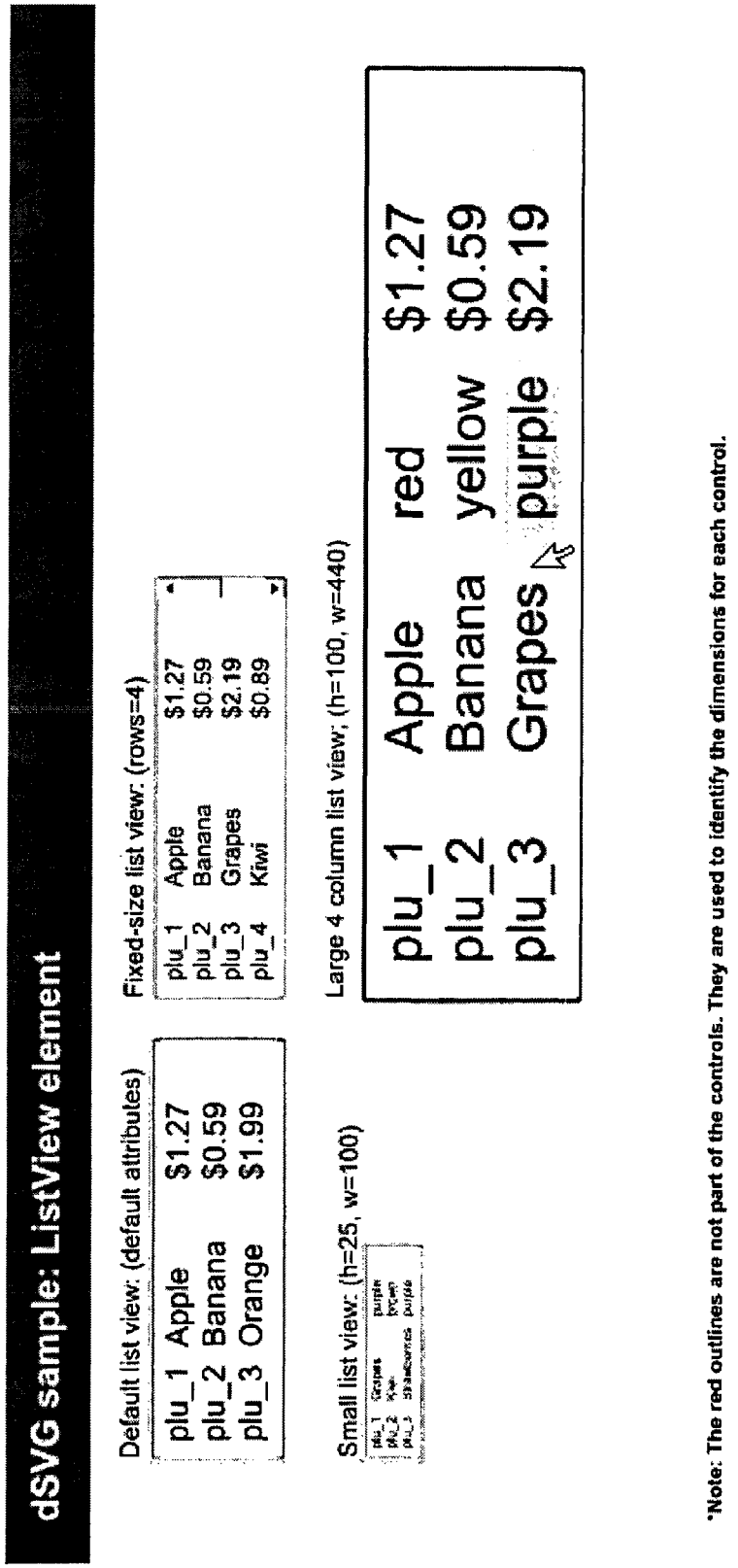
FIG. 17 shows a screen shot of an example of a listView element, in accordance with the user interface control system.

FIG. 17 shows a listView with three rows and 3 columns, with no associated behaviors. In this example, the list view has 3 child elements by default: Apple, Banana, Grapes. The list view in this example displays a maximum of 4 items. If the number of items exceeds 4, a scrollbar is enabled. The size of a control is changed by specifying new values for the height and width. The example is provided below:

```
<?xml version="1.0" standalone="no"?>
<!DOCTYPE svg SYSTEM "./SVGdSVG.dtd">
<svg xmlns:dsvg="http://www.corel.com/schemas/2002/dSVG11"
xmlns:xlink="http://www.w3.org/1999/xlink"
height="450px" width="744px"
onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/listview.js"/>
    <script type="text/ecmascript" xlink:href="dsvg11/scrollbar.js"/>
    <script type="text/ecmascript" xlink:href="dsvg11/listbox.js"/>
    <script type="text/ecmascript" xlink:href="dsvg11/slider.js"/>
    <script type="text/ecmascript" xlink:href="dsvg11/button.js"/>
    <script type="text/ecmascript" xlink:href="dsvg11/contextMenu.js"/>
    <!-- Adding Template -->
    <g id="template">
    <rect height="40" width="744" y="0" x="0"
        fill="#5f86B1" id="rect_Title"/>
    <text y="25" x="20" font-weight="bold" font-size="18"
        fill="white" id="TITLE">dSVG sample: ListView element
    </text>
    <line y2="350" x2="744" y1="350" opacity="1.0"
        stroke-width="2" stroke="#5F86B1" fill="#5F86B1"
        id="bottomLine"/>
    <text y="370" x="20" font-size="12"
        id="defaut_ex">Default list view—This list view has 3
        child item elements: Apple, Banana, and Orange.
    </text>
    <text y="395" x="20" font-size="12"
        id="fixed_ex">Fixed-size list view—This list view displays a maximum of 4 items. If the number of items exceeds 4, a scrollbar is enabled.
    </text>
    <text y="420" x="20" font-size="12"
        id="large_ex">Small and large list views—Change the size of the control by specifying new values for the height and width attributes.
    </text>
    <text y="340" x="20" font-weight="bold" font-size="10"
        fill="black" id="Note">*Note: The red outlines are not part of the controls. They are used to identify the dimensions for each control.
    </text>
    </g>
    <!-- adding controls -->
    <dsvg:listView selected="false"
xlink:href="dsvg11/skinListView_Composite.svg#skinListView"
autoScale="true" disabled="false" colSpace="5;50;130"
cols="data;value;price" height="60" width="198" y="70"
x="50" label="Default list view: (default attributes)"
id="default">
        <dsvg:item value="Apple" data="plu_1" id="item_1">
            <dsvg:itemData value="red" name="color"/>
            <dsvg:itemData value="$1.27" name="price"/>
        </dsvg:item>
        <dsvg:item value="Banana" data="plu_2" id="item_2">
            <dsvg:itemData value="yellow" name="color"/>
            <dsvg:itemData value="$0.59" name="price"/>
        </dsvg:item>
        <dsvg:item value="Orange" data="plu_3" id="item_3">
            <dsvg:itemData value="orange" name="color"/>
            <dsvg:itemData value="$1.99" name="price"/>
        </dsvg: item>
    </dsvg:listView>
    <rect height="64" width="202" y="68" x="48"
stroke="red" fill="none" id="rect_default"/>
    <dsvg:listView selected="false"
xlink:href="dsvg11/skinListView_Composite.svg#skinListView"
autoScale="true" disabled="false" colSpace="5;50;130"
cols="data;value;price" rows="4" height="60" width="198"
y="70" x="270" label="Fixed-size list view: (rows=4)"
id="fixed">
        <dsvg:item value="Apple" data="plu_1" id="item_1">
            <dsvg:itemData value="red" name="color"/>
            <dsvg:itemData value="$1.27" name="price"/>
        </dsvg:item>
        <dsvg:item value="Banana" data="plu_2" id="item_2">
            <dsvg:itemData value="yellow" name="color"/>
            <dsvg:itemData value="$0.59" name="price"/>
        </dsvg:item>
        <dsvg:item value="Grapes" data="plu_3" id="item_3">
            <dsvg:itemData value="purple" name="color"/>
            <dsvg:itemData value="$2.19" name="price"/>
        </dsvg:item>
        <dsvg:item value="Kiwi" data="plu_4" id="item_4">
            <dsvg:itemData value="brown" name="color"/>
            <dsvg:itemData value="$0.89" name="price"/>
        </dsvg:item>
        <dsvg:item value="Orange" data="plu_5" id="item_5">
            <dsvg:itemData value="orange" name="color"/>
            <dsvg:itemData value="$1.99" name="price"/>
        </dsvg:item>
        <dsvg:item value="Watermelon" data="plu_6" id="item_6">
```

```
      <dsvg:itemData value="green" name="color"/>
      <dsvg:itemData value="$2.39" name="price"/>
    </dsvg:item>
    <dsvg:item value="Coconut" data="plu_7" id="item_
        7">
      <dsvg:itemData value="brown" name="color"/>
      <dsvg:itemData value="$3.99" name="price"/>
    </dsvg:item>
    <dsvg:item value="Peach" data="plu_8" id="item_8">
      <dsvg:itemData value="peach" name="color"/>
      <dsvg:itemData value="$2.39" name="price"/>
    </dsvg:item>
    <dsvg:item value="Mango" data="plu_9" id="item_9">
      <dsvg:itemData value="dark red" name="color"/>
      <dsvg:itemData value="$2.09" name="price"/>
    </dsvg:item>
  </dsvg:listView>
  <dsvg:listView selected="false" xlink:href="dsvg11/
      skinListView_Composite.svg#skinListView"
      autoScale="true" disabled="false" colSpace="5;50;130"
      cols="data;value;color" height="25" width="100" y="170"
      x="50" label="Small list view: (h=25, w=100)"
      id="listview_small">
    <dsvg:item value="Grapes" data="plu_1" id="item_1">
      <dsvg:itemData value="purple" name="color"/>
      <dsvg:itemData value="2.19" name="price"/>
    </dsvg:item>
    <dsvg:item value="Kiwi" data="plu_2" id="item_2">
      <dsvg:itemData value="brown" name="color"/>
      <dsvg:itemData value="0.89" name="price"/>
    </dsvg:item>
    <dsvg:item value="Strawberries" data="plu_3"
        id="item_3">
      <dsvg:itemData value="purple" name="color"/>
      <dsvg:itemData value="1.99" name="price"/>
    </dsvg:item>
  </dsvg:listView>
  <rect height="29" width="104" y="168" x="48"
      stroke="red" fill="none" id="rect_small"/>
  <dsvg:listView selected="false" xlink:href="dsvg11/
      skinListView_Composite.svg#skinListView"
      autoScale="true" disabled="false" colSpace="5;50;100;
      140" cols="data;value;color;price" height="100"
      width="440" y="170" x="270" label="Large 4 column list
      view; (h=100, w=440)" id="listview_large">
    <dsvg:item value="Apple" data="plu_1" id="item_1">
      <dsvg:itemData value="red" name="color"/>
      <dsvg:itemData value="$1.27" name="price"/>
    </dsvg:item>
    <dsvg:item value="Banana" data="plu_2" id="item_
        2">
      <dsvg:itemData value="yellow" name="color"/>
      <dsvg:itemData value="$0.59" name="price"/>
    </dsvg:item>
    <dsvg:item value="Grapes" data="plu_3" id="item_3">
      <dsvg:itemData value="purple" name="color"/>
      <dsvg:itemData value="$2.19" name="price"/>
    </dsvg:item>
  </dsvg:listView>
  <rect height="104" width="444" y="168" x="268"
      stroke="red" fill="none" id="rect_large"/>
</svg>
```

The 'menuBar' element

The 'menuBar' element defines a container for menu items. The expected children are 'item' elements.

Attribute definitions: %standard attributes %

The standard attributes, such as id, label, etc.

value="string"

Thevalue of the currently selected child 'item' element's 'label' attribute. This represents the initial item selected. When a new item is selected, the 'value' attribute is automatically updated to reflect the 'label' attribute of the selected item.

name="string"

The value of the currently selected child 'item' element's 'name' attribute, which is not displayed.

hideGrippy="(true | false)"

Specifies whether to hide the grippy (true) or not (false).

The 'menuSeparator' element

The 'menuSeparator' element defines a separator to be displayed between 'item' elements. It can only exist as a child of comboBox, listBox, listView, contextMenu or menuBar.

Attribute definitions:

id="name"

Standard XML attribute for assigning a unique name to an element. xlink:href="<uri>"

A reference to the parent element of a graphic, stored either interally in the <defs>block or in an external file, to be displayed for that item. If not provided (which is normally the case), its skin is obtained from the skin of the parent UI control.

The 'messageBox' element

The 'messageBox' element defines a simple dialog with a message and a boolean response buttons. It can have action elements as children, but any graphical child elements will be ignored.

Attribute definitions:

showTitle="(true | false)"

Specifies whether to display a titlebar (true) or not (false). If true, the title is obtained from the 'label' attribute.

showYesButton="(true | false)"

Specifies whether to display the Yes button or not.

showNoButton="(true | false)"

Specifies whether to display the No button or not.

movable="(true | false)"

Specifies whether the window is movable (true) by clicking on the titlebar and dragging, or not (false).

label="string"

Specifies the message to display within the message box. labelYes="string"

Specifies the label of the Yes button. The default is "Yes". labelNo="string"

Specifies the label of the No button. The default is "No".

The 'radioButton' element

The 'radioButton' element defines a sticky/toggle button, belonging to a group of other radioButtons, that can be clicked to trigger an action. Only one radioButton per group can be selected. Selecting a radioButton that is already selected does nothing. Selecting a deselected radioButton automatically deselects the currently selected radioButton in the group.

<!ENTITY % radioButtonExt " ">
<!ELEMENT dsvg:radioButton (dsvg:state|%behaviors;)*>
<!ATTLIST dsvg:radioButton
%stdDSVGAttrs;
%stdUIAttrs;
selected % Boolean; #IMPLIED>

Attribute definitions:

selected="(true | false)"

Specifies the initial state of the radioButton as being checked (true) or unchecked (false). This attribute is automatically updated to reflect the current state of the control whenever the user clicks on the radioButton, so that its state can be referenced externally. If this attribute is modified, the control's state is updated to match.

If the attribute is not specified, the default is 'false'.

Skin template:

```
<?xml version="1.0"?>
<svg xmlns:dsvg="http://www.corel.com/schemas/2002/dSVG"
xmlns:xlink="http://www.w3.org/1999/xlink">
    <g id="">
    <g id="label">
        <text x=" " y=" "></text>
    </g>
    <g id="up" display="all"/>
    <g id="down" display="none"/>
    <g id="hover" display="none"/>
    <g id="focus" display="none"/> <g id="disabled" display="none"/>
    </g>
</svg>
```

Figure 18:
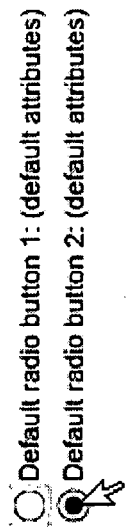
FIG. 18 shows a screen shot of an example of a radioButton element, in accordance with the user interface control system.

FIG. 18 shows two radioButtons belonging to the same group. In this example, default radio buttons 1 and 2 belong to the same group. The size of a control is changed by specifying new values for the height and width attributes. The default, small, and large radio buttons all belong to their own group. By default the group attribute is set to default. The example is provided below:

```
<?xml version="1.0" standalone="no"?>
<!DOCTYPE svg SYSTEM "./SVGdSVG.dtd">
<svg xmlns:dsvg="http://www.corel.com/schemas/2002/dSVG11"
xmlns:xlink="http://www.w3.org/1999/xlink"
height="450px" width="744px"
onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg 11/button.js"/>
    <!-- Adding Template -->
    id="template">
    <rect height="40" width="744" y="0" x="0" fill="#5f86B1" id="rect_Title"/>
    <text y="25" x="20" font-weight="bold" font-size="18" fill="white" id="TITLE">dSVG sample: SpinBox element
    </text>
    <line y2="350" x2="744" y1="350" opacity="1.0" stroke-width="2" stroke="#5F86B1" fill="#5F86B1" id="bottomLine"/>
    <text y="370" x="20" font-size="12" id="defaut_ex">Default, grouped radio buttons—Default radio buttons 1 and 2 belong to the same group.
    </text>
    <text y="395" x="20" font-size="12" id="small_ex">Small and large radio buttons—Change the size of a control by specifying new values for the height and width attributes.
    </text>
    <text y="420" x="20" font-size="12" id="large_ex">The default, small, and large radio buttons all belong to their own group. By default the group attribute is set to default.
    </text>
    <text y="340" x="20" font-weight="bold" font-size="10" fill="black" id="Note">*Note: The red outlines are not part of the controls. They are used to identify the dimensions for each control.
    </text>
    </g>
    <!-- adding controls -->
    <dsvg:radioButton xlink:href="dsvg11/skinRadioButton_Default.svg#skinRadioButton" autoScale="true" group="default" height="14" width="14" y="70" x="50" label="Default radio button 1: (default attributes)" id="default1"/>
    <rect height="18" width="18" y="68" x="48" stroke="red" fill="none" id="rect_default"/>
    <dsvg:radioButton xlink:href="dsvg11/skinRadioButton_Default.svg#skinRadioButton" autoScale="true" group="default" height="14" width="14" y="90" x="50" label="Default radio button 2: (default attributes)" id="default_2"/>
    <dsvg:radioButton xlink:href="dsvg11/skinRadioButton_Default.svg#skinRadioButton" autoScale="true" group="smallGroup" height="10" width="10" y="150" x="50" label="Small radio button: (h=10, w=10, group=smallGroup)" id="dsvgUniqueID_2"/>
    <rect height="14" width="14" y="148" x="48" stroke="red" fill="none" id="rect_small"/>
    <dsvg:radioButton xlink:href="dsvg11/skinRadioButton_Default.svg#skinRadioButton" autoScale="true" group="largeGroup" height="25" width="25" y="230" x="50" label="Large radio button: (h=25, w=25, group=largeGroup)" id="dsvgUniqueID_3"/>
    <rect height="29" width="29" y="228" x="48" stroke="red" fill="none" id="rect_large"/>
</svg>
```

The 'scrollbar' element

The 'scrollbar' element defines the vertical and horizontal scrollbars to be associated with its parent, usually a document or other UI container element, such as a <window> or <frame>.

Attribute definitions:

bars="(both | horizontal | vertical | none)"

Specifies whether a horizontal scrollbar (at the bottom), a vertical scrollbar (on the right) or both should appear when required.

The 'slider' element

The 'slider' element defines a slider control, used to select a value from a range of allowed values by dragging its 'thumb' along its track.

```
<!ENTITY % sliderExt " " >
<!ELEMENT dsvg:slider (dsvg:state|%behaviors;)* >
<!ATTLIST dsvg:slider
%stdDSVGAttrs;
%stdUIAttrs;
min              %Number;    #IMPLIED
max              %Number;    #IMPLIED
value            %Number;    #IMPLIED
increment        %Number;    #IMPLIED
pageIncrement    %Number;    #IMPLIED
ticksMajor       %Number;    #IMPLIED
ticksMinor       %Number;    #IMPLIED
continuousCallback %Boolean; 'false' >
```

Attribute definitions:

min="<number>"

The minimum value of the slider.
max="<number>"
   The maximum value of the slider.
value='<string>'
   The initial value of the slider. As the thumb is dragged, this attribute is automatically updated to match. If this attribute is modified, the displayed value is updated to match.
increment="<number>"
   The allowed values that the slider can create, i.e. only 'min'+multiples of 'increment' are allowed.
pageIncrement="<number>"
   The amount that the thumb should move, in whatever units the slider represents (i.e. not in pixels), when clicking to the left or right of it. If defined as zero, or not defined at all, the thumb will snap to wherever the user clicks.
ticksMajor="<number>"
   The interval at which major tick marks (whose appearance is defined in the skin) are displayed, in whatever units the slider represents.
ticksMinor="<number>"
   The interval at which minor tick marks (whose appearance is defined in the skin) are displayed, in whatever units the slider represents.
rotate="<number>"
   The rotation angle of the slider, in degrees clockwise. When provided, the slider will rotate but the label will remain unchanged and the tick mark labels will move appropriately but will remain unrotated. The top-left corner of the bounding box of the rotated slider, not including the label and tick mark labels, will be positioned at the specified (x, y) coordinates.
   If the attribute is not specified, the default is 0.
continuousCallback="(true | false)"
   Specifies whether the slider's associated behaviors should be executed whenever the thumb has been dragged (true) or whenever the thumb has been dragged and released (i.e. the user has let go of the mouse button).
Skin template:

```
<?xml version="1.0"?>
<svg xmlns:dsvg="http://www.corel.com/schemas/2002/dSVG">
  <g id="">
    <g id="label">
      <text x=" " y=" "></text>
    </g>
    <g id="up" display="none">
      <g id="body">
        <rect id="skinSliderBar" x=" " y=" " width=" " height=" "/>
      </g>
      <g id="skinSliderThumb"/>
      <g id="tickMajor" display="none">
        <text id="tickLabelMajor" x=" " y=" " xml:space="preserve"></text>
      </g>
      <g id="tickMinor" display="none">
        <text id="tickLabelMinor" x=" " y=" " xml:space="preserve"></text>
      </g>
    </g>
    <g id="down" display="none">
      ... same as for 'up' state ... </g>
      <g id="hover" display="none"> ... same as for 'up' state ... </g><g id="focus" display="none"> ... same as for 'up' state ...
    </g><g id="disabled" display="none"> ... same as for 'up' state ...
    </g>
    <g id="mask">
      <rect id="skinSliderMask" x=" " y=" " width=" " height=" " pointer-events="fill"/>
    </g>
  </g>
</svg>
```

Figure 19:
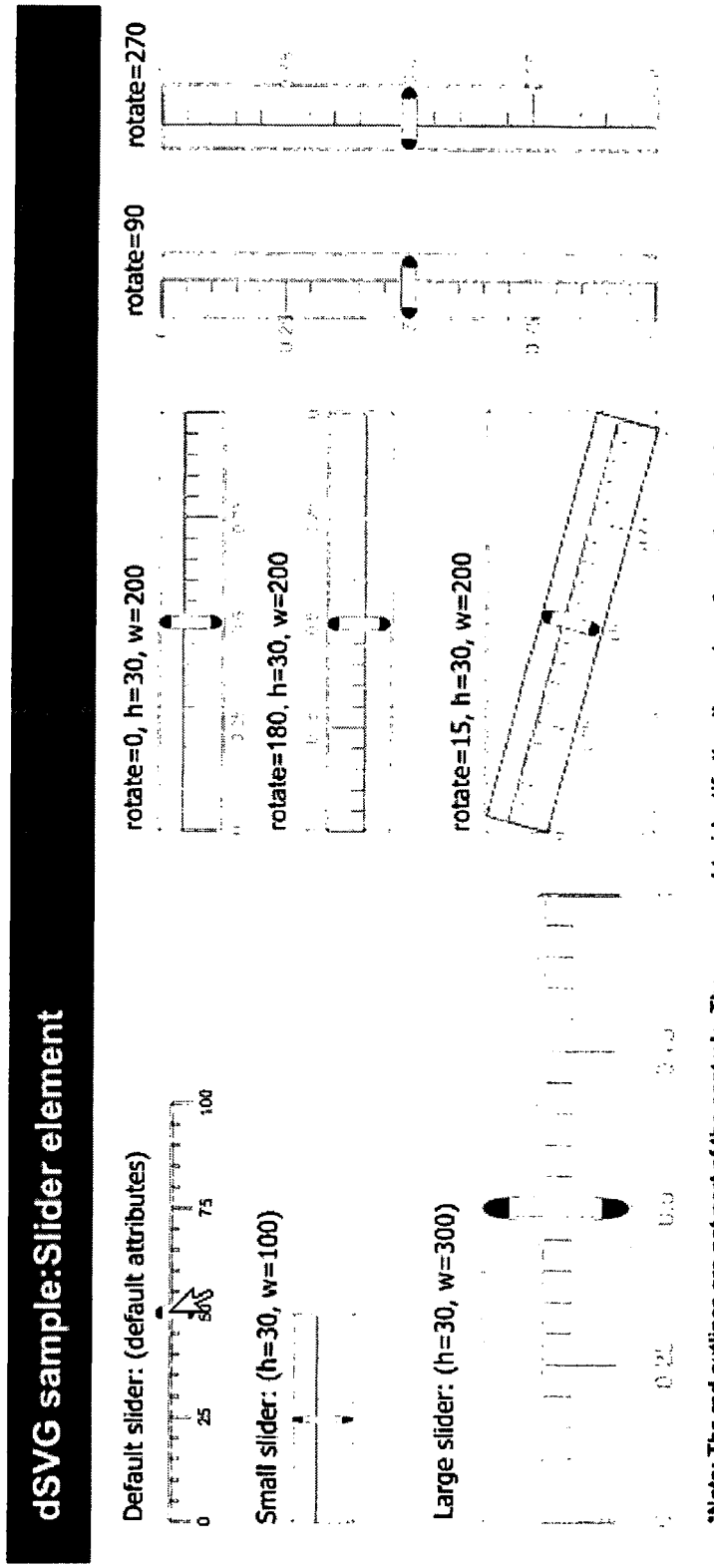
FIG. 19 shows a screen shot of an example of a slider element, in accordance with the user interface control system.

FIG. 19 shows several sliders of various sizes and rotations. The Default slider represents the default set of attributes. The small and large sliders are used to change the size of the control by specifying new values for the height and width attributes. The rotate attribute is set by the number of degrees specified in the label. The example is provided below:

```
<?xml version="1.0" standalone="no"?>
<!DOCTYPE svg SYSTEM "./SVGdSVG.dtd">
<svg xmlns:dsvg="http://www.corel.com/schemas/2002/dSVG11"
xmlns:xlink="http://www.w3.org/1999/xlink"
height="450px" width="744px"
onload="init(evt)" viewBox="0 0 744 450">
  <script type="text/ecmascript" xlink:href="dsvg11/dSVG.js"/>
  <script type="text/ecmascript" xlink:href="dsvg11/baseUI.js"/>
  <script type="text/ecmascript" xlink:href="dsvg11/constraint.js"/>
  <script type="text/ecmascript" xlink:href="dsvg11/slider.js"/>
  <!-- Adding Template -->
  <g id="template">
    <rect height="40" width="744" y="0" x="0" fill="#5f86B1" id="rect_Title"/>
    <text y="25" x="20" font-weight="bold" font-size="18" fill="white" id="TITLE">dSVG sample:Slider element</text>
    <line y2="350" x2="744" y1="350" opacity="1.0" stroke-width="2" stroke="#5F86B1" fill="#5F86B1" id="bottomLine"/>
    <text y="370" x="20" font-size="12" id="defaut_ex">Default slider—Represents the default set of attributes.</text>
    <text y="395" x="20" font-size="12" id="small_ex">Small and large sliders—Change the size of the control by specifying new values for the height and width attributes.</text>
    <text y="420" x="20" font-size="12" id="large_ex">Rotated sliders—The rotate attribute is set the number of degrees specified in the label.</text>
    <text y="340" x="20" font-weight="bold" font-size="10" fill="black" id="Note">*Note: The red outlines are not part of the controls. They are used to identify the dimensions for each control.</text>
  </g>
  <!-- adding controls -->
  <dsvg:slider selected="false" continuousCallback="true" xlink:href="dsvg11/skinSlider_Default.svg#skinSlider" autoScale="true" disabled="false" ticksMinor="5" ticksMajor="25" rotate="0" pageIncrement="0" increment="5"
``` value="50" max="100" min="0" height="19" width="200.5" y="70" x="20" label="Default slider: (default attributes)" id="default"/>
    <dsvg:slider selected="false" continuousCallback="true" xlink:href="dsvg11/skinSlider_Default.svg#skinSlider" autoScale="true" disabled="false" ticksMinor="0.05" ticksMajor="0.25" rotate="0" pageIncrement="0" increment="0.05" value="0.5" max="1" min="0" height="30" width="100" y="135" x="20" label="Small slider: (h=30, w=100)" id="small"/>
    <rect height="30" width="100" y="135" x="20" stroke="red" fill="none" id="small1"/>
    <dsvg:slider selected="false" continuousCallback="true" xlink:href="dsvg11/skinSlider_Default.svg#skinSlider" autoScale="true" disabled="false" ticksMinor="0.05" ticksMajor="0.25" rotate="0" pageIncrement="0" increment="0.05" value="0.5" max="1" min="0" height="70" width="300" y="225" x="20" label="Large slider: (h=30, w=300)" id="large"/>
    <rect height="70" width="300" y="225" x="20" stroke="red" fill="none" id="large1"/>
    <dsvg:slider selected="false" continuousCallback="true" xlink:href="dsvg11/skinSlider_Default.svg#skinSlider" autoScale="true" disabled="false" ticksMinor="0.05" ticksMajor="0.25" rotate="0" pageIncrement="0" increment="0.05" value="0.5" max="1" min="0" height="30" width="200" y="70" x="350" label="rotate=0, h=30, w=200" id="rotated0"/>
    <rect height="30" width="200" y="70" x="350" stroke="red" fill="none" id="rotated_a"/>
    <dsvg:slider selected="false" continuousCallback="true" xlink:href="dsvg11/skinSlider_Default.svg#skinSlider" autoScale="true" disabled="false" ticksMinor="0.05" ticksMajor="0.25" rotate="15" pageIncrement="0" increment="0.05" value="0.5" max="1" min="0" height="30" width="200" y="225" x="350" label="rotate=15, h=30, w=200" id="rotated15"/>
    <rect height="30" width="200" y="228" x="354" transform="rotate(15 365 240)" stroke="red" fill="none" id="rotated"/>
    <rect height="81" width="201" y="225" x="350" stroke="red" fill="none" id="rotated_b"/>
    <dsvg:slider selected="false" continuousCallback="true" xlink:href="dsvg11/skinSlider_Default.svg#skinSlider" autoScale="true" disabled="false" ticksMinor="0.05" ticksMajor="0.25" rotate="180" pageIncrement="0" increment="0.05" value="0.5" max="1" min="0" height="30" width="200" y="150" x="350" id="rotated180"/>
    <rect height="30" width="200" y="150" x="350" stroke="red" fill="none" id="rotated_c"/>
    <dsvg:slider selected="false" continuousCallback="true" xlink:href="dsvg11/skinSlider_Default.svg#skinSlider" autoScale="true" disabled="false" ticksMinor="0.05" ticksMajor="0.25" rotate="90" pageIncrement="0" increment="0.05" value="0.5" max="1" min="0" height="30" width="235" y="70" x="595" label="rotate=90" id="rotated90"/>
    <rect height="235" width="30" y="70" x="595" stroke="red" fill="none" id="rotated_d"/>
    <dsvg:slider selected="false" continuousCallback="true" xlink:href="dsvg11/skinSlider_Default.svg#skinSlider" autoScale="true" disabled="false" ticksMinor="0.05" ticksMajor="0.25" rotate="270" pageIncrement="0" increment="0.05" value="0.5" max="1" min="0" height="30" width="235" y="70" x="675" label="rotate=270" id="rotated270"/>
    <rect height="235" width="30" y="70" x="675" stroke="red" fill="none" id="rotated_e"/>
    <text y="130" x="350" id="text_180">rotate=180, h=30, w=200
    </text>
</svg>

The 'spinBox' element

The 'spinBox' element defines a spinBox control, used to select a value from a range of allowed values by pressing the 'up' or 'down' buttons, or by entering numbers directly in its textBox component.

```
<!ENTITY % spinBoxExt " " >
<!ELEMENT dsvg:spinBox (dsvg:state|%behaviors;)* >
<!ATTLIST dsvg:spinBox
%stdDSVGAttrs;
%stdUIAttrs;
min             %Integer;       #IMPLIED
max             %Integer;       #IMPLIED
value           %Integer;       #IMPLIED
increment       %Integer;       #IMPLIED >
```

Attribute definitions:
min="<integer>"
    The minimum value of the spinBox.
max="<integer>"
    The maximum value of the spinBox.
value='<string>'
    The initial value of the spinBox. As the displayed value is changed via the buttons or textBox, this attribute is automatically updated to match. If this attribute is modified, the displayed value is updated to match.
increment="<integer>"
    The allowed values that the spinBox can create, i.e. only 'min'+multiples of 'increment' are allowed.
Skin template:
<?xml version="1.0"?>
    <svg xmlns:dsvg="http://www.corel.com/schemas/2002/dSVG" xmlns:xlink="http://www.w3.org/1999/xlink"><g id=" "><use id="TextBoxSkin" xlink:href=" " x=" " y=" "/><use id="ButtonSkinUp" xlink:href=" " x=" " y=" "/><use id="ButtonSkinDown" xlink:href=" " x=" " y=" "/><g id="label"><text x="0" y="-6"></text>
    </g>
    </g>
</svg>

Figure 20:
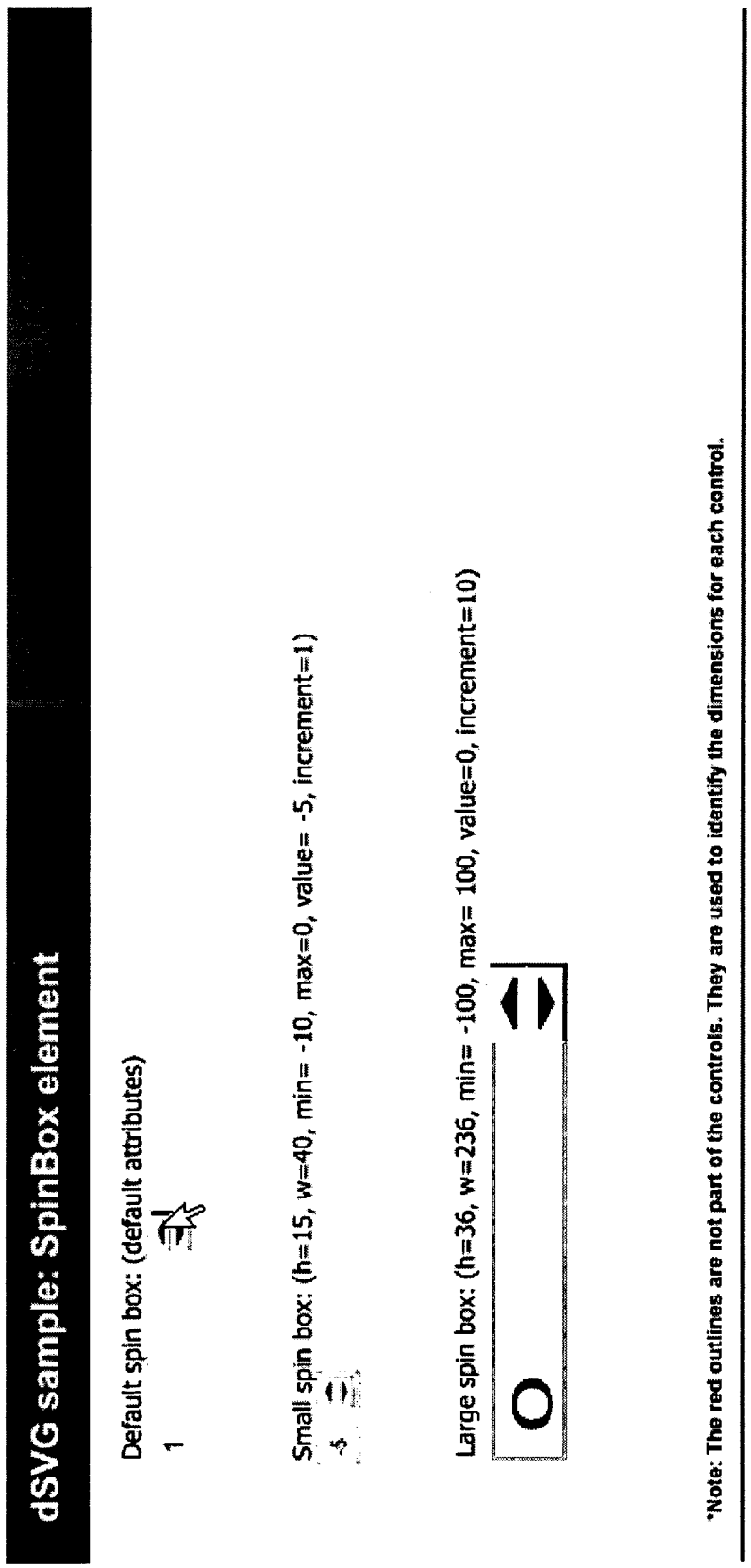
FIG. 20 shows a screen shot of an example of a spinBox element, in accordance with the user interface control system.

FIG. 20 shows several spinBoxes of various sizes and rotations, without associated behaviors. The default spin box has values of 1 to 10 in increments of 1. The initial value is 1. The small and large spin boxes are used to change the size of the control by specifying new values for the height and the width attributes. The example is provided below:
<?xml version="1.0" standalone="no"?>
<!DOCTYPE svg SYSTEM "./SVGdSVG.dtd">
<svg xmlns:dsvg="http://www.corel.com/schemas/2002/dSVG11" xmlns:xlink="http://www.w3.org/1999/xlink" height="450px" width="744px" onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>

```
<script type="text/ecmascript" xlink:href="dsvg11/spin-
    Box.js"/>
<script type="text/ecmascript" xlink:href="dsvg 11/text-
    box.js"/>
<script type="text/ecmascript" xlink:href="dsvg11/but-
    ton.js"/>
<!-- Adding Template -->
<g id="template">
<rect height="40" width="744" y="0" x="0"
    fill="#5f86B1" id="rect_Title"/>
<text y="25" x="20" font-weight="bold" font-size="18"
    fill="white" id="TITLE">dSVG sample: SpinBox ele-
    ment
</text>
<line y2="350" x2="744" y1="350" opacity="1.0"
    stroke-width="2" stroke="#5F86B1" fill="#5F86B1"
    id="bottomLine"/>
<text y="370" x="20" font-size="12"
    id="defaut_ex">Default spin box—This spin box has
    values of 1 to 10 in increments of 1. The initial value is
    1.
</text>
<text y="395" x="20" font-size="12"
    id="small_ex">Small and large spin boxes—Change
    the size of the control by specifying new values for the
    height and width attributes.
</text>
<text y="340" x="20" font-weight="bold" font-size="10"
    fill="black" id="Note">*Note: The red outlines are not
    part of the controls. They are used to identify the dimen-
    sions for each control.
</text>
</g>
<!-- adding controls -->
<dsvg:spinBox                           xlink:href="dsvg11/
    skinSpinBox_Composite.svg#skinSpinBox"
    autoScale="true" increment="1" value="1" max="10"
    min="0" height="18" width="118" y="70" x="50"
    label="Default spin box: (default attributes)"
    id="default_spin"/>
<rect height="22" width="122" y="68" x="48"
    stroke="red" fill="none" id="default_rect"/>
<dsvg: spinBox                          xlink:href="dsvg11/
    skinSpinBox_Composite.svg#skinSpinBox"
    autoScale="true" increment="1" value="-5" max="0"
    min="-10" height="15" width="40" y="150" x="50"
    label="Small spin box: (h=15, w=40, min=-10, max=0,
    value=-5, increment=1)" id="small_spin"/>
<rect height="19" width="44" y="148" x="48"
    stroke="red" fill="none" id="small_rect"/>
<dsvg:spinBox                           xlink:href="dsvg11/
    skinSpinBox_Composite.svg#skinSpinBox"
    autoScale="true" increment="10" value="0" max="100"
    min="-100" height="36" width="236" y="230" x="50"
    label="Large spin box: (h=36, w=236, min=-100, max=100,
    value=0, increment=10)" id="large_spin"/>
<rect height="40" width="240" y="228" x="48"
    stroke="red" fill="none" id="large_rect"/>
</svg>
```

The 'state' element

The 'state' element defines an alternate skin to be available for the parent UI control to use to override the appearance of any of its states. It must be a child of a UI control element.

```
<!ENTITY % stateExt " " >
<!ELEMENT dsvg:state EMPTY >
<!ATTLIST dsvg:state
id              ID         #IMPLIED
xmlns:xlink     CDATA      #FIXED 'http://www.w3.org/1999/xlink'
xlink:href      %URI;      #IMPLIED
type            %State;    #IMPLIED >
```

Attribute definitions:
id="name"
    Standard XML attribute for assigning a unique name to an element.
xlink:href="<uri>"
    A reference to the skin's parent element, stored either internally in the <defs> block, or in an external file.
    If the attribute is not specified, the UI control's skin is not overridden.
state="(up | down | hover | focus | disabled)"
    The state whose appearance the referenced skin will be used to override.

Figure 21:
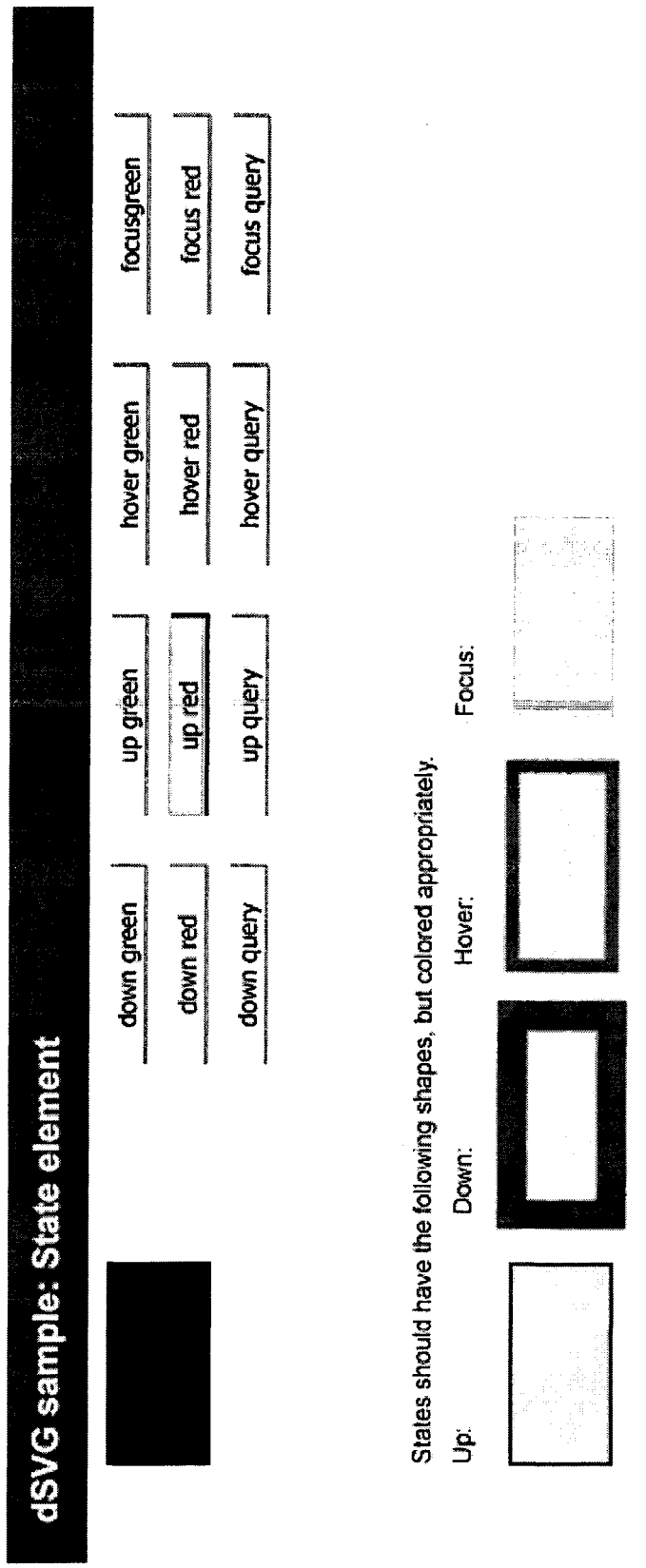
FIG. 21 shows a screen shot of an example of a state element, in accordance with the user interface control system.

FIG. 21 shows 12 regular buttons used to override the appearance of the custom button. The state element defines an alternate skin to be available for the parent UI control. This sample uses state to override the appearance of the custom button in the top left corner of the slide. Pressing a query button returns the current state value to an alert. The example is provided below:

```
<?xml version="1.0" standalone="no"?>
<!DOCTYPE svg SYSTEM "./SVGdSVG.dtd">
<svg xmlns:dsvg="http://www.corel.com/schemas/2002/
    dSVG"    xmlns:xlink="http://www.w3.org/1999/xlink"
    height="450px" width="780px" onload="init(evt)" view-
    Box="0 0 780 450">
<script    type="text/ecmascript"    xlink:href="dsvg/dS-
    VG.js"/>
<script    type="text/ecmascript"    xlink:href="dsvg/
    baseUI.js"/>
<script    type="text/ecmascript"    xlink:href="dsvg/con-
    straint.js"/>
<script    type="text/ecmascript"    xlink:href="dsvg/but-
    ton.js"/>
<script    type="text/ecmascript"    xlink:href="dsvg/setAt-
    tribute.js"/>
<script    type="text/ecmascript"    xlink:href="dsvg/
    alert.js"/>
<!--adding template-->
<g id="template">
<rect height="40" width="780" y="0" x="0"
    fill="#5f86B1" id="rect_Title"/>
<text y="25" x="20" font-weight="bold" font-size="18"
    fill="white" id="TITLE">dSVG sample: State ele-
    ment</text>
<line y2="350" x2="744" y1="350" opacity="1.0"
    stroke-width="2" stroke="#5F86B1" fill="#5F86B1"
    id="bottomLine"/>
<text y="365" x="20" font-size="12" id="content">The
    state element defines an alternate skin to be available for
    the parent UI control.</text>
<text y="380" x="20" font-size="12" id="expected">
    This sample uses state to override the appearance of the
    custom button in the top left corner of the slide. </text>
<text        y="395"        x="20"        font-size="12"
    id="depend">Pressing a query button returns the cur-
    rent state value to an alert.</text>
</g>
<!-- adding controls -->
```

```
<defs>
<g id="skinButton">
  <g id="label">
    <text y="12" x="9" font-weight="normal" font-size="10" font-family="Verdana" fill="#000000"></text>
  </g>
  <g id="up">
    <rect height="50" width="100" stroke-width="2" stroke="darkblue" fill="blue"/>
  </g>
  <g id="down">
    <rect height="50" width="100" stroke-width="15" stroke="darkblue" fill="blue"/>
  </g>
  <g id="hover">
    <rect height="50" width="100" stroke-width="7" stroke="darkblue" fill="blue"/>
  </g>
  <g id="focus">
    <rect height="50" width="100" stroke-width="0" stroke="darkblue" fill="blue"/>
  </g>
  <g style="opacity:0.5" id="disabled">
    <rect height="50" width="100" stroke-width="5" stroke="darkgrey" fill="grey"/>
  </g>
</g>
<g id="supgreen">
  <rect height="50" width="100" stroke-width="2" stroke="darkgreen" fill="green"/>
</g>
<g id="supred">
  <rect height="50" width="100" stroke-width="2" stroke="darkred" fill="red"/>
</g>
<g id="sdowngreen">
  <rect height="50" width="100" stroke-width="15" stroke="darkgreen" fill="green"/>
</g>
<g id="sdownred">
  <rect height="50" width="100" stroke-width="15" stroke="darkred" fill="red"/>
</g>
<g id="shovergreen">
  <rect height="50" width="100" stroke-width="7" stroke="darkgreen" fill="green"/>
</g>
<g id="shoverred">
  <rect height="50" width="100" stroke-width="7" stroke="darkred" fill="red"/>
</g>
<g id="sfocusgreen">
  <rect height="50" width="100" stroke-width="0" stroke="darkgreen" fill="green"/>
</g>
<g id="sfocusred">
  <rect height="50" width="100" stroke-width="0" stroke="darkred" fill="red"/>
</g>
<g id="skinButton2">
  <g id="label2">
    <text y="12" x="9" font-weight="normal" font-size="10" font-family="Verdana" fill="#000000"></text>
  </g>
  <g>
  <g id="up2">
    <path d="M56 181-52 0 0-15 52 0 0 15z" fill="#CCCCCC"/>
    <path d="M54 151-53 0 0-15 53 0 0 15z" stroke="#0083C4" fill="#FFFFFF"/>
  </g>
  <g id="down2">
    <path d="M56 181-52 0 0-15 52 0 0 15z" fill="#CCCCCC"/>
    <path d="M54 151-53 0 0-15 53 0 0 15z" stroke-width="2" stroke="#0083C4" fill="#EDAF0D"/>
  </g>
  <g id="hover2">
    <path d="M56 181-52 0 0-15 52 0 0 15z" fill="#CCCCCC"/>
    <path d="M54 151-53 0 0-15 53 0 0 15z" stroke-width="2" stroke="#0083C4" fill="#FFFFFF"/>
  <g>
  <g style="opacity:0.5" id="disabled2">
    <path d="M56 181-52 0 0-15 52 0 0 15z" fill="#CCCCCC"/>
    <path d="M54 151-53 0 0-15 53 0 0 15z" stroke="#CCCCCC" fill="#FFFFFF"/>
  </g>
</g>
</defs>
<dsvg:button xlink:href="#skinButton" autoScale="true" toggle="false" y="50" x="50" label="state" id="but1">
  <dsvg:state xlink:href="#sdowngreen" type="down" id="downgreen"/>
  <dsvg:state xlink:href="#sdownred" type="down" id="downred"/>
  <dsvg:state xlink:href="#supgreen" type="up" id="upgreen"/>
  <dsvg:state xlink:href="#supred" type="up" id="upred"/>
  <dsvg:state xlink:href="#shovergreen" type="hover" id="hovergreen"/>
  <dsvg:state xlink:href="#shoverred" type="hover" id="hoverred"/>
  <dsvg:state xlink:href="#sfocusgreen" type="focus" id="focusgreen"/>
  <dsvg:state xlink:href="#sfocusred" type="focus" id="focusred"/>
</dsvg:button>
<dsvg:button xlink:href="dsvg/skinButton_windows.svg#skinButton" autoScale="true" height="18" width="100" y="50" x="250" label="down green">
  <dsvg:setAttribute value="downgreen" attribute="state_down" elementID="but1"/>
</dsvg:button>
<dsvg:button xlink:href="dsvg/skinButton_windows.svg#skinButton" autoScale="true" height="18" width="100" y="80" x="250" label="down red">
  <dsvg:setAttribute value="downred" attribute="state_down" elementID="but1"/>
</dsvg:button>
<dsvg:button xlink:href="dsvg/skinButton_windows.svg#skinButton" autoScale="true" height="18" width="100" y="110" x="250" label="down query">
  <dsvg:alert message="%but1@state_down %"/>
</dsvg:button>
```

```
<dsvg:button                    xlink:href="dsvg/skinButton_
   windows.svg#skinButton"           autoScale="true"
   height="18" width="100" y="50" x="375" label="up
   green">
   <dsvg:setAttribute                value="upgreen"
      attribute="state_up" elementID="but1"/>
</dsvg:button>
<dsvg:button                     xlink:href="dsvg/
   skinButton_windows.svg#skinButton"
   autoScale="true" height="18" width="100" y="80"
   x="375" label="up red">
   <dsvg:setAttribute value="upred" attribute="state_up"
      elementID="but1"/>
</dsvg:button>
<dsvg:button                     xlink:href="dsvg/
   skinButton_windows.svg#skinButton"
   autoScale="true" height="18" width="100" y="110"
   x="375" label="up query">
   <dsvg:alert message="%but 1 @state_up %"/>
</dsvg:button>
<dsvg:button                     xlink:href="dsvg/
   skinButton_windows.svg#skinButton"
   autoScale="true" height="18" width="100" y="50"
   x="500" label="hover green">
   <dsvg:setAttribute                value="hovergreen"
      attribute="state_hover" elementID="but1"/>
</dsvg:button>
<dsvg:button                     xlink:href="dsvg/
   skinButton_windows.svg#skinButton"
   autoScale="true" height="18" width="100" y="80"
   x="500" label="hover red">
   <dsvg:setAttribute                value="hoverred"
      attribute="state_hover" elementID="but1"/>
</dsvg:button>
<dsvg:button                     xlink:href="dsvg/
   skinButton_windows.svg#skinButton"
   autoScale="true" height="18" width="100" y="110"
   x="500" label="hover query">
   <dsvg:alert message="%but1@state_hover %"/>
</dsvg:button>
<dsvg:button                     xlink:href="dsvg/
   skinButton_windows.svg#skinButton"
   autoScale="true" height="18" width="100" y="50"
   x="625" label="focusgreen">
   <dsvg:setAttribute                value="focusgreen"
      attribute="state_focus" elementID="but1"/>
</dsvg:button>
<dsvg:button                     xlink:href="dsvg/
   skinButton_windows.svg#skinButton"
   autoScale="true" height="18" width="100" y="80"
   x="625" label="focus red">
   <dsvg:setAttribute                value="focusred"
      attribute="state_focus" elementID="but1"/>
</dsvg:button>
<dsvg:button                     xlink:href="dsvg/
   skinButton_windows.svg#skinButton"
   autoScale="true" height="18" width="100" y="110"
   x="625" label="focus query">
   <dsvg:alert message="%but1@state_focus %"/>
</dsvg:button>
<text y="210" x="50">States should have the following
   shapes, but colored appropriately.</text>
<text y="230" x="50">Up:</text>
<text y="230" x="175">Down:</text>
<text y="230" x="300">Hover:</text>
<text y="230" x="425">Focus:</text>
<rect height="50" width="100" y="250" x="50" stroke-
   width="2" stroke="gray" fill="lightgray"/>
<rect height="50" width="100" y="250" x="175" stroke-
   width="15" stroke="gray" fill="lightgray"/>
<rect height="50" width="100" y="250" x="300" stroke-
   width="7" stroke="gray" fill="lightgray"/>
<rect height="50" width="100" y="250" x="425" stroke-
   width="0" stroke="gray" fill="lightgray"/>
</svg>
```

The 'textBox' element

The 'textBox' element defines a text input field.

```
<!ENTITY % textBoxExt " " >
<!ELEMENT dsvg:textBox (dsvg:state|%behaviors;)* >
<!ATTLIST dsvg:textBox
%stdDSVGAttrs;
%stdUIAttrs;
lines            %Integer;       #IMPLIED
maxLines         %Integer;       #IMPLIED
value            %Integer;       #IMPLIED
maxLength        %Integer;       #IMPLIED
editable         %Boolean;       'true'
wrap             %Boolean;       'false'
secret           %Boolean;       'false' >
```

Attribute definitions:

lines="<integer>"

The number of lines that will be visible in the text area. The available space will be divided up into this many lines for display.

maxLines="<integer>"

The maximum number of lines the textBox will hold. If greater than 'lines', the textBox will scroll vertically automatically while typing or using manually with the up and down arrow keys.

value='<string>'

The initial value (i.e. text data) of the textBox. As the displayed content is modified by the user, this attribute is automatically updated to match. If this attribute is modified, the displayed content is updated to match.

maxLength="<integer>"

The maximum number of characters the textBox will hold. Once this limit is reached, the user will not be able to enter any more characters.

editable=(true | false)

Specifies whether the textBox is editable or not.

If this attribute is not provided, the default value is 'true'.

wrap=(true | false)

Specifies whether the contents of the textBox should automatically wrap or not.

If this attribute is not provided, the default value is 'false'.

secret=(true | false)

Specifies whether each character in the contents of the textBox should be displayed by an asterisk ('*') or not.

If this attribute is not provided, the default value is 'false'.

Skin template:

```
<?xml version="1.0"?>
<svg    xmlns:dsvg="http://www.corel.com/schemas/2002/
dSVG"><g id="skinTextBox"><g id="up" display="all"/>
<g    id="hover"    display="none"/><g    id="down"
display="none"/><g id="disabled" display="none"/>
   <g id="label"><text x=" " y=" "></text></g><clipPath
      id="skinTextBox_textView">
   <rect id="skinTextBox_textArea" x=" " y=" " width=" "
      height=" "/></clipPath><g id="skinTextBox_cur-
      sor" display="none"/>
```

```
<text       clip-path="url(#skinTextBox_textView)"
    id="skinTextBox_text"   xml:space="preserve"
    x=" " y=" "></text>
  <rect id="skinTextBox_mask" x=" " y=" " width=
      " " height=" " display="none"/>
</g>
</g></svg>
```

Figure 22:
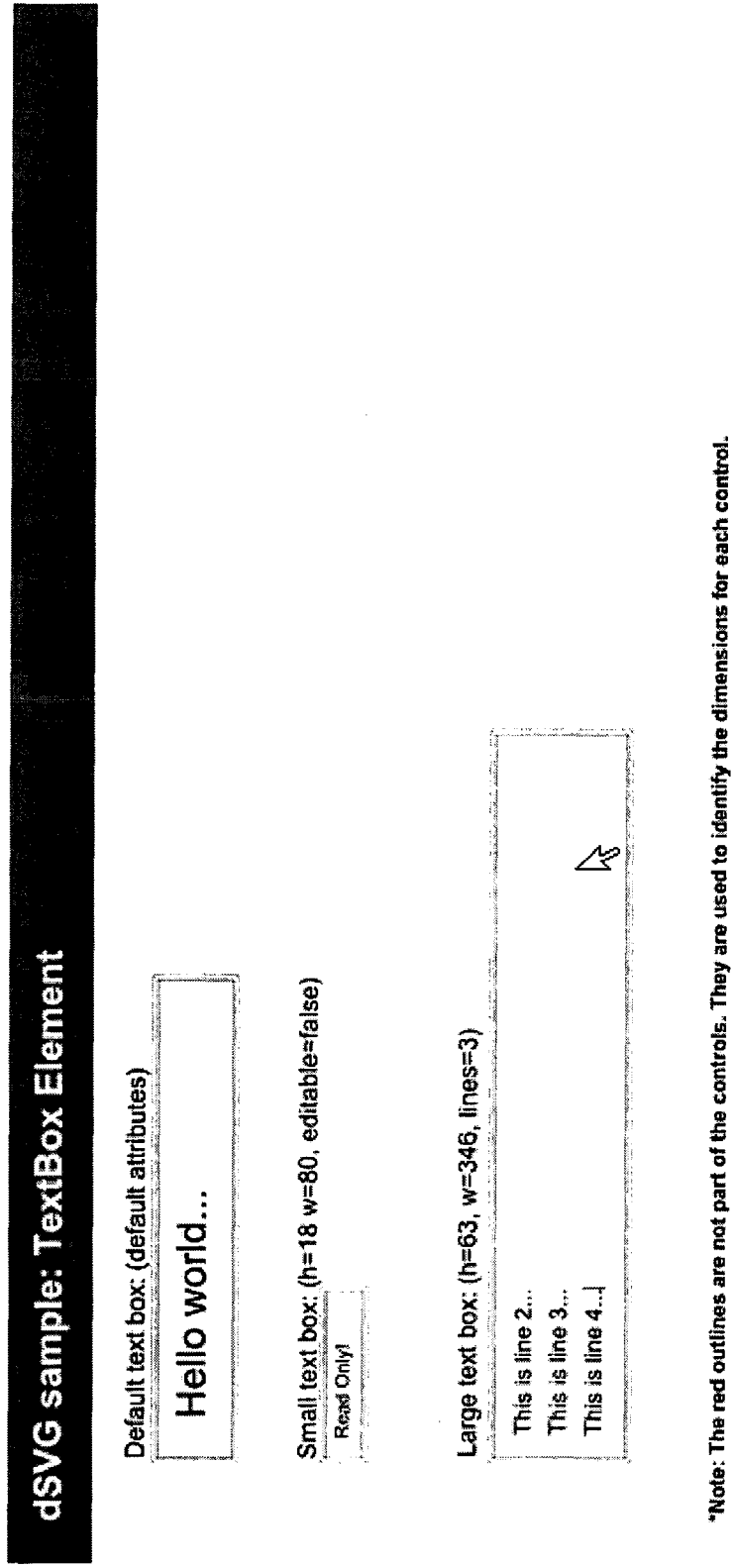
FIG. 22 shows a screen shot of an example of a textBox element, in accordance with the user interface control system.

FIG. 22 shows several textBoxes of various sizes, without associated behaviors. The default text box uses all of the default attribute settings. The small text box has the editable attribute set to false which disables the entry of text into the text box. The large text box is used to change the size of a control by specifying new values for the height and width attributes. The example is provided below:

```
<?xml version="1.0" standalone="no"?>
<!DOCTYPE svg SYSTEM "./SVGdSVG.dtd"><svg
  xmlns:dsvg="http://www.corel.com/schemas/2002/
  dSVG11"    xmlns:xlink="http://www.w3.org/1999/xlink"
  height="450px" width="744px" onload="init(evt)" view-
  Box="0 0 744 450">
  <script type="text/ecmascript" xlink:href="dsvg11/dS-
      VG.js"/>
  <script   type="text/ecmascript"   xlink:href="dsvg11/
      baseUI.js"/>
  <script type="text/ecmascript" xlink:href="dsvg11/con-
      straint.js"/>
  <script type="text/ecmascript" xlink:href="dsvg11/text-
      box.js"/>
  <!-- Adding Template -->
  <g id="template">
  <rect    height="40"    width="744"    y="0"    x="0"
      fill="#5f86B1" id="rect_Title"/>
  <text y="25" x="20" font-weight="bold" font-size="18"
      fill="white" id="TITLE">dSVG sample: TextBox Ele-
      ment
  </text>
  <line y2="350" x2="744" y1="350" opacity="1.0"
      stroke-width="2" stroke="#5F86B1" fill="#5F86B1"
      id="bottomLine"/>
  <text     y="370"     x="20"     font-size="12"
      id="defaut_ex">Default text box—This text box uses
      all of the default attribute settings.
  </text>
  <text     y="395"     x="20"     font-size="12"
      id="small_ex">Small text boxes—This text box has the
      editable attribute set to false which disables the entry of
      text into the text box.
  </text>
  <text     y="420"     x="20"     font-size="12"
      id="large_ex">Large text boxes—Change the size of a
      control by specifying new values for the height and
      width attributes.
  </text>
  <text y="340" x="20" font-weight="bold" font-size="10"
      fill="black" id="Note">*Note: The red outlines are not
      part of the controls. They are used to identify the dimen-
      sions for each control.
  </text>
</g>
<!-- adding controls -->
  <dsvg:textBox            xlink:href="dsvg11/
skinTextbox_Default.svg#skinTextBox"  autoScale="true"
height="36" width="228" y="70" x="50" label="Default
text box: (default attributes)" id="default_textbox1"/>
  <rect height="40" width="232" y="68" x="48" opac-
ity="0.5" stroke="red" fill="none" id="default_1"/>
  <dsvg:textBox           xlink:href="dsvg11/
skinTextbox_Default.svg#skinTextBox"  autoScale="true"
editable="false"  value="Read   Only!"  height="18"
width="80" y="150" x="50" label="Small text box: (h=18
w=80, editable=false)" id="small_textbox"/>
  <rect height="22" width="84" y="148" x="48" opac-
ity="0.5" stroke="red" fill="none" id="small1"/>
  <dsvg:textBox            xlink:href="dsvg
11/skinTextbox_Default.svg#skinTextBox"
autoScale="true"  lines="3"  height="63"  width="346"
y="230" x="50" label="Large text box: (h=63, w=346,
lines=3)" id="large_textbox"/>
  <rect height="67" width="350" y="228" x="48" opac-
ity="0.5" stroke="red" fill="none" id="large_1"/>
</svg>
```

The 'toolBar' element

The 'toolBar' element defines a container for buttons.
Attribute definitions:
%standard attributes %
  The standard attributes, such as id, label, etc.
selectedID="name"
  The value of the currently selected child 'button' element's 'id' attribute.
hideGrippy="(true | false)"
  Specifies whether to hide the grippy (true) or not (false).
The 'window' element
  The 'window' element defines a window.

```
<!ENTITY % windowExt" ">
<!ELEMENT  dsvg:window  (%UIControls;|%behaviors;
|desc|title|metadata|defs|path|text|rect|circle|ellipse|line|
polyline|polygon|use|image|svg|g|view|switch|a|altGlyph
Def|script|style|symbol|marker|clipPath|mask|linear
Gradient|radialGradient|pattern|filter|cursor|font|animate|
set|animateMotion|animateColor|animateTransform|color-
profile|font-face)*>
<!ATTLIST dsvg:window
%stdDSVGAttrs;
%stdUIAttrs; >
```

Skin template:

```
<?xml version="1.0"?>
<svg   xmlns:dsvg="http://www.corel.com/schemas/2002/
dSVG">
  <g id="skinWindow">
    <use    id="skinWindowBase"    xlink:href=    "skin
        Window_Default.svg#WindowBase" x=" " y=" "/>
    <use id="skinButtonClose" xlink:href=" " x=" " y=" "/>
    <use id="skinScrollVertical" xlink:href=" " x=" " y=" "/>
    <use id="skinScrollHorizontal" xlink:href=" " x=" " y=
        " "/>
  </g>
  <g id="WindowBase">
  <g id="up">
    <rect id="Frame" x=" " y=" " width=" " height=" "/>
    <rect id="TitleBar" x=" " y=" " width=" " height=" "/>
  </g>
  <clipPath id="viewArea">
    <rect x=" " y=" " width=" " height=" "/>
  </clipPath>
  <g id="label">
    <text id="TitleBarText" x=" " y=" "></text>
  </g>
</g>
</svg>
```

Figure 23:
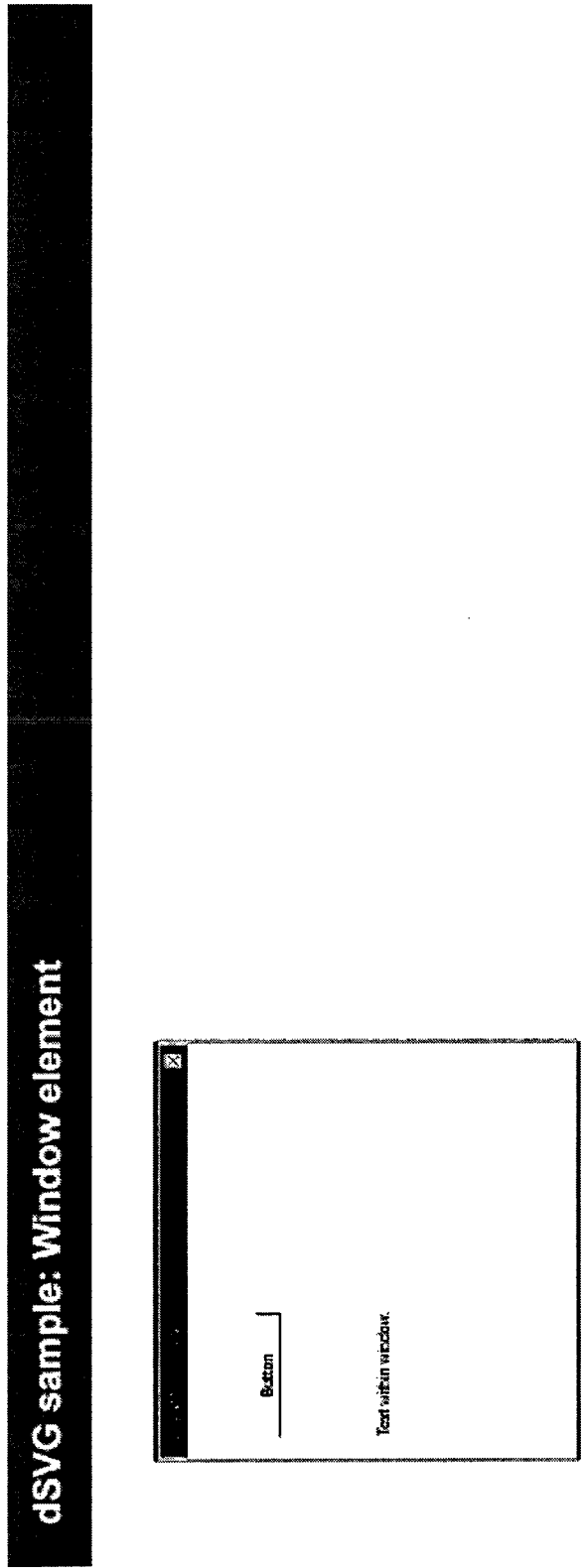
FIG. 23 shows a screen shot of an example of a window element, in accordance with the user interface control system.

FIG. 23 shows several textBoxes of various sizes, without associated behaviors. The window element defines a top-level container element that can be either modal or modeless, and can be moveable or not. In this sample, the button element and the text element are added as children of the window. The example is provided below:

```
<?xml version="1.0" standalone="no"?>
<!DOCTYPE svg SYSTEM "./SVGdSVG.dtd"><svg xmlns:dsvg="http://www.corel.com/schemas/2002/dSVG11" xmlns:xlink="http://www.w3.org/1999/xlink" height="450px" width="744px" onload="init(evt)" viewBox="0 0 744 450">
    <script type="text/ecmascript" xlink:href="dsvg11/dSVG.js"/>
    <script type="text/ecmascript" xlink:href="dsvg11/baseUI.js"/>
    <script type="text/ecmascript" xlink:href="dsvg11/constraint.js"/>
    <script type="text/ecmascript" xlink:href="dsvg11/window.js"/>
    <script type="text/ecmascript" xlink:href="dsvg11/windowBase.js"/>
    <script type="text/ecmascript" xlink:href="dsvg11/button.js"/>
    <script type="text/ecmascript" xlink:href="dsvg11/scrollbar.js"/>
    <script type="text/ecmascript" xlink:href="dsvg11/slider.js"/>
    <script type="text/ecmascript" xlink:href="dsvg11/attributeDrag.js"/>
    <!-- Adding Template -->
    <g id="template">
      <rect height="40" width="744" y="0" x="0" fill="#5f86B1" id="rect_Title"/>
      <text y="25" x="20" font-weight="bold" font-size="18" fill="white" id="TITLE">dSVG sample: Window element
      </text>
      <line y2="350" x2="744" y1="350" opacity="1.0" stroke-width="2" stroke="#5F86B1" fill="#5F86B1" id="bottomLine"/>
      <text y="370" x="20" font-size="12" id="defaut_ex">The window element defines a top-level container element that can be either modal or modeless, and can be moveable or not.
      </text>
      <text y="395" x="20" font-size="12" id="small_ex">In this sample, the button element and the text element are added as children of the window.
      </text>
    </g>
    <!-- adding controls -->
    <dsvg:window xlink:href="dsvg11/skinWindow_Default.svg#skinWindow" autoScale="true" height="200" width="200" y="70" x="50" label="Sample window" id="dsvgUniqueID_0">
      <dsvg:button xlink:href="dsvg11/skinButton_Windows.svg#skinButton"
        autoScale="true" height="18" width="100" y="50" x="20" label="Button" id="button1"/>
      <text y="150" x="20" id="text1">Text within window.
      </text>
    </dsvg:window>
</svg>
```

UI Control Attributes

The following attributes can be applied to any element, to create a context-sensitive UI control, which may be event-triggered.

| <!ENTITY % stdDSVGAttrs" | | |
|---|---|---|
| dsvg:contextMenu | ID | #IMPLIED |
| dsvg:share | ID | #IMPLIED |
| dsvg:tipDelay | %Integer | "50" |
| dsvg:tipTrack | %Boolean | "false" |
| dsvg:title | %Text | #IMPLIED |
| dsvg:toolTip | ID | #IMPLIED > | contextMenu="name"
   Specifies the 'id' attribute of an existing 'contextMenu' element. The contextMenu displays with its top-left corner at the position of the mouse pointer when the user right-clicks on the element.

share="name"
   Specifies the 'id' attribute of an existing 'share' element, causing the share element's children to be treated as children of this element as well. The children are not copied—they are instead used, or shared, by multiple elements.

tipDelay="<integer>"
   The time, in milliseconds, between when the mouse cursor begins to hover over an element and when the toolTip actually displays.
   If this attribute is not provided, its default is 50.
   If the 'title' and 'toolTip' attributes do not exist for this element or one of its ancestors, this attribute is ignored and no toolTip will appear.

tipTrack="(true | false)"
   Specifies whether the toolTip should move to follow the mouse cursor position (true) or stay fixed in place at the location it first appears (false).
   If this attribute is not provided, its default is "false".
   If the 'title' and 'toolTip' attributes do not exist for this element or one of its ancestors, this attribute is ignored and no toolTip will appear.

title="(true | false)"
   The text to be displayed in the toolTip for this element.
   If this attribute is not provided, no toolTip will appear for this element.
   If the 'toolTip' attribute does not exist for this element or one of its ancestors, this attribute is ignored and no toolTip will appear.

toolTip="<uri>"
   A reference to the toolTip skin's parent element, stored either internally in the <defs> block, or in an external file.
   If this attribute is not provided, no toolTip will appear.

The 'contextMenu' attribute

The 'contextMenu' attribute specifies the 'id' attribute of an existing 'contextMenu' element. The contextMenu displays with its top-left corner at the position of the mouse pointer when the user right-clicks on the element. FIG. 24 shows a contextMenu associated to a circle, with no associated behaviors. In this example, the default context menu is displayed with a right-click within the circle. The lists consists of items which can be added directly as child elements of context menu. The context menu is associated with the circle by adding a contextMenu attribute to the circle which references the context menu. The example is provided below:

```
<?xml version="1.0" standalone="no"?>
<!DOCTYPE svg SYSTEM "./SVGdSVG.dtd">
<svg xmlns:xlink="http://www.w3.org/1999/xlink" xmlns:dsvg="http://www.corel.com/schemas/2002/dSVG11" height="450px" width="744px" onload="init(evt)" viewBox="0 0 744 450">
```

```
<script type="text/ecmascript" xlink:href="dsvg11/dSVG.js"/>
<script type="text/ecmascript" xlink:href="dsvg11/baseUI.js"/>
<script type="text/ecmascript" xlink:href="dsvg11/constraint.js"/>
<script type="text/ecmascript" xlink:href="dsvg11/contextMenu.js"/>
<script type="text/ecmascript" xlink:href="dsvg11/attributeContextMenu.js"/>
<script type="text/ecmascript" xlink:href="dsvg 11/listbox.js"/>
<!--Begin Template-->
<g id="template">
<rect height="40" width="744" y="0" x="0" fill="#5f86B1" id="rect_Title"/>
<text y="25" x="20" font-weight="bold" font-size="18" fill="white" id="TITLE">dSVG sample: ContextMenu element
</text>
<line y2="350" x2="744" y1="350" opacity="1.0" stroke-width="2" stroke="#5F86B1" fill="#5F86B1" id="bottomLine"/>
<text y="370" x="20" font-size="12" id="defaut_ex">Default context menu—Right-click within the circle to display the context menu.
</text>
<text y="395" x="20" font-size="12" id="additional_ex">The list consists of items which can be added directly as child elements of the context menu.
</text>
<text y="420" x="20" font-size="12" id="Final_ex">The context menu is associated with the circle by adding a dsvg:contextMenu attribute to the circle which references the context menu.
</text>
<text y="60" x="20" id="regular">Default Context Menu:
</text>
<text y="60" x="150" font-size="10" id="regular_desc">(default attributes)—right-click within the circle and the Context Menu should appear.
</text>
<g>
<!--adding the controls-->
<dsvg:contextMenu xlink:href="dsvg11/skinContextMenu_Default.svg#skinContextMenu" autoScale="true" label="Red Circle Menu" id="contextMenu1">
<dsvg:item value="Apple" data="plu_1" id="item_1">
<dsvg:itemData value="red" name="color"/>
<dsvg:itemData value="$1.27" name="price"/>
</dsvg:item>
<dsvg:item value="Banana" data="plu_2" id="item_2">
<dsvg:itemData value="yellow" name="color"/>
<dsvg:itemData value="$0.59" name="price"/>
</dsvg:item>
<dsvg:item value="Grapes" data="plu_3" id="item_3">
<dsvg:itemData value="purple" name="color"/>
<dsvg:itemData value="$2.19" name="price"/>
</dsvg:item>
<dsvg:item value="Kiwi" data="plu_4" id="item_4">
<dsvg:itemData value="brown" name="color"/>
<dsvg:itemData value="$0.89" name="price"/>
</dsvg:item>
</dsvg:contextMenu>
<circle dsvg:contextMenu="contextMenu1" r="50" cy="130" cx="130" stroke-width="5" stroke="darkblue" fill="#5f86B1" id="circle_blue"/>
</svg>
```

The 'share' attribute

Figure 25:
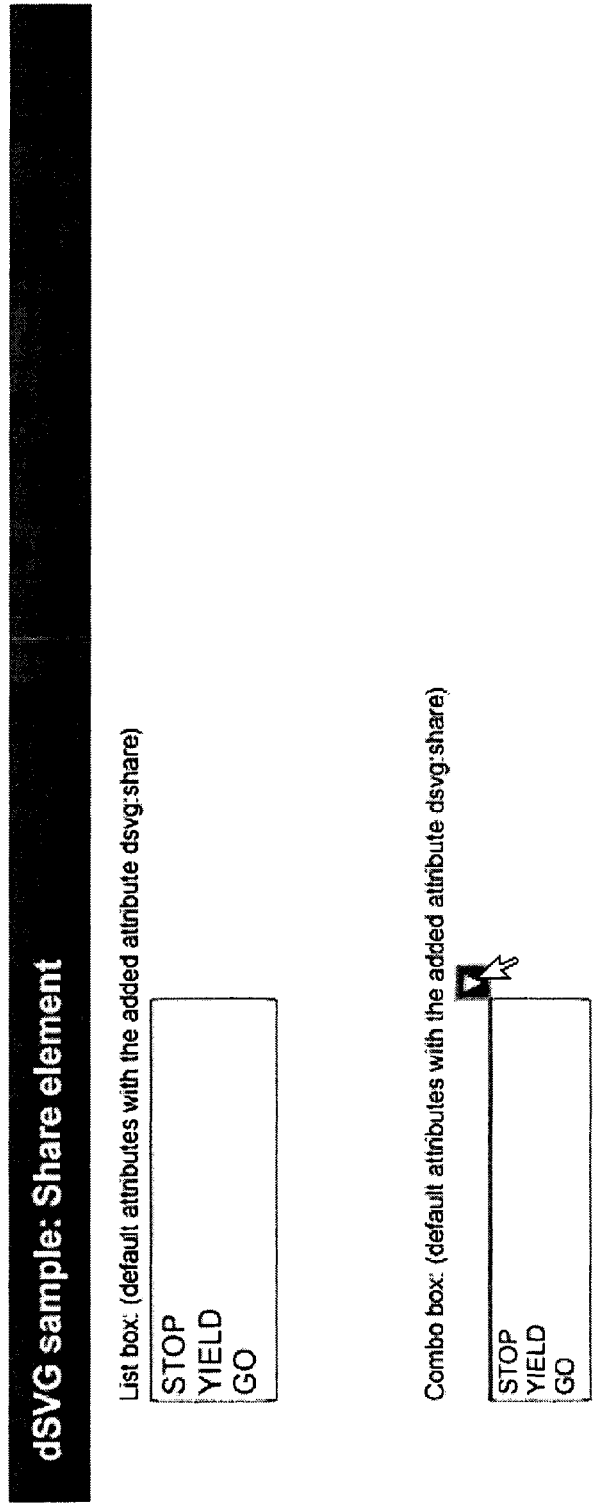
FIG. 25 shows a screen shot of an example of a share attribute, in accordance with the user interface control system.

The 'share' attribute specifies the 'id' attribute of an existing 'share' element, causing the child elements of the 'share' element to be treated as children of this element as well. The children are not copied—they are instead used, or shared, by multiple elements. FIG. 25 shows a listBox and a comboBox, both sharing the same 'item' elements as their children. The share element is used to share a group of items with multiple elements. The document in this example shares the same set of items with the combo box and list box. Associate a share element with other elements by adding a share attribute to the element that references the share element. The example is provided below:

```
<?xml version="1.0" standalone="no"?>
<!DOCTYPE svg SYSTEM "./SVGdSVG.dtd">
<svg xmlns:dsvg="http://www.corel.com/schemas/2002/dSVG11" xmlns:xlink="http://www.w3.org/1999/xlink" height="450px" width="744px" onload="init(evt)" viewBox="0 0 744 450">
<script type="text/ecmascript" xlink:href="dsvg11/dSVG.js"/>
<script type="text/ecmascript" xlink:href="dsvg11/baseUI.js"/>
<script type="text/ecmascript" xlink:href="dsvg11/constraint.js"/>
<script type="text/ecmascript" xlink:href="dsvg11/listbox.js"/>
<script type="text/ecmascript" xlink:href="dsvg11/button.js"/>
<script type="text/ecmascript" xlink:href="dsvg11/contextMenu.js"/>
<script type="text/ecmascript" xlink:href="dsvg11/scrollbar.js"/>
<script type="text/ecmascript" xlink:href="dsvg11/slider.js"/>
<script type="text/ecmascript" xlink:href="dsvg11/combobox.js"/>
<script type="text/ecmascript" xlink:href="dsvg11/textbox.js"/>
<!-- Adding Template -->
<g id="template">
<rect height="40" width="744" y="0" x="0" fill="#5f86B1" id="rect_Title"/>
<text y="25" x="20" font-weight="bold" font-size="18" fill="white" id="TITLE">dSVG sample: Share element
</text>
<line y2="350" x2="744" y1="350" opacity="1.0" stroke-width="2" stroke="#5F86B1" fill="#5F86B1" id="bottomLine"/>
<text y="370" x="20" font-size="12" id="defaut_ex">The share element is used to share a group of items with multiple elements.
</text>
<text y="395" x="20" font-size="12" id="small_ex">This document shares the same set of items with the combo box and the list box.
</text>
<text y="420" x="20" font-size="12" id="large_ex">Associate a share element with other elements by adding a dsvg:share attribute to the element that references the share element.
```

```
</text>
</g>
<!-- adding controls -->
<dsvg:share id="share_1">
  <dsvg:item value="STOP" data="red" id="item_1">
    <dsvg:itemData value="Octagon" name="shape"/>
  </dsvg:item>
  <dsvg:item value="YIELD" data="yellow" id="item_2">
    <dsvg:itemData value="Triangle" name="shape"/>
  </dsvg:item>
  <dsvg:item value="GO" data="green" id="item_3">
    <dsvg:itemData value="Circle" name="shape"/>
  </dsvg:item>
</dsvg:share>
<dsvg:listBox dsvg:share="share_1" xlink:href="dsvg11/skinListBox_Composite.svg#skinListBox" autoScale="true" height="60" width="198" y="70" x="50" label="List box: (default attributes with the added attribute dsvg:share)" id="listbox_1"/>
<dsvg:comboBox dsvg:share="share_1" xlink:href="dsvg11/skinComboBox_Composite.svg#skinComboBox" autoScale="true" height="17" width="217" y="220" x="50" label="Combo box: (default attributes with the added attribute dsvg:share)" id="combobox_1"/>
</svg>
```

The 'toolTip' attribute

Figure 26:
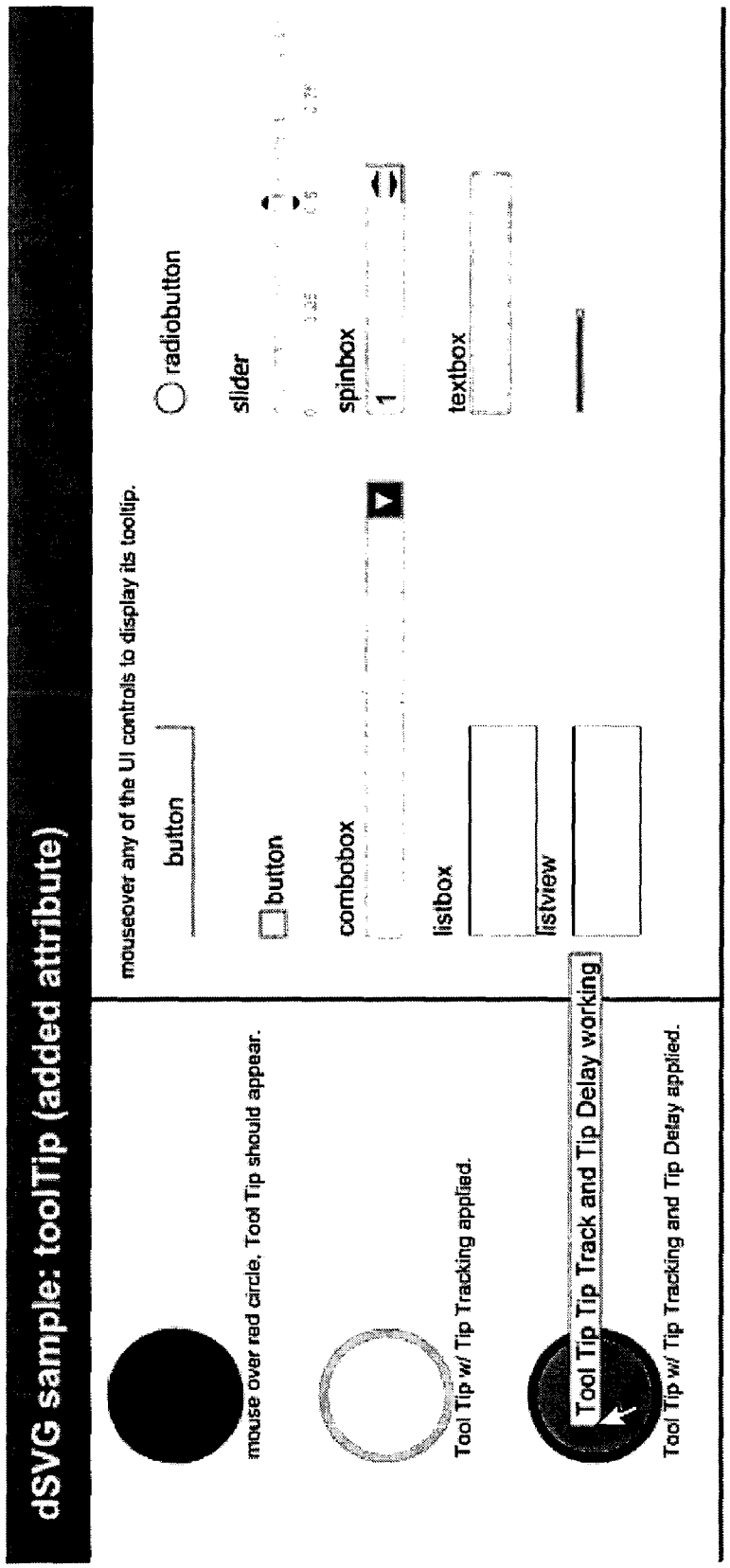
FIG. 26 shows a screen shot of an example of a toolTip attribute, in accordance with the user interface control system.

The 'toolTip' attribute refers to the toolTip skin's parent element, stored either internally in the <defs> block, or in an external file. With this attribute on an element, that element and any of its descendents will display the value of their 'dsvg:title' attribute within the toolTip defined in the specified skin, whenever the user hovers over the element. FIG. 26 shows three circles with toolTips—one follows the mouse, one has a delay and follows the mouse, and one does neither. The toolTip attribute is applied to elements to enable the ability to display tooltips. Tip tracking and Tip Delay are added as separate attributes if desired. The example is provided below:

```
<?xml version="1.0" standalone="no"?>
<!DOCTYPE svg SYSTEM "./SVGdSVG.dtd">
<svg xmlns:xlink="http://www.w3.org/1999/xlink" xmlns:dsvg="http://www.corel.com/schemas/2002/dSVG11" height="420px" width="760px" onload="init(evt)" viewBox="0 0 760 420">
  <script type="text/ecmascript" xlink:href="dsvg11/dSVG.js"/>
  <script type="text/ecmascript" xlink:href="dsvg11/baseUI.js"/>
  <script type="text/ecmascript" xlink:href="dsvg11/constraint.js"/>
  <script type="text/ecmascript" xlink:href="dsvg11/button.js"/>
  <script type="text/ecmascript" xlink:href="dsvg11/loadXML.js"/>
  <script type="text/ecmascript" xlink:href="dsvg11/attributeTooltip.js"/>
  <script type="text/ecmascript" xlink:href="dsvg11/combobox.js"/>
  <script type="text/ecmascript" xlink:href="dsvg11/textbox.js"/>
  <script type="text/ecmascript" xlink:href="dsvg11/contextMenu.js"/>
  <script type="text/ecmascript" xlink:href="dsvg11/slider.js"/>
  <script type="text/ecmascript" xlink:href="dsvg11/listBox.js"/>
  <script type="text/ecmascript" xlink:href="dsvg11/scrollbar.js"/>
  <script type="text/ecmascript" xlink:href="dsvg 11/listview.js"/>
  <script type="text/ecmascript" xlink:href="dsvg11/spinBox.js"/>
  <script type="text/ecmascript" xlink:href="dsvg11/window.js"/>
  <script type="text/ecmascript" xlink:href="dsvg11/windowBase.js"/>
  <script type="text/ecmascript" xlink:href="dsvg11/attributeDrag.js"/>
  <!-- template -->
  <rect height="40" width="744" y="0" x="0" fill="#5f86B1" id="title_rect"/>
  <text y="25" x="20" font-weight="bold" font-size="18" fill="white" id="text_1">dSVG sample: toolTip (added attribute)<
  </text>
  <text y="365" x="20" font-size="12" id="content">Content of file: dsvg:toolTip
  </text>
  <text y="380" x="20" font-size="12" id="expected">The dsvg:toolTip attribute is applied to elements to enable the ability to display tooltips.
  </text>
  <text y="395" x="20" font-size="12" id="depend">Tip tracking and Tip Delay are added as separate attributes if desired.
  </text>
  <text y="60" x="280" font-size="10" id="textControls">mouseover any of the UI controls to display its tooltip.
  </text>
  <line y2="340" x2="744" y1="340" x1="0" stroke-width="2" stroke="#5f86B1" fill="#5f86B1" id="bottom_line"/>
  <line y2="40" x2="270" y1="340" x1="270" stroke-width="2" stroke="#5f86B1" fill="#5f86B1" id="vert_line"/>
  <!--adding attributes-->
  <g dsvg:toolTip="dsvg11/skinTooltip.svg#skinTooltip_traditional" id="toolTips">
    <circle dsvg:title="Tool Tip working" r="30" cy="80" cx="80" stroke-width="5" stroke="darkred" fill="red" id="circle_red"/>
    <circle dsvg:tipTrack="true" dsvg:tipDelay=" " dsvg:title="Tool Tip and Tip Track working" r="30" cy="180" cx="80" stroke-width="5" stroke="orange" fill="yellow" id="circle_yellow"/>
    <circle dsvg:tipTrack="true" dsvg:tipDelay="2000" dsvg:title="Tool Tip Tip Track and Tip Delay working" r="30" cy="280" cx="80" stroke-width="5" stroke="darkblue" fill="#5f86B1" id="circle_green"/>
  </g>
  <text y="120" x="50" font-size="10" id="red_text">mouse over red circle, Tool Tip should appear.
  </text>
  <text y="220" x="50" font-size="10" id="red_text2">Tool Tip w/ Tip Tracking applied.
  </text>
  <text y="320" x="50" font-size="10" id="red_text3">Tool Tip w/ Tip Tracking and Tip Delay applied.
```

```
</text>
<g transform="translate(250, 20)" dsvg:toolTip="dsvg
   11/skinTooltip.svg#skinTooltip_traditional">
   <dsvg:button dsvg:title="button" dsvg:toolTip="dsvg
      11/skinTooltip.svg#skinTooltip_traditional" xlink:
      href="dsvg11/skinButton_Windows.svg#skinButton"
      autoScale="true" label="button" height="18"
      width="100" y="50" x="50" id="dsvgUniqueID_0"/>
   <dsvg:checkBox dsvg:title="checkbox" xlink:
      href="dsvg11/
      skinCheckbox_Default.svg#skinCheckBox"
      autoScale="true" height="12" width="12" y="100"
      x="50" label="button" id="dsvgUniqueID_2"/>
   <dsvg:comboBox dsvg:title="combobox" xlink:
      href="dsvg11/
      skinComboBox_Composite.svg#skinComboBox"
      autoScale="true" height="17" width="217" y="150"
      x="50" label="combobox" id="dsvgUniqueID_3"/>
   <dsvg:listBox dsvg:title="listbox" xlink:href="dsvg11/
      skinListBox_Composite.svg#skinListBox"
      autoScale="true" height="30" width="99" y="200"
      x="50" label="listbox" id="dsvgUniqueID_3"/>
   <dsvg:listView dsvg:title="lisview" xlink:href="dsvg11/
      skinListView_Composite.svg#skinListView"
      autoScale="true" height="30" width="99" y="250"
      x="50" label="listview" id="dsvgUniqueID_4"/>
   <dsvg:radioButton dsvg:title="radiobutton" xlink:
      href="dsvg11/
      skinRadioButton_Default.svg#skinRadioButton"
      autoScale="true" group="default" height="14"
      width="14" y="50" x="300" label="radiobutton"
      id="dsvgUniqueID_5"/>
   <dsvg:slider dsvg:title="slider"
      continuousCallback="true" xlink:href="dsvg11/
      skinSlider_Windows.svg#skinSlider"
      autoScale="true" ticksMinor="0.05" ticksMa-
      jor="0.25" pageIncrement="0" increment="0.05"
      value="0.5" max="1" min="0" height="18"
      width="200" y="100" x="300" label="slider"
      id="dsvgUniqueID_6"/>
   <dsvg:spinBox dsvg:title="spinbox" xlink:href="dsvg11/
      skinSpinBox_Composite.svg#skinSpinBox"
      autoScale="true" increment="1" value="1" max="10"
      min="0" height="18" width="118" y="150" x="300"
      label="spinbox" id="dsvgUniqueID_7"/>
   <dsvg:textBox dsvg:title="textbox" xlink:href="dsvg
      11/skinTextbox_Default.svg#skinTextBox"
      autoScale="true" height="18" width="114" y="200"
      x="300" label="textbox" id="dsvgUniqueID_8"/>
   <dsvg:window dsvg:title="window" xlink:href="dsvg11/
      skinWindow_Default.svg#skinWindow"
      autoScale="true" height="50" width="50" y="250"
      x="300" label="window" id="dsvgUniqueID_9"/>
</g>
</svg>
```

The 'tipDelay' attribute

The 'tipDelay' attribute specifies the time, in milliseconds, between when the mouse cursor begins to hover over an element and when the toolTip actually appears. If this attribute is not provided, its default is 50. If the 'title' and 'toolTip' attributes do not exist for this element or one of its ancestors, this attribute is ignored and no toolTip will appear.

The 'tipTrack' attribute

The 'tipTrack' attribute specifies whether the toolTip should move to follow the mouse cursor position (true) or stay fixed in place at the location it first appears (false). If this attribute is not provided, its default is "false". If the 'title' and 'toolTip' attributes do not exist for this element or one of its ancestors, this attribute is ignored and no toolTip will appear.

The 'title' attribute

The 'title' attribute specifies the text to be displayed in the toolTip for this element. If this attribute is not provided, no toolTip will appear for this element. If the 'toolTip' attribute does not exist for this element or one of its ancestors, this attribute is ignored and no toolTip will appear.

Other attributes may be added such as:
nativeContextMenu="string"
   Specifies the 'id' of the <menu> element that should appear when the user right-clicks on the element containing this attribute. <menu> is an Adobe-specific markup for the Adobe SVG Viewer. Thus this attribute is only for use with the Adobe SVGViewer.

Other Skin Templates 27 for UI Controls

The 'scrollBar' Skin Template

```
<?xml version="1.0"?>
<svg>
   <g id="skinScrollBar">
      <use id="SliderSkin" xlink:href=" " x=" " y=" "/>
      <use id="ButtonLeftSkin" xlink:href=" " x=" " y=" "/>
      <use id="ButtonRightSkin" xlink:href=" " x=" " y=" "/>
      <g id="corner">
      </g>
      <g>
         <g id="ButtonLeftSkin">
            <g id="up" display="all">
            </g>
            <g id="down" display="none">
            </g>
         </g>
         <g id="SliderSkin">
            <g id="up" display="all">
               <g id="body">
                  <g id="SliderSkinBar">
                     <g>
                     </g>
                     <g id="SliderSkinThumb">
                     <g>
                        <pattern id="barfill" width=" " height=" "patternUnits=
                           "userSpaceOnUse">
                        </pattern>
                     </g>
                  <g id="mask">
                     <g id="sliderMask">
                        <g>
                     </g>
                  </g>
                  <g id="ButtonRightSkin">
                     <g id="up" display="all">
                     </g>
                     <g id="down" display="none">
                     </g>
                  </g>
            <g id="skinScrollBarSmall">
               <use id="SliderSkin" xlink:href=" " x=" " y=" "/>
               <use id="ButtonLeftSkin" xlink:href=" " x=" " y=" "/>
               <use id="ButtonRightSkin" xlink:href=" " x=" " y=" "/>
               <g id="corner">
               </g>
            </g>
            <g id="ButtonLeftSkinSmall">
               <g id="up" display="all">
               </g>
               <g id="down" display="none">
               </g>
```

```
</g>
<g id="SliderSkinSmall">
  <g id="up" display="all">
    <g id="SkinSliderSmallBorder" display="all">
    </g>
    <g id="body">
      <g id="SkinSliderSmallBase">
      </g>
      <g id="SkinSliderSmallBar">
      </g>
    </g>
    <g id="SliderSkinSmallThumb">
      <g id="sliderThumbBar">
      </g>
    <g>
    <g id="tickMajor" display="none">
      <text x=" " y=" " id="tickLabelMajor" xml:
         space="preserve" style=" "></text>
    </g>
  </g>
  <g id="mask">
    <g id="sliderMask" opacity="0">
    <g>
  </g>
<g id="ButtonRightSkinSmall">
  <g id="up" display="all">
  </g>
  <g id="down" display="none">
  <g>
  </g>
</svg>
Example 'scrollBar' Skin
<?xml version="1.0"?>
<svg>
  <g id="skinScrollBar">
    <use    id="SliderSkin"    xlink:
       href="skinScrollBar_Default.svg#SliderSkin"  x="0"
       y="0"/>
    <use         id="ButtonLeftSkin"         xlink:
       href="skinScrollBar_Default.svg#ButtonLeftSkin"
       x="0" y="0"/>
    <use         id="ButtonRightSkin"        xlink:
       href="skinScrollBar_Default.svg#ButtonRightSkin"
       x="0" y="0"/>
    <g id="corner">
      <rect fill="rgb(212 208 200)" x="0" y="0" width="16"
         height="16"/>
    </g>
  </g>
<g id="ButtonLeftSkin">
  <g id="up" fill="none" stroke-linecap="square" shape-
     rendering="optimizeSpeed" display="all">
    <rect  fill="rgb(212   208   200)"   width="16"
       height="16"/>
    <line x1="15" y1="0" x2="15" y2="15" style="stroke:
       #404040"/>
    <line x1="0" y1="15" x2="15" y2="15" style="stroke:
       #404040"/>
    <line x1="1" y1="1" x2="13" y2="1" style="stroke:
       #FFFFFF"/>
    <line x1="1" y1="1" x2="1" y2="13" style="stroke:
       #FFFFFF"/>
    <line x1="1" y1="14" x2="14" y2="14" style="stroke:
       #808080"/>
    <line x1="14" y1="1" x2="14" y2="14" style="stroke:
       #808080"/>
    <path fill="black" d="M9.5 5.51-3 313 3z"/>
  </g>
  <g id="down" fill="none" stroke-linecap="square" shape-
     rendering="optimizeSpeed" display="none">
    <rect   fill="rgb(212   208   200)"   width="16"
       height="16"/>
    <rect fill="none" style="stroke:#808080" width="16"
       height="16"/>
    <path fill="black" d="M10.5 6.51-3 313 3z"/>
  </g>
</g>
<g id="SliderSkin">
<g id="up" display="all">
  <g id="body">
    <rect id="SliderSkinBar"  fill="#E6E6E6"  x="0"
       y="0" width="400" height="16">
    </rect>
  </g>
  <g id="SliderSkinThumb">
    <rect id="sliderThumbBar" style="fill:rgb(212 208
       200);stroke:#000000;stroke-width:0"   x="0"
       y="0" width="400" height="16"/>
    <line   x1="0"   x2="400"   y1="15"   y2="15"
       style="stroke:#404040"/>
    <line   x1="1"   x2="398"   y1="1"    y2="1"
       style="stroke:#FFFFFF"/>
  </g>
  <pattern    id="barfill"    width="2"    height="2"
     patternUnits="userSpaceOnUse"         shape-
     rendering="optimizeSpeed">
    <rect   x="0"   y="0"   width="2"   height="2"
       fill="white"/>
    <rect x="0" y="0" width="1" height="1" fill="rgb
       (212 208 200)"/>
    <rect x="1" y="1" width="1" height="1" fill="rgb
       (212 208 200)"/>
  </pattern>
</g>
<g id="mask">
  <rect id="sliderMask" x="0" y="0" width="400"
     height="16" opacity="0"/>
</g>
</g>
<g id="ButtonRightSkin">
  <g id="up" fill="none" stroke-linecap="square" shape-
     rendering="optimizeSpeed" display="all">
    <rect  fill="rgb(212   208   200)"   width="16"
       height="16"/>
    <line x1="15" y1="0" x2="15" y2="15" style="stroke:
       #404040"/>
    <line x1="0" y1="15" x2="15" y2="15" style="stroke:
       #404040"/>
    <line x1="1" y1="1" x2="13" y2="1" style="stroke:
       #FFFFFF"/>
    <line x1="1" y1="1" x2="1" y2="13" style="stroke:
       #FFFFFF"/>
    <line x1="1" y1="14" x2="14" y2="14" style="stroke:
       #808080"/>
    <line x1="14" y1="1" x2="14" y2="14" style="stroke:
       #808080"/>
    <path fill="black" d="M6.5 5.513 31-3 3z" I>
  </g>
  <g id="down" fill="none" stroke-linecap="square"
  shape-rendering="optimizeSpeed" display="none">
    <rect fill="rgb(212 208 200)" width="16" height="16"/>
    <rect fill="none" style="stroke:#808080" width="16"
       height="16"/>
```

```
<path fill="black" d="M7.5 6.5 1 3 3 1 -3 3 z" l>
   </g>
</g>
<g id="skinScrollBarSmall">
<use id="SliderSkin" xlink:
   href="skinScrollBar_Default.svg#SliderSkinSmall"
   x="0" y="0"/>
<use id="ButtonLeftSkin" xlink:href=
   "skinScrollBar_Default.svg#ButtonLeftSkinSmall"
   x="0" y="0"/>
<use id="ButtonRightSkin" xlink:href=
   "skinScrollBar_Default.svg#ButtonRightSkinSmall"
   x="0" y="0"/>
<g id="corner">
   <rect x="0" y="0" width="10" height="10" style="fill:
       #FFFFFF;stroke:#000000"/>
   </g>
<g>
<g id="ButtonLeftSkinSmall">
   <g id="up" display="all">
       <rect x="1" y="1" width="10" height="10"
           style="fill-rule:evenodd;clip-rule:evenodd;fill:
           #FFFFFF;stroke:#B3B3B3;stroke-width: 1. 0001;
           stroke-miterlimit:2.6131;"/>
       <rect x="0" y="0" width="10" height="10"
           style="fill:#FFFFFF;stroke:#000000"/>
       <text x="5" y="5" style="font-family:'Tahoma';
           stroke:none;font-size:12;text-anchor:middle">
           </text>
       <path d="M 8 2 1 -6 3 1 6 3 z" style="fill:#000000;
           stroke:#FF0000;stroke-width:0"/>
   </g>
   <g id="down" display="none">
       <rect x="1" y="1" width="10" height="10"
           style="fill-rule:evenodd;clip-rule:evenodd;fill:
           #FFFFFF;stroke:#B3B3B3;stroke-width: 1. 0001;
           stroke-miterlimit:2.6131;"/>
       <rect x="1" y="1" width="10" height="10"
           style="fill:#FFFFFF;stroke:#000000"/>
       <text x="5" y="5" style="font-family:'Tahoma';
           stroke:none;font-size:12;text-anchor:middle">
           </text>
       <path d="M 9 3 1 -6 3 1 6 3 z" style="fill:#FF0000;
           stroke:#FF0000;stroke-width:0"/>
   </g>
<g>
<g id="SliderSkinSmall">
   <g id="up" display="all">
       <rect id="SkinSliderSmallBorder" x="0" y="0"
           width="200" height="10" opacity="0"/>
       <g id="body">
           <rect id="SkinSliderSmallBase" style="fill-rule:
               evenodd;clip-rule:evenodd;fill:#FFFFFF;
               stroke:#B3B3B3;stroke-width: 1. 0001;stroke-
               miterlimit:2.6131;" x="1" y="1" width="444"
               height="10"/>
           <rect id="SliderSkinSmallBar" style="fill:
               #FFFFFF;stroke:#000000" x="0" y="0"
               width="444" height="10"/>
       </g>
       <rect id="SliderSkinSmallThumb">
           <rect id="sliderThumbBar" style="fill:#B3B3B3;
               stroke:#000000;stroke-width:0" x="0" y="0"
               width="10" height="10"/>
       </g>
       <g id="tickMajor" display="none">
           <text x="0" y="11" id="tickLabelMajor" xml:
               space="preserve" style="font-face:Arial;font-
               size:8;fill:black;stroke:1;text-anchor:
               middle"></text>
       </g>
   <g>
   <g id="mask">
       <rect id="sliderMask" x=" " y="0" width="444"
           height="18" opacity="0"/>
   </g>
</g>
<g id="ButtonRightSkinSmall">
   <g id="up" display="all">
       <rect x="1" y="1" width="10" height="10"
           style="fill-rule:evenodd;clip-rule:evenodd;fill:
           #FFFFFF;stroke:#B3B3B3;stroke-width: 1. 0001;
           stroke-miterlimit:2.6131;"/>
       <rect x="0" y="0" width="10" height="10"
           style="fill:#FFFFFF;stroke:#000000"/>
       <text x="5" y="5" style="font-family:'Tahoma';
           stroke:none;font-size:12;text-anchor:middle">
           </text>
       <path d="M 2 2 1 6 3 1 -6 3 z" style="fill:#000000;
           stroke:#FF0000;stroke-width:0"/>
   </g>
   <g id="down" display="none">
       <rect x="1" y="1" width="10" height="10"
           style="fill-rule:evenodd;clip-rule:evenodd;fill:
           #FFFFFF;stroke:#B3B3B3;stroke-width: 1. 0001;
           stroke-miterlimit:2.6131;"/>
       <rect x="1" y="1" width="10" height="10"
           style="fill:#FFFFFF;stroke:#000000"/>
       <text x="5" y="5" style="font-family:'Tahoma';
           stroke:none;font-size:12;text-anchor:middle">
           </text>
       <path d="M 3 3 1 6 3 1 -6 3 z" style="fill:#FF0000;
           stroke:#FF0000;stroke-width:0"/>
   </g>
<g>
</g>
</svg>
```

The 'toolTip' Skin Template
```
<?xml version="1.0"?>
<svg>
   <g id="skinTooltip_name">
   <text x=" " y=" " style=" ">tip</text>
   </g>
</svg>
```

Example 'toolTip' Skin
```
<?xml version="1.0"?>
<svg>
   <g id="skinTooltip_annotation">
   <path style="fill:#FFFF00;fill-opacity:0.7;stroke:
       #1F1A17;stroke-width:3" d="M0 96 198 0-56-96 106
       96 202 0 0 167-352 0 0-167z"/>
   <text x="10" y="150" style="font-size:16;fill:
       black">tip</text>
   </g>
   <g id="skinTooltip_traditional" pointer-events="none">
   <rect x="0" y="0" width="150" height="15" style="fill:
       rgb(255,255,225);fill-opacity:0.9" stroke="black"
       stroke-width="1"/>
   <text x="5" y="12" style="font-size:12;fill:black">tip
       </text>
   </g>
   <g id="skinTooltip_special" pointer-events="none">
```

```
        <rect x="0" y="0" width="150" height="15" style="fill:
            rgb(130,130,130);fill-opacity:0.5"  stroke="black"
            stroke-width="1"/>
        <text x="5" y="12" style="font-size:12;fill:black">tip
            </text>
    </g>
</svg>
Other Example Skins for UI Controls
skinButton_ComboBox.svg
<?xml version="1.0"?>
<svg xmlns:dsvg="http://corel.org/dsvg">
    <g id="skinButton">
    <g id="label">
        <text x="50" y="13" style="font-family:'Tahoma';
            stroke:none;font-size:12;text-anchor:middle">
            </text>
    </g>
    <g id="up" display="all" style="stroke-width:1">
        <rect x="0" y="0" width="17" height="17" style="fill:
            #000000;stroke:#A3A3A3"/>
        <path d="M 5 5 1 6 0 1-3 6z" style="fill:#FFFFFF;
            stroke:#FFFFFF"/>
        <dsvg:constraint    preserveAspectRatio="vertical"
            hAlign="right"/>
    <g>
    <g id="down" display="none">
        <rect x="0" y="0" width="17" height="17" style="fill:
            #199DBF;stroke:#A3A3A3"/>
        <path d="M 5 5 1 6 0 1-3 6 z" style="fill:#FFFFFF;
            stroke:#FFFFFF"/>
        <dsvg:constraint    preserveAspectRatio="vertical"
            hAlign="right"/>
    </g>
    <g id="hover" display="none">
        <rect x="0" y="0" width="17" height="17" style="fill:
            #199DBF;stroke:#A3A3A3"/>
        <path d="M 5 5 1 6 0 1-3 6 z" style="fill:#FFFFFF;
            stroke:#FFFFFF"/>
        <dsvg:constraint    preserveAspectRatio="vertical"
            hAlign="right"/>
    </g>
    </g>
</svg>
skinButton_ListBox.svg
<?xml version="1.0"?>
<svg>
    <g id="skinListBox">
    <g id="up" display="all">
        <g id="skinListBox_label">
            <text x="0" y="-5" style="fill:#000000;font-weight:
                normal;font-size:12;font-family:Tahoma">
                </text>
        <g>
        <g id="skinListBox_body" style="fill:none">
            <rect  x="0"  y="0"  width="200"  height="17"
                style="fill:#FFFFFF;stroke:#A3A3A3;stroke-
                width:1"/>
            <rect x="200" y="0" width="17" height="17"
                style="fill:#000000;stroke:#A3A3A3;stroke-
                width:1"/>
            <path d="M 205 5 1 6 0 1-3 6 z" style="fill:#FFFFFF;
                stroke:#FFFFFF;stroke-width:1"/>
            <text id="skinListBox_bodyText" x="5" y="13"
                style="fill:#676767;font-weight:normal;font-size:
                12;font-family:Tahoma"></text>
        </g>
        <g id="skinListBox_bodyCover">
            <rect x="0" y="0" width="200" height="17"
                fill="none" stroke="none" pointer-events="fill"/>
        </g>
        <g id="skinListBox_dropDownButton">
            <rect x="200" y="0" width="17" height="17"
                style="fill:#000000;stroke:#000000;stroke-width:
                1"/>
            <path d="M 205 5 16 01-3 6 z" style="fill:#FFFFFF;
                stroke:#FFFFFF;stroke-width:1"/>
        </g>
    </g>
    <g id="down" display="none">
        <g id="skinListBox_label">
            <text x="0" y="-5" style="fill:#000000;font-weight:
                normal;font-size:12;font-family:Tahoma">
                </text>
        </g>
        <g id="skinListBox_body" style="fill:none">
            <rect  x="0"  y="0"  width="200"  height="17"
                style="fill:#FFFFFF;stroke:#A3A3A3;stroke-
                width:1"/>
            <rect x="200" y="0" width="17" height="17"
                style="fill:#000000;stroke:#A3A3A3;stroke-
                width:1"/>
            <path d="M 205 5 1 6 0 1-3 6 z" style="fill:#FFFFFF;
                stroke:#FFFFFF;stroke-width:1"/>
            <text id="skinListBox_bodyText" x="5" y="13"
                style="fill:#676767;font-weight:normal;font-size:
                12;font-family:Tahoma"></text>
        </g>
        <g id="skinListBox_bodyCover">
            <rect x="0" y="0" width="200" height="17"
                fill="none" stroke="none" pointer-events="fill"/>
        </g>
        <g id="skinListBox_dropDownButton">
            <rect x="200" y="0" width="17" height="17"
                style="fill:#199DBF;stroke:#199DBF;stroke-
                width:1"/>
            <path d="M 205 5 1 6 0 1-3 6 z" style="fill:#FFFFFF;
                stroke:#FFFFFF;stroke-width:1"/>
        </g>
    </g>
    <g id="hover" display="none">
        <g id="skinListBox_label">
            <text x="0" y="-5" style="fill:#000000;font-weight:
                normal;font-size:12;font-family:Tahoma">
                </text>
        <g>
        <g id="skinListBox_body" style="fill:none">
            <rect  x="0"  y="0"  width="200"  height="17"
                style="fill:#FFFFFF;stroke:#A3A3A3;stroke-
                width:1"/>
            <rect x="200" y="0" width="17" height="17"
                style="fill:#000000;stroke:#A3A3A3;stroke-
                width:1"/>
            <path d="M 205 5 1 6 0 1-3 6 z" style="fill:#FFFFFF;
                stroke:#FFFFFF;stroke-width:1"/>
            <text id="skinListBox_bodyText" x="5" y="13"
                style="fill:#676767;font-weight:normal;font-size:
                12;font-family:Tahoma"></text>
        </g>
        <g id="skinListBox_bodyCover">
            <rect   fill="none"   stroke="none"   pointer-
                events="fill"  x="0"  y="0"  width="200"
                height="17"/>
        </g>
        <g id="skinListBox_dropDownButton">
```

```
            <rect x="200" y="0" width="17" height="17"
                style="fill:#199DBF;stroke:#199DBF;stroke-
                width:1"/>
            <path d="M 205 516 0 1-3 6 z" style="fill:#FFFFFF;
                stroke:#FFFFFF;stroke-width:1"/>
        </g>
    </g>
    <g id="skinListBox_dropDownList">
        <g id="skinListBox_dropDownList_top">
            <line x1="0" y1="17" x2="0" y2="20"
                style="stroke:#000000;stroke-width:1"/>
            <line x1="217" y1="17" x2="217" y2="20"
                style="stroke:#000000;stroke-width:1"/>
            <rect x="1" y="18" width="215" height="2"
                style="fill:#FFFFFF"/>
        </g>
        <g id="skinListBox_dropDownList_middle">
            <line x1="0" y1="20" x2="0" y2="35"
                style="stroke:#000000;stroke-width:1"/>
            <line x1="217" y1="20" x2="217" y2="35"
                style="stroke:#000000;stroke-width:1"/>
            <rect x="1" y="20" width="215" height="14"
                style="fill:#FFFFFF;stroke:#FFFFFF;stroke-
                width:1" isback="true"/>
        </g>
        <g id="skinListBox_dropDownList_bottom">
            <line x1="0" y1="35" x2="0" y2="38"
                style="stroke:#000000;stroke-width:1"/>
            <line x1="217" y1="35" x2="217" y2="38"
                style="stroke:#000000;stroke-width:1"/>
            <line x1="0" y1="38" x2="217" y2="38"
                style="stroke:#000000;stroke-width:1"/>
            <rect x="1" y="36" width="215" height="2"
                style="fill:#FFFFFF"/>
        </g>
    <g>
    <g>
</svg>
skinButton_vpDown.svg
<?xml version="1.0"?>
<svg>
    <g id="skinButton">
        <g id="label">
            <text x="50" y="13" style="font-family:'Tahoma';
                stroke:none;font-size:12;text-anchor:middle">
            </text>
        </g>
        <g id="up" display="all">
            <path fill="#CCCCCC" d="M4 115 11 5-11-10 0z"/>
            <path fill="#E5FFFF" stroke="#0083C4" d="M1 115 11
                5-11-10 0z"/>
        </g>
        <g id="down" display="none">
            <path fill="#CCCCCC" d="M4 115 11 5-11-10 0z"/>
            <path fill="#EDAF0D" stroke="#0083C4" stroke-
                width="2" d="M1 115 11 5-11-10 0z"/>
        </g>
        <g id="hover" display="none">
            <path fill="#CCCCCC" d="M4 115 11 5-11-100z"/>
            <path fill="#E5FFFF" stroke="#0083C4" stroke-
                width="2" d="M1 115 11 5-11-10 0z"/>
        </g>
        <g id="disabled" style="opacity:0.5" display="none">
        <g>
    </g>
</svg>
skinButton_vpGeneric.svg
<?xml version="1.0"?>
<svg>
    <g id="skinButton">
        <g id="label">
            <text x="9" y="12" fill="#000000" font-
                weight="normal" font-size="10" font-
                family="Verdana"></text>
        </g>
        <g id="up" display="all">
            <path fill="#CCCCCC" d="M56 181-52 0 0-15 52 0 0
                15z"/>
            <path fill="#FFFFFF" stroke="#0083C4" d="M54 151-
                53 0 0-15 53 0 0 15z"/>
        </g>
        <g id="down" display="none">
            <path fill="#CCCCCC" d="M56 181-52 0 0-15 52 0 0
                15z"/>
            <path fill="#EDAF0D" stroke="#0083C4" stroke-
                width="2" d="M54 151-53 0 0-15 53 0 0 15z"/>
        </g>
        <g id="hover" display="none">
            <path fill="#CCCCCC" d="M56 181-52 0 0-15 52 0 0
                15z"/>
            <path fill="#FFFFFF" stroke="#0083C4" stroke-
                width="2" d="M54 151-53 0 0-15 53 0 0 15z"/>
        </g>
        <g id="disabled" style="opacity:0.5"
            display="none"><path fill="#CCCCCC" d="M56 181-
            52 0 0-15 52 0 0 15z"/><path fill="#FFFFFF"
            stroke="#CCCCCC" d="M54 151-53 0 0-15 53 0 0
            15z"/>
        <g>
        </g>
</svg>
skinButton_vpMonth.svg
<?xml version="1.0"?>
<svg>
    <g id="skinButton">
        <g id="label">
            <text x="22" y="11" fill="#666666" font-
                weight="bold" font-size="7" font-
                family="Verdana"></text>
        </g>
        <g id="up" display="all">
            <rect fill="#B2E5E5" x="0" y="14" width="40"
                height="4"/>
            <rect fill="#B2E5E5" x="0" y="0" width="40"
                height="4"/>
            <rect fill="#FFFFFF" fill-opacity="0" x="0" y="0"
                width="40" height="18"/>
        </g>
        <g id="down" display="none">
            <rect fill="#98B2E5" x="0" y="14" width="40"
                height="4"/>
            <rect fill="#98B2E5" x="0" y="0" width="40"
                height="4"/>
            <rect fill="#FFFFFF" fill-opacity="0" x="0" y="0"
                width="40" height="18"/>
        </g>
        <g id="hover" display="none">
            <rect fill="#98B2E5" x="0" y="14" width="40"
                height="4"/>
            <rect fill="#98B2E5" x="0" y="0" width="40"
                height="4"/>
            <rect fill="#FFFFFF" fill-opacity="0" x="0" y="0"
                width="40" height="18"/>
```

```
        </g>
        <g id="disabled" display="none">
            <rect fill="#CCCCCC" x="0" y="14" width="40" height="4"/>
            <rect fill="#CCCCCC" x="0" y="0" width="40" height="4"/>
            <rect fill="#FFFFFF" fill-opacity="0" x="0" y="0" width="40" height="18"/>
        </g>
    </g>
</svg>
skinButton_vpUp.svg
<?xml version="1.0"?>
<svg>
    <g id="skinButton">
        <g id="label">
            <text x="50" y="13" style="font-family:'Tahoma';
                stroke:none;font-size:12;text-anchor:middle">
            </text>
        </g>
        <g id="up" display="all">
            <path fill="#CCCCCC" d="M15 141-4-11-5 11 9 0z"/>
            <path fill="#E5FFFF" stroke="#0083C4" d="M12 131-5-12-5 12 10 0z"/>
        </g>
        <g id="down" display="none">
            <path fill="#CCCCCC" d="M15 141-4-11-5 11 9 0z"/>
            <path fill="#EDAF0D" stroke="#0083C4" stroke-width="2" d="M12 131-5-12-5 12 0z"/>
        </g>
        <g id="hover" display="none">
            <path fill="#CCCCCC" d="M15 141-4-11-5 11 9 0z"/>
            <path fill="#E5FFFF" stroke="#0083C4" stroke-width="2" d="M12 131-5-12-5 12 0z"/>
        </g>
        <g id="disabled" style="opacity:0.5" display="none">
        </g>
    </g>
</svg>
skinButton_Windows.svg
<?xml version="1.0"?>
<svg xmlns:dsvg="http://corel.org/dsvg">
    <g id="skinButton">
        <g id="label" style="font-family:'Tahoma';stroke:none;
            font-size:12;text-anchor:middle">
            <text x="50" y="13"></text>
            <dsvg:constraint scaleImmunity="true"
                hAlign="middle" vAlign="middle"/>
        </g>
        <g id="up" display="all" style="stroke-width:1">
            <rect x="0" y="0" width="100" height="18"
                style="fill:rgb(230,230,230);stroke:none"/>
            <polyline points="0,18 0,0 100,0" style="stroke:white;
                fill:none"/>
            <polyline points="0,18 100,18 100,0" style="stroke:
                black;fill:none"/>
            <dsvg:constraint propertyName="stroke-width"
                scaleImmunity="true"/>
        </g>
        <g id="down" display="none" style="stroke-width:1">
            <rect x="0" y="0" width="100" height="18"
                style="fill:rgb(230,230,230);stroke:none"/>
            <polyline points="0,18 0,0 100,0" style="stroke:black;
                fill:none"/>
            <polyline points="0,18 100,18 100,0" style="stroke:
                white;fill:none"/>
            <dsvg:constraint propertyName="stroke-width"
                scaleImmunity="true"/>
        </g>
        <g id="hover" display="none" style="stroke-width:2">
            <rect x="0" y="0" width="100" height="18"
                style="fill:rgb(230,230,230);stroke:none"/>
            <polyline points="0,18 0,0 100,0" style="stroke:white;
                fill:none"/>
            <polyline points="0,18 100,18 100,0" style="stroke:
                black;fill:none"/>
            <rect x="1" y="1" width="98" height="16" style="fill:
                none;stroke:#199DBF;stroke-width:1">
                <dsvg:constraint propertyName="stroke-width"
                    scaleImmunity="true"/>
            </rect>
            <dsvg:constraint propertyName="stroke-width"
                scaleImmunity="true"/>
        </g>
        <g id="disabled" display="none" style="stroke-width:1;
            opacity:0.5">
            <rect x="0" y="0" width="100" height="18"
                style="fill:rgb(230,230,230);stroke:none"/>
            <polyline points="0,18 0,0 100,0" style="stroke:white;
                fill:none"/>
            <polyline points="0,18 100,18 100,0" style="stroke:
                black;fill:none"/>
            <dsvg:constraint propertyName="stroke-width"
                scaleImmunity="true"/>
        </g>
    <g>
</svg>
skinCalendar.svg
<?xml version="1.0"?>
<svg>
    <g id="skinCalendar">
        <use id="CalendarBackSkin" xlink:
            href="skinCalendar.svg#skinCalendarBack" x="0"
            y="0"/>
        <use id="DaysButtonsSkin" xlink:
            href="skinCalendar.svg#skinDaysButtons" x="1"
            y="40"/>
    </g>
    <g id="skinCalendarBack">
    <g id="up">
    <g id="calendarBack">
        <path fill="#5D80D5" d="M243 1510-14-131 0-18 13 149 0z"/>
        <path fill="#F2F2F2" d="M244 291-244 0 0-3 244 0 0 3z"/>
        <path fill="#F2F2F2" d="M244 231-244 0 0-3 244 0 0 3z"/>
        <path fill="#F2F2F2" d="M244 341-244 0 0-3 244 0 0 3z"/>
        <text x="15" y="30" fill="#5D80D5" font-weight="normal" font-size="9" font-family="Verdana">S</text>
        <text x="48" y="30" fill="#5D80D5" font-weight="normal" font-size="9" font-family="Verdana">M</text>
        <text x="85" y="30" fill="#5D80D5" font-weight="normal" font-size="9" font-family="Verdana">T</text>
        <text x="119" y="30" fill="#5D80D5" font-weight="normal" font-size="9" font-family="Verdana">W</text>
```

```
<text x="157" y="30" fill="#5D80D5" font-
    weight="normal"    font-size="9"    font-
    family="Verdana">T</text>
<text x="190" y="30" fill="#5D80D5" font-
    weight="normal"    font-size="9"    font-
    family="Verdana">F</text>
<text x="224" y="30" fill="#5D80D5" font-
    weight="normal"    font-size="9"    font-
    family="Verdana">S</text>
<path fill="none" stroke="#666666" d="M 0 181244 0"/>
<!--<rect fill="none" x="9" y="8" width="287"
height="287"/>-->
</g>
</g>
<g id="down">
<use id="backDown" xlink:href="#calendarBack" x="0"
y="0"/>
</g>
<g id="hover">
<use id="backHover" xlink:href="#calendarBack" x="0"
y="0"/>
</g>
<g id="disabled">
<use id="backDisabled" xlink:href="#calendarBack"
x="0" y="0"/>
</g>
<g id="label">
<text text-anchor="end" x="240" y="12" fill="#FFFFFF"
font-weight="normal"    font-size="11"    font-
family="Verdana"></text>
</g>
</g>
<g id="skinDaysButtons">
<g id="up">
    <rect height="33" width="35" stroke="none"
        fill="none"/>
    <path fill="#E5FFFF" stroke="#0083C4" d="M31
        291-31 0 0-29 31 0 0 29z"/>
</g>
<g id="down">
    <path fill="#EDAF0D" stroke="#0083C4" d="M31
        291-31 0 0-29 31 0 0 29z"/>
</g>
<g id="hover">
    <path fill="#E5FFFF" stroke="#0083C4" stroke-
        width="2" d="M31 291-31 0 0-29 31 0 0 29z"/>
</g>
<g id="focusUp">
    <path fill="#E5FFFF" stroke="#0083C4" d="M31
        291-31 0 0-29 31 0 0 29z"/>
</g>
<g id="disabledUp">
    <path fill="#F7FFFF" stroke="#98B2E5" d="M31
        291-31 0 0-29 31 0 0 29z"/>
</g>
<g id="label">
<text    text-anchor="middle"    x="20"    y="23"
fill="#666666" font-weight="normal" font-size="10" font-
family="Verdana"></text>
</g>
</g>
<g id="skinDaysButtonsNonPaid">
<g id="down">
    <path fill="green" stroke="#0083C4" d="M31 291-31
        0 0-29 31 0 0 29z"/>
</g>
</g>
<g id="skinDaysButtonsHalfDayNonPaid">
<g id="down">
    <path fill="blue" stroke="#0083C4" d="M31 291-31 0
        0-29 31 0 0 29z"/>
</g>
</g>
<g id="skinDaysButtonsHalfDayPaid">
<g id="down">
    <path fill="red" stroke="#0083C4" d="M31 291-31 0
        0-29 31 0 0 29z"/>
</g>
</g>
</svg>
skinCheckbox_Default.svg
<?xml version="1.0" standalone="no" ?>
<svg>
<g id="skinCheckbox">
<g id="label">
    <text x="15" y="10.5" style="font-weight:normal;
        font-size:12;font-family:Tahoma;  fill:#000000;">
    </text>
</g>
<g id="up" display="all">
    <rect x="0" y="0" width="12" height="12"
        style="stroke:black;fill:white"/>
</g>
<g id="down" display="none">
    <rect x="0" y="0" width="12" height="12"
        style="stroke:black;fill:white"/>
    <path d="M 2 612 4 1 6.5-8" style="fill:#FFFFFF;
        stroke:#000000;stroke-width:1"/>
</g>
<g id="hover" display="none">
    <rect x="0" y="0" width="12" height="12"
        style="stroke:black;fill:white"/>
</g>
<g id="disabled" style="opacity:0.5" display="none">
    <rect x="0" y="0" width="12" height="12"
        style="stroke:black;fill:white"/>
</g>
</g>
</svg>
skinComboBox_Composite.svg
<?xml version="1.0"?>
<svg xmlns:dsvg="http://corel.org/dsvg">
<g id="skinComboBox">
<use    id="TextBoxSkin"    xlink:
    href="skinTextBox_ComboBox.svg#skinTextbox"
    x="0" y="0"/>
<use    id="ButtonSkin"    xlink:
    href="skinButton_ComboBox.svg#skinButton"
    x="200" y="0"/>
<use    id="DropDownSkin"    xlink:
    href="skinListBox_Composite.svg#skinListBox"
    x="0" y="17"/>
<g id="label">
    <text id="skinComboBoxDefault_bodyText" x="0"
        y="-6" fill="black"></text>
    <dsvg:constraint scaleImmunity="true" hAlign="left"
        vAlign="bottom"/>
</g>
</g>
</svg>
skinComboBox_Default.svg
<?xml version="1.0"?>
<svg>
<g id="skinComboBox">
```

```
<g id="up" display="all">
    <g id="skinComboBox_label">
        <text x="0" y="−5" style="fill:#000000;font-weight:
            normal;font-size:12;font-family:Tahoma">
            </text>
    </g>
    <g id="skinComboBox_body" style="fill:none">
        <rect x="0" y="0" width="200" height="17"
            style="fill:#FFFFFF;stroke:#A3A3A3;stroke-
            width:1"/>
        <rect x="200" y="0" width="17" height="17"
            style="fill:#000000;stroke:#A3A3A3;stroke-
            width:1"/>
        <path d="M 205 516 0 1-3 6 z" style="fill:#FFFFFF;
            stroke:#FFFFFF;stroke-width:1"/>
        <text id="skinComboBox bodyText" x="5" y="13"
            style="fill:#676767;font-weight:normal;font-size:
            12;font-family:Tahoma"></text>
    </g>
    <g id="skinComboBox_bodyCover">
        <rect x="0" y="0" width="200" height="17"
            fill="none" stroke="none" pointer-events="fill"/>
    </g>
    <g id="skinComboBox_dropDownButton">
        <rect x="200" y="0" width="17" height="17"
            style="fill:#000000;stroke:#000000;stroke-width:
            1"/>
        <path d="M 205 516 0 1-3 6 z" style="fill:#FFFFFF;
            stroke:#FFFFFF;stroke-width:1"/>
        <g>
    </g>
</g>
<g id="down" display="none">
    <g id="skinComboBox_label">
        <text x="0" y="−5" style="fill:#000000;font-weight:
            normal;font-size:12;font-family:Tahoma">
            </text>
    </g>
    <g id="skinComboBox_body" style="fill:none">
        <rect x="0" y="0" width="200" height="17"
            style="fill:#FFFFFF;stroke:#A3A3A3;stroke-
            width:1"/>
        <rect x="200" y="0" width="17" height="17"
            style="fill:#000000;stroke:#A3A3A3;stroke-
            width:1"/>
        <path d="M 205 5 1 6 0 1-3 6 z" style="fill:#FFFFFF;
            stroke:#FFFFFF;stroke-width:1"/>
        <text id="skinComboBox bodyText" x="5" y="13"
            style="fill:#676767;font-weight:normal;font-size:
            12;font-family:Tahoma"></text>
    </g>
    <g id="skinComboBox_bodyCover">
        <rect x="0" y="0" width="200" height="17"
            fill="none" stroke="none" pointer-events="fill"/>
    </g>
    <g id="skinComboBox_dropDownButton">
        <rect x="200" y="0" width="17" height="17"
            style="fill:#199DBF;stroke:#199DBF;stroke-
            width:1"/>
        <path d="M 205 516 0 1-3 6 z" style="fill:#FFFFFF;
            stroke:#FFFFFF;stroke-width:1"/>
    </g>
</g>
<g id="hover" display="none">
    <g id="skinComboBox_label">
        <text x="0" y="−5" style="fill:#000000;font-weight:
            normal;font-size:12;font-family:Tahoma">
            </text>
    </g>
    <g id="skinComboBox_body" style="fill:none">
        <rect x="0" y="0" width="200" height="17"
            style="fill:#FFFFFF;stroke:#A3A3A3;stroke-
            width:1"/>
        <rect x="200" y="0" width="17" height="17"
            style="fill:#000000;stroke:#A3A3A3;stroke-
            width:1"/>
        <path d="M 205 516 0 1-3 6 z" style="fill:#FFFFFF;
            stroke:#FFFFFF;stroke-width:1"/>
        <text id="skinComboBox_bodyText" x="5" y="13"
            style="fill:#676767;font-weight:normal;font-size:
            12;font-family:Tahoma"></text>
    </g>
    <g id="skinComboBox_bodyCover">
        <rect fill="none" stroke="none" pointer-
            events="fill" x="0" y="0" width="200"
            height="17"/>
    </g>
    <g id="skinComboBox_dropDownButton">
        <rect x="200" y="0" width="17" height="17"
            style="fill:#199DBF;stroke:#199DBF;stroke-
            width:1"/>
        <path d="M 205 516 01-3 6 z" style="fill:#FFFFFF;
            stroke:#FFFFFF;stroke-width:1"/>
        <g>
    </g>
</g>
<g id="skinComboBox_dropDownList">
    <g id="skinComboBox_dropDownList_top">
        <line x1="0" y1="17" x2="0" y2="20"
            style="stroke:#000000;stroke-width:1"/>
        <line x1="217" y1="17" x2="217" y2="20"
            style="stroke:#000000;stroke-width:1"/>
        <rect x="1" y="18" width="215" height="2"
            style="fill:#FFFFFF"/>
    </g>
    <g id="skinComboBox_dropDownList_middle">
        <line x1="0" y1="20" x2="0" y2="35"
            style="stroke:#000000;stroke-width:1"/>
        <line x1="217" y1="20" x2="217" y2="35"
            style="stroke:#000000;stroke-width:1"/>
        <rect x="1" y="20" width="215" height="14"
            style="fill:#FFFFFF;stroke:#FFFFFF;stroke-
            width:1" isback="true"/>
    </g>
    <g id="skinComboBox_dropDownList_bottom">
        <line x1="0" y1="35" x2="0" y2="38"
            style="stroke:#000000;stroke-width:1"/>
        <line x1="217" y1="35" x2="217" y2="38"
            style="stroke:#000000;stroke-width:1"/>
        <line x1="0" y1="38" x2="217" y2="38"
            style="stroke:#000000;stroke-width:1"/>
        <rect x="1" y="36" width="215" height="2"
            style="fill:#FFFFFF"/>
    </g>
    <g>
    </g>
</g>
</svg>
skinComboBox_Graphic.svg
<?xml version="1.0"?>
<svg>
    <g id="skinComboBox">
        <use id="TextBoxSkin" xlink:href=
            "skinTextBox_ComboBox_Short.svg#skinTextbox"
            x="0" y="0"/>
```

```
<use         id="ButtonSkin"         xlink:
    href="skinButton_ComboBox.svg#skinButton"
    x="133" y="0"/>
<use         id="DropDownSkin"         xlink:
    href="skinListBox_CompositeG.svg#skinListBox"
    x="0" y="17"/>
<g id="label">
    <text id="skinComboBoxDefault_bodyText" x="0"
        y="–6" fill="black"></text>
    <dsvg:constraint scaleImmunity="true" hAlign="left"
        vAlign="bottom"/>
</g>
</g>
</svg>
skinComboBox_Graphic2.svg
<?xml version="1.0"?>
<svg>
<g id="skinComboBox">
    <use         id="TextBoxSkin"         xlink:href=
        "skinTextBox_ComboBox_Short.svg#skinTextbox"
        x="0" y="0" I>
    <use         id="ButtonSkin"         xlink:
        href="skinButton_ComboBox.svg#skinButton"
        x="133" y="0"/>
    <use         id="DropDownSkin"         xlink:
        href="skinListBox_CompositeG2.svg#skinListBox"
        x="0" y="17"/>
    <g id="label">
        <text id="skinComboBoxDefault_bodyText" x="0"
            y="–6" fill="black"></text>
        <dsvg:constraint scaleImmunity="true" hAlign="left"
            vAlign="bottom"/>
    </g>
</g>
</svg>
skinContextMenu_Default.svg
<?xml version="1.0"?>
<svg xmlns:dsvg="http://corel.org/dsvg">
<g id="skinContextMenu">
<g id="skinContextMenu_top" display="all">
    <line x1="0" y1="17" x2="0" y2="20" style="stroke:
        #000000;stroke-width:1"/>
    <line   x1="150"   y1="17"   x2="150"   y2="20"
        style="stroke:#000000;stroke-width:1"/>
    <line   x1="0"   y1="17"   x2="150"   y2="17"
        style="stroke:#000000;stroke-width:1"/>.
    <rect   x="1"   y="18"   width="148"   height="2"
        style="fill:#FFFFFF"/>
</g>
<g id="skinContextMenu_middle" display="all">
    <line x1="0" y1="20" x2="0" y2="35" style="stroke:
        #000000;stroke-width:1"/>
    <line   x1="150"   y1="20"   x2="150"   y2="35"
        style="stroke:#000000;stroke-width:1"/>
    <rect   x="1"   y="20"   width="148"   height="14"
        style="fill:#FFFFFF;stroke:#FFFFFF;stroke-width:
        1" isback="true"/>
    <text x="3" y="32" id="label">
        <dsvg:constraint     preserveAspectRatio="vertical"
            hAlign="left" vAlign="bottom"/>
    </text>
</g>
<g         id="skinContextMenu_middle_hover"
    display="none">
    <line x1="0" y1="20" x2="0" y2="35" style="stroke:
        #000000;stroke-width:1"/>
    <line   x1="150"   y1="20"   x2="150"   y2="35"
        style="stroke:#000000;stroke-width:1"/>
    <rect   x="1"   y="20"   width="148"   height="14"
        style="fill:#CCCCCC;stroke:#FFFFFF;stroke-
        width:1" isback="true"/>
    <text x="3" y="32" id="label">
        <dsvg:constraint     preserveAspectRatio="vertical"
            hAlign="left" vAlign="bottom"/>
    </text>
</g>
<g         id="skinContextMenu_middle_selected"
    display="none">
    <line x1="0" y1="20" x2="0" y2="35" style="stroke:
        #000000;stroke-width:1"/>
    <line   x1="150"   y1="20"   x2="150"   y2="35"
        style="stroke:#000000;stroke-width:1"/>
    <rect x="1" y="20" width="148" height="14" style="fill:
        #FF0000;stroke:#FFFFFF;stroke-width:1"
        isback="true"/>
    <text x="3" y="32" id="label">
        <dsvg:constraint     preserveAspectRatio="vertical"
            hAlign="left" vAlign="bottom"/>
    </text>
</g>
<g id="skinContextMenu_bottom" display="all">
    <line x1="0" y1="35" x2="0" y2="38" style="stroke:
        #000000;stroke-width:1"/>
    <line   x1="150"   y1="35"   x2="150"   y2="38"
        style="stroke:#000000;stroke-width:1"/>
    <line   x1="0"   y1="38"   x2="150"   y2="38"
        style="stroke:#000000;stroke-width:1"/>
    <rect   x="1"   y="36"   width="215"   height="2"
        style="fill:#FFFFFF"/>
</g>
</g>
</svg>
skinContextMenu_Default2.svg
<?xml version="1.0"?>
<svg>
<g id="skinContextMenu">
<g id="skinContextMenu_top" display="all">
    <line x1="0" y1="17" x2="0" y2="20" style="stroke:
        #000000;stroke-width:1"/>
    <line   x1="150"   y1="17"   x2="150"   y2="20"
        style="stroke:#000000;stroke-width:1"/>
    <line   x1="0"   y1="17"   x2="150"   y2="17"
        style="stroke:#000000;stroke-width:1"/>
    <rect   x="1"   y="18"   width="148"   height="2"
        style="fill:#FFFFFF"/>
</g>
<g id="skinContextMenu_middle" display="all">
    <line x1="0" y1="20" x2="0" y2="35" style="stroke:
        #000000;stroke-width:1"/>
    <line   x1="150"   y1="20"   x2="150"   y2="35"
        style="stroke:#000000;stroke-width:1"/>
    <rect   x="1"   y="20"   width="148"   height="14"
        style="fill:#FFFFFF;stroke:#FFFFFF;stroke-width:
        1" isback="true"/>
    <text x="3" y="32" id="label"></text>
</g>
<g         id="skinContextMenu_middle_hover"
    display="none">
    <line x1="0" y1="20" x2="0" y2="35" style="stroke:
        #000000;stroke-width:1"/>
    <line   x1="150"   y1="20"   x2="150"   y2="35"
        style="stroke:#000000;stroke-width:1"/>
```

```
    <rect x="1" y="20" width="148" height="14"
        style="fill:#CCCCCC;stroke:#FFFFFF;stroke-
        width:1" isback="true"/>
    <text x="3" y="32" id="label"></text>
</g>
<g         id="skinContextMenu_middle_selected"
display="none">
    <line x1="0" y1="20" x2="0" y2="35" style="stroke:
        #000000;stroke-width:1"/>
    <line   x1="150"   y1="20"    x2="150"   y2="35"
        style="stroke:#000000;stroke-width:1"/>
    <rect x="1" y="20" width="148" height="14" style="fill:
        #FF0000;stroke:#FFFFFF;stroke-width:1
        isback="true"/>
    <text x="3" y="32" id="label"></text>
</g>
<g id="skinContextMenu_bottom" display="all">
    <line x1="0" y1="35" x2="0" y2="38" style="stroke:
        #000000;stroke-width:1"/>
    <line   x1="150"   y1="35"    x2="150"   y2="38"
        style="stroke:#000000;stroke-width:1"/>
    <line   x1="0"    y1="38"    x2="150"   y2="38"
        style="stroke:#000000;stroke-width:1"/>
    <rect    x="1"   y="36"    width="215"   height="2"
        style="fill:#FFFFFF"/>
</g>
</g>
</svg>
skinContextMenu_Graphic.svg
<?xml version="1.0"?>
<svg>
<g id="skinContextMenu">
<g id="skinContextMenu_top" display="all">
    <line x1="0" y1="0" x2="0" y2="3" style="stroke:
        #000000;stroke-width:1"/>
    <line    x1="150"    y1="0"    x2="150"    y2="3"
        style="stroke:#000000;stroke-width:1"/>
    <line x1="0" y1="0" x2="150" y2="0" style="stroke:
        #000000; stroke-width:1"/>
    <rect x="1" y="1" width="148" height="2" style="fill:
        #FFFFFF"/>
</g>
<g id="skinContextMenu_middle" display="all">
    <line x1="0" y1="3" x2="0" y2="18" style="stroke:
        #000000;stroke-width:1"/>
    <line    x1="150"    y1="3"    x2="150"   y2="18"
        style="stroke:#000000;stroke-width:1"/>
    <rect    x="1"    y="3"    width="148"    height="14"
        style="fill:#FFFFFF;stroke:#FFFFFF;stroke-width:
        1" isback="true"/>
    <text x="3" y="21" id="label"></text>
</g>
<g id="skinContextMenu_middle_hover" display="none">
    <line x1="0" y1="3" x2="0" y2="18" style="stroke:
        #000000;stroke-width:1"/>
    <line x1="150" y1="3" x2="150" y2="18" style="stroke:
        #000000;stroke-width:1"/>
    <rect x="1" y="3" width="148" height="14" style="fill:
        #CCCCCC;stroke:#FFFFFF;stroke-width:1
        isback="true"/>
    <text x="3" y="21" id="label"></text>
</g>
<g         id="skinContextMenu_middle_selected"
display="none">
    <line x1="0" y1="3" x2="0" y2="18" style="stroke:
        #000000;stroke-width:1"/>
```

```
    <line x1="150" y1="3" x2="150" y2="18" style="stroke:
        #000000;stroke-width:1"/>
    <rect x="1" y="3" width="148" height="14" style="fill:
        #FF0000;stroke:#FFFFFF;stroke-width:1
        isback="true"/>
    <text x="3" y="21" id="label"><text>
</g>
<g id="skinContextMenu_bottom" display="all"><line
        x1="0"    y1="18"    x2="0"    y2="21"   style="stroke:
        #000000;stroke-width:1"/>
    <line    x1="150"    y1="18"    x2="150"   y2="21"
        style="stroke:#000000;stroke-width:1"/>
    <line    x1="0"    y1="21"    x2="150"   y2="21"
        style="stroke:#000000;stroke-width:1"/>
    <rect    x="1"    y="19"    width="148"    height="2"
        style="fill:#FFFFFF"/>
</g>
</g>
</svg>
skinContextMenu_Graphic2.svg
<?xml version="1.0"?>
<svg>
<g id="skinContextMenu">
<g id="skinContextMenu_top" display="all">
    <line x1="0" y1="0" x2="0" y2="3" style="stroke:
        #000000;stroke-width:1"/>
    <line    x1="133"    y1="0"    x2="133"    y2="3"
        style="stroke:#000000;stroke-width:1"/>
    <line x1="0" y1="0" x2="133" y2="0" style="stroke:
        #000000;stroke-width:1"/>
    <rect x="1" y="1" width="131" height="2" style="fill:
        #FFFFFF"/>
</g>
<g id="skinContextMenu_middle" display="all">
    <line x1="0" y1="3" x2="0" y2="18" style="stroke:
        #000000;stroke-width:1"/>
    <line    x1="133"    y1="3"    x2="133"   y2="18"
        style="stroke:#000000;stroke-width:1"/>
    <rect    x="1"    y="3"    width="131"    height="14"
        style="fill:#FFFFFF;stroke:#FFFFFF;stroke-width:
        1" isback="true"/>
    <text x="3" y="21" id="label"></text>
<g>
<g         id="skinContextMenu_middle_hover"
display="none">
    <line x1="0" y1="3" x2="0" y2="18" style="stroke:
        #000000;stroke-width:1"/>
    <line x1="133" y1="3" x2="133" y2="18" style="stroke:
        #000000;stroke-width:1"/>
    <rect x="1" y="3" width="131" height="14" style="fill:
        #8888CC;stroke:#FFFFFF;stroke-width:1
        isback="true"/>
    <text x="3" y="21" id="label"></text>
<g>
<g         id="skinContextMenu_middle_selected"
display="none">
    <line x1="0" y1="3" x2="0" y2="18" style="stroke:
        #000000;stroke-width:1"/>
    <line x1="133" y1="3" x2="133" y2="18" style="stroke:
        #000000;stroke-width:1"/>
    <rect x="1" y="3" width="131" height="14" style="fill:
        #FF0000;stroke:#FFFFFF;stroke-width:1
        isback="true"/>
    <text x="3" y="21" id="label"></text>
</g>
<g id="skinContextMenu_bottom" display="all">
```

```
        <line x1="0" y1="18" x2="0" y2="21" style="stroke:
            #000000;stroke-width:1"/>
        <line x1="133" y1="18" x2="133" y2="21"
            style="stroke:#000000;stroke-width:1"/>
        <line x1="0" y1="21" x2="133" y2="21"
            style="stroke:#000000;stroke-width:1"/>
        <rect x="1" y="19" width="131" height="2"
            style="fill:#FFFFFF"/>
      </g>
    </g>
</svg>
skinContextMenu_Graphic3.svg
<?xml version="1.0"?>
<svg>
    <g id="skinContextMenu">
      <g id="skinContextMenu_top" display="all">
        <line x1="0" y1="0" x2="0" y2="3" style="stroke:
            #000000;stroke-width:1"/>
        <line x1="233" y1="0" x2="233" y2="3"
            style="stroke:#000000;stroke-width:1"/>
        <line x1="0" y1="0" x2="233" y2="0" style="stroke:
            #000000;stroke-width: 1"/>
        <rect x="1" y="1" width="231" height="2" style="fill:
            #FFFFFF"/>
      <g id="skinContextMenu_middle" display="all">
        <line x1="0" y1="3" x2="0" y2="18" style="stroke:
            #000000;stroke-width:1"/>
        <line x1="233" y1="3" x2="233" y2="18"
            style="stroke:#000000;stroke-width:1"/>
        <rect x="1" y="3" width="231" height="14"
            style="fill:#FFFFFF;stroke:#FFFFFF;stroke-width:
            1" isback="true"/>
        <text x="3" y="21" id="label"></text>
      </g>
      <g id="skinContextMenu_middle_hover" display="none">
        <line x1="0" y1="3" x2="0" y2="18" style="stroke:
            #000000;stroke-width:1"/>
        <line x1="233" y1="3" x2="233" y2="18" style="stroke:
            #000000;stroke-width:1"/>
        <rect x="1" y="3" width="231" height="14" style="fill:
            #8888CC;stroke:#FFFFFF;stroke-width:1"
            isback="true"/>
        <text x="3" y="21" id="label"></text>
      </g>
        <g           id="skinContextMenu_middle_selected"
display="none">
        <line x1="0" y1="3" x2="0" y2="18" style="stroke:
            #000000;stroke-width: 1"/>
        <line x1="233" y1="3" x2="233" y2="18" style="stroke:
            #000000;stroke-width: 1"/>
        <rect x="1" y="3" width="231" height="14" style="fill:
            #FF0000;stroke:#FFFFFF;stroke-width:1"
            isback="true"/>
        <text x="3" y="21" id="label"></text>
      </g>
      <g id="skinContextMenu_bottom" display="all">
        <line x1="0" y1="18" x2="0" y2="21" style="stroke:
            #000000;stroke-width:1"/>
        <line x1="233" y1="18" x2="233" y2="21"
            style="stroke:#000000;stroke-width:1"/>
        <line x1="0" y1="21" x2="233" y2="21"
            style="stroke:#000000;stroke-width:1"/>
        <rect x="1" y="19" width="231" height="2"
            style="fill:#FFFFFF"/>
      </g>
    </g>
</svg>
skinContextMenu_ListBox.svg
<?xml version="1.0"?>
<svg xmlns:dsvg="http://corel.org/dsvg">
    <g id="skinContextMenu">
      <g id="skinContextMenu_top" display="all">
        <line x1="0" y1="0" x2="0" y2="3" style="stroke:
            #000000;stroke-width:1"/>
        <line x1="200" y1="0" x2="200" y2="3"
            style="stroke:#000000;stroke-width:1"/>
        <line x1="0" y1="0" x2="200" y2="0" style="stroke:
            #000000;stroke-width:1"/>
        <rect x="1" y="1" width="198" height="2" style="fill:
            #FFFFFF"/>
      </g>
      <g id="skinContextMenu_middle" display="all">
        <line x1="0" y1="3" x2="0" y2="18" style="stroke:
            #000000;stroke-width:1"/>
        <line x1="200" y1="3" x2="200" y2="18"
            style="stroke:#000000;stroke-width:1"/>
        <rect x="1" y="3" width="198" height="14"
            style="fill:#FFFFFF;stroke:#FFFFFF;stroke-width:
            1" isback="true"/>
        <text x="3" y="15" id="label">
            <dsvg:constraint   preserveAspectRatio="vertical"
                hAlign="left" vAlign="bottom"/>
        </text>
      </g>
<g id="skinContextMenu_middle_hover" display="none">
        <line x1="0" y1="3" x2="0" y2="18" style="stroke:
            #000000;stroke-width:1"/>
        <line x1="200" y1="3" x2="200" y2="18" style="stroke:
            #000000;stroke-width:1"/>
        <rect x="1" y="3" width="198" height="14" style="fill:
            #CCCCCC;stroke:#FFFFFF;stroke-width:1"
            isback="true"/>
        <text x="3" y="15" id="label">
            <dsvg:constraint   preserveAspectRatio="vertical"
                hAlign="left" vAlign="bottom"/>
        </text>
</g>
<g           id="skinContextMenu_middle_selected"
display="none">
        <line x1="0" y1="3" x2="0" y2="18" style="stroke:
            #000000;stroke-width:1"/>
        <line x1="200" y1="3" x2="200" y2="18" style="stroke:
            #000000;stroke-width:1"/>
        <rect x="1" y="3" width="198" height="14" style="fill:
            #FF0000;stroke:#FFFFFF;stroke-width:1"
            isback="true"/>
        <text x="3" y="15" id="label">
            <dsvg:constraint   preserveAspectRatio="vertical"
                hAlign="left" vAlign="bottom"/>
        </text>
<g>
      <g id="skinContextMenu_bottom" display="all">
        <line x1="0" y1="18" x2="0" y2="21" style="stroke:
            #000000;stroke-width:1"/>
        <line x1="200" y1="18" x2="200" y2="21"
            style="stroke:#000000;stroke-width:1"/>
        <line x1="0" y1="21" x2="200" y2="21"
            style="stroke:#000000;stroke-width:1"/>
        <rect x="1" y="19" width="198" height="2"
            style="fill:#FFFFFF"/>
      </g>
    </g>
</svg>
``` skinContextMenu_ListBox2.svg
```
<?xml version="1.0"?>
<svg xmlns:dsvg="http://corel.org/dsvg">
    <g id="skinContextMenu">
        <g id="skinContextMenu_top" display="all">
            <line x1="0" y1="0" x2="0" y2="3" style="stroke:#000000;stroke-width:1"/>
            <line x1="200" y1="0" x2="200" y2="3" style="stroke:#000000;stroke-width:1"/>
            <line x1="0" y1="0" x2="200" y2="0" style="stroke:#000000;stroke-width:1"/>
            <rect x="1" y="1" width="198" height="2" style="fill:#FFFFFF"/>
        </g>
        <g id="skinContextMenu_middle" display="all">
            <line x1="0" y1="3" x2="0" y2="18" style="stroke:#000000;stroke-width:1"/>
            <line x1="200" y1="3" x2="200" y2="18" style="stroke:#000000;stroke-width:1"/>
            <rect x="1" y="3" width="198" height="14" style="fill:#FFFFFF;stroke:#FFFFFF;stroke-width:1" isback="true"/>
            <text x="3" y="15" id="label">
                <dsvg:constraint preserveAspectRatio="vertical" hAlign="left" vAlign="bottom"/>
            </text>
        </g>
        <g id="skinContextMenu_middle_hover" display="none">
            <line x1="0" y1="3" x2="0" y2="18" style="stroke:#000000;stroke-width:1"/>
            <line x1="200" y1="3" x2="200" y2="18" style="stroke:#000000;stroke-width:1"/>
            <rect x="1" y="3" width="198" height="14" style="fill:#CCCCCC;stroke:#FFFFFF;stroke-width:1" isback="true"/>
            <text x="3" y="15" id="label">
                <dsvg:constraint preserveAspectRatio="vertical" hAlign="left" vAlign="bottom"/>
            </text>
        </g>
        <g id="skinContextMenu_middle_selected" display="none">
            <line x1="0" y1="3" x2="0" y2="18" style="stroke:#000000;stroke-width:1"/>
            <line x1="200" y1="3" x2="200" y2="18" style="stroke:#000000;stroke-width:1"/>
            <rect x="1" y="3" width="198" height="14" style="fill:#FF0000;stroke:#FFFFFF;stroke-width:1" isback="true"/>
            <text x="3" y="15" id="label">
                <dsvg:constraint preserveAspectRatio="vertical" hAlign="left" vAlign="bottom"/>
            </text>
        </g>
        <g id="skinContextMenu_bottom" display="all">
            <line x1="0" y1="18" x2="0" y2="21" style="stroke:#000000;stroke-width:1"/>
            <line x1="200" y1="18" x2="200" y2="21" style="stroke:#000000;stroke-width:1"/>
            <line x1="0" y1="21" x2="200" y2="21" style="stroke:#000000;stroke-width:1"/>
            <rect x="1" y="19" width="198" height="2" style="fill:#FFFFFF"/>
        </g>
    </g>
</svg>
``` skinContextMenu_ListBoxG.svg
```
<?xml version="1.0"?>
<svg>
    <g id="skinContextMenu">
        <g id="skinContextMenu_top" display="all">
            <line x1="0" y1="0" x2="0" y2="3" style="stroke:#000000;stroke-width:1"/>
            <line x1="150" y1="0" x2="150" y2="3" style="stroke:#000000;stroke-width:1"/>
            <line x1="0" y1="0" x2="150" y2="0" style="stroke:#000000;stroke-width:1"/>
            <rect x="1" y="1" width="148" height="2" style="fill:#FFFFFF"/>
        </g>
        <g id="skinContextMenu_middle" display="all">
            <line x1="0" y1="3" x2="0" y2="18" style="stroke:#000000;stroke-width:1"/>
            <line x1="150" y1="3" x2="150" y2="18" style="stroke:#000000;stroke-width:1"/>
            <rect x="1" y="3" width="148" height="14" style="fill:#FFFFFF;stroke:#FFFFFF;stroke-width:1" isback="true"/>
            <text x="3" y="5" id="label"></text>
        </g>
        <g id="skinContextMenu_middle_hover" display="none">
            <line x1="0" y1="3" x2="0" y2="18" style="stroke:#000000;stroke-width:1"/>
            <line x1="150" y1="3" x2="150" y2="18" style="stroke:#000000;stroke-width:1"/>
            <rect x="1" y="3" width="148" height="14" style="fill:#CCCCCC;stroke:#FFFFFF;stroke-width:1" isback="true"/>
            <text x="3" y="5" id="label"></text>
        </g>
        <g id="skinContextMenu_middle_selected" display="none">
            <line x1="0" y1="3" x2="0" y2="18" style="stroke:#000000;stroke-width:1"/>
            <line x1="150" y1="3" x2="150" y2="18" style="stroke:#000000;stroke-width:1"/>
            <rect x="1" y="3" width="148" height="14" style="fill:#FF0000;stroke:#FFFFFF;stroke-width:1" isback="true"/>
            <text x="3" y="5" id="label"></text>
        </g>
        <g id="skinContextMenu_bottom" display="all">
            <line x1="0" y1="18" x2="0" y2="21" style="stroke:#000000;stroke-width:1"/>
            <line x1="150" y1="18" x2="150" y2="21" style="stroke:#000000;stroke-width:1"/>
            <line x1="0" y1="21" x2="150" y2="21" style="stroke:#000000;stroke-width:1"/>
            <rect x="1" y="19" width="215" height="2" style="fill:#FFFFFF"/>
        </g>
    </g>
</svg>
``` skinContextMenu_ListView.svg
```
<?xml version="1.0"?>
<svg>
    <g id="skinContextMenu">
        <g id="skinContextMenu_top" display="all">
            <line x1="0" y1="0" x2="0" y2="3" style="stroke:#000000;stroke-width:1"/>
            <line x1="200" y1="0" x2="200" y2="3" style="stroke:#000000;stroke-width:1"/>
```

```
        <line x1="0" y1="0" x2="200" y2="0" style="stroke:
            #000000;stroke-width:1"/>
        <rect x="1" y="18" width="198" height="2"
            style="fill:#FFFFFF"/>
    </g>
    <g id="skinContextMenu_middle" display="all">
        <line x1="0" y1="3" x2="0" y2="18" style="stroke:
            #000000;stroke-width:1"/>
        <line x1="200" y1="3" x2="200" y2="18"
            style="stroke:#000000;stroke-width:1"/>
        <rect x="1" y="3" width="198" height="14"
            style="fill:#FFFFFF;stroke:#FFFFFF;stroke-width:
            1" isback="true"/>
        <text x="3" y="15" id="label"></text>
    </g>
    <g         id="skinContextMenu_middle_hover"
display="none">
        <line x1="0" y1="3" x2="0" y2="18" style="stroke:
            #000000;stroke-width:1"/>
        <line x1="200" y1="3" x2="200" y2="18" style="stroke:
            #000000;stroke-width:1"/>
        <rect x="1" y="3" width="198" height="14" style="fill:
            #CCCCCC;stroke:#FFFFFF;stroke-width:1"
            isback="true"/>
        <text x="3" y="15" id="label"></text>
    </g>
    <g         id="skinContextMenu_middle_selected"
display="none">
        <line x1="0" y1="3" x2="0" y2="18" style="stroke:
            #000000;stroke-width:1"/>
        <line x1="200" y1="3" x2="200" y2="18" style="stroke:
            #000000;stroke-width:1"/>
        <rect x="1" y="3" width="198" height="14" style="fill:
            #FF0000;stroke:#FFFFFF;stroke-width:1"
            isback="true"/>
        <text x="3" y="15" id="label"></text>
    </g>
    <g id="skinContextMenu_bottom" display="all">
        <line x1="0" y1="18" x2="0" y2="21" style="stroke:
            #000000;stroke-width:1"/>
        <line     x1="200"    y1="18"    x2="200"    y2="21"
            style="stroke:#000000;stroke-width:1"/>
        <line     x1="0"     y1="21"    x2="200"    y2="21"
            style="stroke:#000000;stroke-width:1"/>
        <rect    x="1"    y="19"    width="198"    height="2"
            style="fill:#FFFFFF"/>
    </g>
 </g>
</svg>
skinContextMenu_ListViewG.svg
<?xml version="1.0"?>
<svg>
    <g id="skinContextMenu">
        <g id="skinContextMenu_top" display="all">
            <line x1="0" y1="0" x2="0" y2="3" style="stroke:
                #000000;stroke-width:1"/>
            <line     x1="150"    y1="0"    x2="150"    y2="3"
                style="stroke:#000000;stroke-width:1"/>
            <line x1="0" y1="0" x2="150" y2="0" style="stroke:
                #000000;stroke-width:1"/>
            <rect x="1" y="1" width="148" height="2" style="fill:
                #FFFFFF"/>
        </g>
        <g id="skinContextMenu_middle" display="all">
            <line x1="0" y1="3" x2="0" y2="18" style="stroke:
                #000000;stroke-width:1"/>
```

```
            <line     x1="150"    y1="3"    x2="150"    y2="18"
                style="stroke:#000000;stroke-width:1"/>
            <rect x="1" y="3" width="148" height="14"
                style="fill:#FFFFFF;stroke:#FFFFFF;stroke-width:
                1" isback="true"/>
            <text x="3" y="5" id="label"></text>
        </g>
        <g         id="skinContextMenu_middle_hover"
display="none">
            <line x1="0" y1="3" x2="0" y2="18" style="stroke:
                #000000;stroke-width:1"/>
            <line x1="150" y1="3" x2="150" y2="18" style="stroke:
                #000000;stroke-width:1"/>
            <rect x="1" y="3" width="148" height="14" style="fill:
                #CCCCCC;stroke:#FFFFFF;stroke-width:1"
                isback="true"/>
            <text x="3" y="5" id="label"></text>
        </g>
        <g         id="skinContextMenu_middle_selected"
display="none">
            <line x1="0" y1="3" x2="0" y2="18" style="stroke:
                #000000;stroke-width:1"/>
            <line x1="150" y1="3" x2="150" y2="18" style="stroke:
                #000000;stroke-width:1"/>
            <rect x="1" y="3" width="148" height="14" style="fill:
                #FF0000;stroke:#FFFFFF;stroke-width:1"
                isback="true"/>
            <text x="3" y="5" id="label"></text>
        </g>
        <g id="skinContextMenu_bottom" display="all">
            <line x1="0" y1="18" x2="0" y2="21" style="stroke:
                #000000;stroke-width:1"/>
            <line     x1="150"    y1="18"    x2="150"    y2="21"
                style="stroke:#000000;stroke-width:1"/>
            <line     x1="0"    y1="21"    x2="150"    y2="21"
                style="stroke:#000000;stroke-width: 1"/>
            <rect    x="1"    y="19"    width="215"   height="2"
                style="fill:#FFFFFF"/>
        </g>
    <g>
</svg>
skinContextMenu_vp.svg
<?xml version="1.0"?>
<svg>
    <g id="skinContextMenu">
        <g id="skinContextMenu_top" display="all">
            <line x1="0" y1="17" x2="0" y2="20" style="stroke:
                #000000;stroke-width:1"/>
            <line     x1="150"   y1="17"    x2="150"   y2="20"
                style="stroke:#000000;stroke-width:1"/>
            <line     x1="0"    y1="17"    x2="150"   y2="17"
                style="stroke:#000000;stroke-width:1"/>
            <rect    x="1"    y="18"    width="148"    height="2"
                style="fill:#FFFFFF"/>
        </g>
        <g id="skinContextMenu_middle" display="all">
            <line x1="0" y1="20" x2="0" y2="35" style="stroke:
                #000000;stroke-width:1"/>
            <line     x1="150"   y1="20"    x2="150"   y2="35"
                style="stroke:#000000;stroke-width:1"/>
            <rect x="1" y="20" width="148" height="14"
                style="fill:#FFFFFF;stroke:#FFFFFF;stroke-width:
                1" isback="true"/>
            <text x="3" y="32" id="label"></text>
        </g>
        <g         id="skinContextMenu_middle_hover"
display="none">
```

```
        <line x1="0" y1="20" x2="0" y2="35" style="stroke:
            #000000;stroke-width:1"/>
        <line x1="150" y1="20" x2="150" y2="35"
            style="stroke:#000000;stroke-width:1"/>
        <rect x="1" y="20" width="148" height="14"
            style="fill:#CCCCCC;stroke:#FFFFFF;stroke-
            width:1" isback="true"/>
        <text x="3" y="32" id="label"></text>
    </g>
    <g      id="skinContextMenu_middle_selected"
display="none">
        <line x1="0" y1="20" x2="0" y2="35" style="stroke:
            #000000;stroke-width:1"/>
        <line x1="150" y1="20" x2="150" y2="35"
            style="stroke:#000000;stroke-width:1"/>
        <rect x="1" y="20" width="148" height="14" style="fill:
            #FF0000;stroke:#FFFFFF;stroke-width:1"
            isback="true"/>
        <text x="3" y="32" id="label"></text>
    </g>
    <g id="skinContextMenu_bottom" display="all">
        <line x1="0" y1="35" x2="0" y2="38" style="stroke:
            #000000;stroke-width:1"/>
        <line x1="150" y1="35" x2="150" y2="38"
            style="stroke:#000000;stroke-width:1"/>
        <line x1="0" y1="38" x2="150" y2="38"
            style="stroke:#000000;stroke-width:1"/>
        <rect x="1" y="36" width="215" height="2"
            style="fill:#FFFFFF"/>
    </g>
  </g>
</svg>
skinListbox_Composite.svg
<?xml version="1.0"?>
<svg>
    <g id="skinListBox">
        <use        id="MenuSkin"        xlink:href=
            "skinContextMenu_ListBox.svg#skinContextMenu"
            x="0" y="0"/>
        <use        id="ScrollSkin"        xlink:href=
            "skinScrollBar_ListBox.svg#skinScrollBarSmall"
            x="0" y="0"/>
        <g id="label">
            <text id="skinListBox_label" x="0" y="-6"
                fill="black"></text>
        </g>
    </g>
</svg>
skinListbox_CompositeG.svg
<?xml version="1.0"?>
<svg>
    <g id="skinListBox">
        <use        id="MenuSkin"        xlink:href=
            "skinContextMenu_Graphic.svg#skinContextMenu"
            x="0" y="0"/>
        <use        id="ScrollSkin"        xlink:href=
            "skinScrollBar_ListBox.svg#skinScrollBarSmall"
            x="0" y="0"/>
        <g id="label">
            <text id="skinListBox_label" x="0" y="-6"
                fill="black"></text>
        </g>
    </g>
</svg>
skinListbox_CompositeG2.svg
<?xml version="1.0"?>
<svg>
    <g id="skinListBox">
        <use        id="MenuSkin"        xlink:href=
            "skinContextMenu_Graphic2.svg#skinContextMenu"
            x="0" y="0"/>
        <use        id="ScrollSkin"        xlink:href=
            "skinScrollBar_ListBox.svg#skinScrollBarSmall"
            x="0" y="0"/>
        <g id="label">
            <text id="skinListBox_label" x="0" y="-6"
                fill="black"></text>
        </g>
    </g>
</svg>
skinListbox_CompositeG3.svg
<?xml version="1.0"?>
<svg>
    <g id="skinListBox">
        <use        id="MenuSkin"        xlink:href=
            "skinContextMenu_Graphic3.svg#skinContextMenu"
            x="0" y="0"/>
        <use        id="ScrollSkin"        xlink:href=
            "skinScrollBar_ListBox.svg#skinScrollBarSmall"
            x="0" y="0"/>
        <g id="label">
            <text id="skinListBox_label" x="0" y="-6"
                fill="black"></text>
        </g>
    </g>
</svg>
skinListbox_Default.svg
<?xml version="1.0"?>
<svg xmlns:dsvg="http://corel.org/dsvg">
    <g id="skinButton">
        <g id="label">
            <text x="50" y="13" style="font-family:'Tahoma';
                stroke:none;font-size:12;text-anchor:middle"></
                text>
        <g>
        <g id="up" display="all" style="stroke-width:1">
            <rect x="0" y="0" width="17" height="17" style="fill:
                #000000;stroke:#A3A3A3"/>
            <path d="M 5 5 1 6 0 1-3 6 z" style="fill:#FFFFFF;
                stroke:#FFFFFF"/>
            <dsvg:constraint    preserveAspectRatio="vertical"
                hAlign="right"/>
        </g>
        <g id="down" display="none">
            <rect x="0" y="0" width="17" height="17" style="fill:
                #199DBF;stroke:#A3A3A3"/>
            <path d="M 5 5 1 6 0 1-3 6 z" style="fill:#FFFFFF;
                stroke:#FFFFFF"/>
            <dsvg:constraint    preserveAspectRatio="vertical"
                hAlign="right"/>
        <g>
        <g id="hover" display="none">
            <rect x="0" y="0" width="17" height="17" style="fill:
                #199DBF;stroke:#A3A3A3"/>
            <path d="M 5 5 1 6 0 1-3 6 z" style="fill:#FFFFFF;
                stroke:#FFFFFF"/>
            <dsvg:constraint    preserveAspectRatio="vertical"
                hAlign="right"/>
        <g>
    </g>
</svg>
skinListbox_Short.svg
<?xml version="1.0"?>
<svg>
```

```
<g id="skinListBox">
<use id="TextBoxSkin" xlink:href="skinTextBox_List-
    Box Short.svg#skinTextbox" x="0" y="0"/>
<use id="ButtonSkin" xlink:
    href="skinButton_ListBox.svg#skinButton" x="100"
    y="0"/>
<use id="DropDownSkin" xlink:
    href="skinListBox_Short.svg#skinDropDown" x="0"
    y="0"/>
<g id="label">
<text id="skinListBoxDefault_bodyText" x="0" y=
    "-6" fill="black"></text>
</g>
<g>
<g id="skinDropDown">
<g id="skinDropDown_top">
<line x1="0" y1="17" x2="0" y2="20" style="stroke:
    #000000;stroke-width:1"/>
<line x1="117" y1="17" x2="117" y2="20"
    style="stroke:#000000;stroke-width:1"/>
<rect x="1" y="18" width="115" height="2"
    style="fill:#FFFFFF"/>
</g>
<g id="skinDropDown_middle">
<line x1="0" y1="20" x2="0" y2="35" style="stroke:
    #000000;stroke-width:1"/>
<line x1="117" y1="20" x2="117" y2="35"
    style="stroke:#000000;stroke-width:1"/>
<rect x="1" y="20" width="115" height="14"
    style="fill:#FFFFFF;stroke:#FFFFFF;stroke-width:
    1" isback="true"/>.
<text x="3" y="32" id="label"></text>
</g>
<g id="skinDropDown_middle_hover" display="none">
<line x1="0" y1="20" x2="0" y2="35" style="stroke:
    #000000;stroke-width:1"/>
<line x1="117" y1="20" x2="117" y2="35"
    style="stroke:#000000;stroke-width:1"/>
<rect x="1" y="20" width="115" height="14"
    style="fill:#CCCCCC;stroke:#FFFFFF;stroke-
    width:1" isback="true"/>
<text x="3" y="32" id="label"></text>
</g>
<g id="skinDropDown_bottom">
<line x1="0" y1="35" x2="0" y2="38" style="stroke:
    #000000;stroke-width:1"/>
<line x1="117" y1="35" x2="117" y2="38"
    style="stroke:#000000;stroke-width:1"/>
<line x1="0" y1="38" x2="117" y2="38"
    style="stroke:#000000;stroke-width:1"/>
<rect x="1" y="36" width="115" height="2"
    style="fill:#FFFFFF"/>
</g>
</g>
</svg>
skinListView_Composite.svg
<?xml version="1.0"?>
<svg>
<g id="skinListView">
<use id="MenuSkin" xlink:href=
    "skinContextMenu_ListBox.svg#skinContextMenu"
    x="0" y="0"/>
<use id="ScrollSkin" xlink:href=
    "skinScrollBar_ListBox.svg#skinScrollBarSmall"
    x="0" y="0"/>
<g id="label">
<text id="skinListBox_label" x="0" y="-6"
    fill="black"></text>
</g>
</g>
</svg>
skinListView_CompositeG.svg
<?xml version="1.0"?>
<svg>
<g id="skinListView">
<use id="MenuSkin" xlink:href=
    "skinContextMenu_Graphic.svg#skinContextMenu"
    x="0" y="0"/>
<use id="ScrollSkin" xlink:href=
    "skinScrollBar_ListBox.svg#skinScrollBarSmall"
    x="0" y="0"/>
<g id="label">
<text id="skinListBox_label" x="0" y="-6"
    fill="black"></text>
</g>
</g>
</svg>
skinRadioButton_Default.svg
<?xml version="1.0"?>
<svg>
<g id="skinRadioButton">
<g id="label">
<text x="16" y="5" style="font-size:12;fill:black">
    </text>
</g>
<g id="up" display="all">
<circle cx="5" y="5" r="7" style="stroke:black;fill:
    white"/>
</g>
<g id="down" display="none">
<circle cx="5" y="5" r="7" style="stroke:black;fill:
    white"/>
<circle cx="5" y="5" r="4" style="stroke:black;fill:
    black"/>
</g>
<g id="hover" display="none">
<circle cx="5" y="5" r="7" style="stroke:black;fill:
    white"/>
</g>
<g id="disabled" style="opacity:0.5" display="none">
<circle cx="5" y="5" r="7" style="stroke:black;fill:
    white"/>
</g>
</g>
</svg>
skinScrollBar_Default.svg
<?xml version="1.0"?>
<svg>
<g id="skinScrollBar">
<use id="SliderSkin" xlink:
    href="skinScrollBar_Default.svg#SliderSkin" x="0"
    y="0"/>
<use id="ButtonLeftSkin" xlink:
    href="skinScrollBar_Default.svg#ButtonLeftSkin"
    x="0" y="0"/>
<use id="ButtonRightSkin" xlink:
    href="skinScrollBar_Default.svg#ButtonRightSkin"
    x="0" y="0"/>
<g id="corner">
<rect fill="rgb(212 208 200)" x="0" y="0" width="16"
    height="16"/>
</g>
</g>
```

```
<g id="ButtonLeftSkin">
<g id="up" fill="none" stroke-linecap="square" shape-rendering="optimizeSpeed" display="all">
    <rect fill="rgb(212 208 200)" width="16" height="16"/>
    <line x1="15" y1="0" x2="15" y2="15" style="stroke:#404040"/>
    <line x1="0" y1="15" x2="15" y2="15" style="stroke:#404040"/>
    <line x1="1" y1="1" x2="13" y2="1" style="stroke:#FFFFFF"/>
    <line x1="1" y1="1" x2="1" y2="13" style="stroke:#FFFFFF"/>
    <line x1="1" y1="14" x2="14" y2="14" style="stroke:#808080"/>
    <line x1="14" y1="1" x2="14" y2="14" style="stroke:#808080"/>
    <path fill="black" d="M9.5 5.51-3 313 3z"/>
</g>
<g id="down" fill="none" stroke-linecap="square" shape-rendering="optimizeSpeed" display="none">
    <rect fill="rgb(212 208 200)" width="16" height="16"/>
    <rect fill="none" style="stroke:#808080" width="16" height="16"/>
    <path fill="black" d="M10.5 6.51-3 313 3z"/>
</g>
<g>
<g id="SliderSkin">
<g id="up" display="all">
    <g id="body">
        <rect id="SliderSkinBar" fill="#E6E6E6" x="0" y="0" width="400" height="16">
        </rect>
    </g>
    <g id="SliderSkinThumb">
        <rect id="sliderThumbBar" style="fill:rgb(212 208 200);stroke:#000000;stroke-width:0" x="0" y="0" width="400" height="16"/>
        <line x1="0" x2="400" y1="15" y2="15" style="stroke:#404040"/>
        <line x1="1" x2="398" y1="1" y2="1" style="stroke:#FFFFFF"/>
    <g>
    <pattern id="barfill" width="2" height="2" patternUnits="userSpaceOnUse" shape-rendering="optimizeSpeed">
        <rect x="0" y="0" width="2" height="2" fill="white"/>
        <rect x="0" y="0" width="1" height="1" fill="rgb(212 208 200)"/>
        <rect x="1" y="1" width="1" height="1" fill="rgb(212 208 200)"/>
    </pattern>
<g>
<g id="mask">
    <rect id="sliderMask" x="0" y="0" width="400" height="16" opacity="0"/>
</g>
</g>
<g id="ButtonRightSkin">
<g id="up" fill="none" stroke-linecap="square" shape-rendering="optimizeSpeed" display="all">
    <rect fill="rgb(212 208 200)" width="16" height="16"/>
    <line x1="15" y1="0" x2="15" y2="15" style="stroke:#404040"/>
    <line x1="0" y1="15" x2="15" y2="15" style="stroke:#404040"/>
    <line x1="1" y1="1" x2="13" y2="1" style="stroke:#FFFFFF"/>
    <line x1="1" y1="1" x2="1" y2="13" style="stroke:#FFFFFF"/>
    <line x1="1" y1="14" x2="14" y2="14" style="stroke:#808080"/>
    <line x1="14" y1="1" x2="14" y2="14" style="stroke:#808080"/>
    <path fill="black" d="M6.5 5.513 31-3 3z"/>
</g>
<g id="down" fill="none" stroke-linecap="square" shape-rendering="optimizeSpeed" display="none">
    <rect fill="rgb(212 208 200)" width="16" height="16"/>
    <rect fill="none" style="stroke:#808080" width="16" height="16"/>
    <path fill="black" d="M7.5 6.513 31-3 3z"/>
</g>
</g>
<g id="skinScrollBarSmall">
<use id="SliderSkin" xlink:href="skinScrollBar_Default.svg#SliderSkinSmall" x="0" y="0"/>
<use id="ButtonLeftSkin" xlink:href="skinScrollBar_Default.svg#ButtonLeftSkinSmall" x="0" y="0"/>
<use id="ButtonRightSkin" xlink:href="skinScrollBar_Default.svg#ButtonRightSkinSmall" x="0" y="0"/>
<g id="corner">
    <rect x="0" y="0" width="10" height="10" style="fill:#FFFFFF;stroke:#000000"/>
</g>
</g>
<g id="ButtonLeftSkinSmall">
<g id="up" display="all">
    <rect x="1" y="1" width="10" height="10" style="fill-rule:evenodd;clip-rule:evenodd;fill:#FFFFFF;stroke:#B3B3B3;stroke-width:1.0001;stroke-miterlimit:2.6131;"/>
    <rect x="0" y="0" width="10" height="10" style="fill:#FFFFFF;stroke:#000000"/>
    <text x="5" y="5" style="font-family:'Tahoma';stroke:none;font-size:12;text-anchor:middle"></text>
    <path d="M 8 2 1-6 3 1 6 3 z" style="fill:#000000;stroke:#FF0000;stroke-width:0"/>
</g>
<g id="down" display="none">
    <rect x="1" y="1" width="10" height="10" style="fill-rule:evenodd;clip-rule:evenodd;fill:#FFFFFF;stroke:#B3B3B3;stroke-width:1.0001;stroke-miterlimit:2.6131;"/>
    <rect x="1" y="1" width="10" height="10" style="fill:#FFFFFF;stroke:#000000"/>
    <text x="5" y="5" style="font-family:'Tahoma';stroke:none;font-size:12;text-anchor:middle"></text>
    <path d="M 9 3 1-6 3 1 6 3 z" style="fill:#FF0000;stroke:#FF0000;stroke-width:0"/>
</g>
</g>
<g id="SliderSkinSmall">
<g id="up" display="all">
    <rect id="SkinSliderSmallBorder" x="0" y="0" width="200" height="10" opacity="0"/>
    <g id="body">
```

```xml
      <rect id="SkinSliderSmallBase" style="fill-rule:
          evenodd;clip-rule:evenodd;fill:#FFFFFF;stroke:
          #B3B3B3;stroke-width:1.0001;stroke-miterlimit:
          2.6131;" x="1" y="1" width="444" height="10"/>
      <rect id="SliderSkinSmallBar" style="fill:
          #FFFFFF;stroke:#000000" x="0" y="0"
          width="444" height="10"/>
    </g>
    <g id="SliderSkinSmallThumb">
      <rect id="sliderThumbBar" style="fill:#B3B3B3;
          stroke:#000000;stroke-width:0" x="0" y="0"
          width="10" height="10"/>
    <g>
    <g id="tickMajor" display="none">
      <text x="0" y="11" id="tickLabelMajor" xml:
          space="preserve" style="font-face:Arial;font-
          size:8;fill:black;stroke:1;text-anchor:middle">
          </text>
    </g>
  <g>
  <g id="mask">
    <rect id="sliderMask" x=" " y="0" width="444"
        height="18" opacity="0"/>
  </g>
</g>
<g id="ButtonRightSkinSmall">
  <g id="up" display="all">
    <rect x="1" y="1" width="10" height="10" style="fill-
        rule:evenodd;clip-rule:evenodd;fill:#FFFFFF;stroke:
        #B3B3B3;stroke-width:1.0001;stroke-miterlimit:
        2.6131;"/>
    <rect x="0" y="0" width="10" height="10" style="fill:
        #FFFFFF;stroke:#000000"/>
    <text x="5" y="5" style="font-family:'Tahoma';stroke:
        none;font-size:12;text-anchor:middle"></text>
    <path d="M 2 2 1 6 3 1-63 z" style="fill:#000000;
        stroke:#FF0000;stroke-width:0"/>
  </g>
  <g id="down" display="none">
    <rect x="1" y="1" width="10" height="10" style="fill-
        rule:evenodd;clip-rule:evenodd;fill:#FFFFFF;stroke:
        #B3B3B3;stroke-width:1.0001; stroke-miterlimit:
        2.6131;"/>
    <rect x="1" y="1" width="10" height="10" style="fill:
        #FFFFFF;stroke:#000000"/>
    <text x="5" y="5" style="font-family:'Tahoma';stroke:
        none;font-size:12;text-anchor:middle"></text>
    <path d="M 3 3 1 6 3 1-6 3 z" style="fill:#FF0000;
        stroke:#FF0000;stroke-width:0"/>
  <g>
</g></svg>
skinScrollBar_ListBox.svg
<?xml version="1.0"?>
<svg>
  <g id="skinScrollBarSmall">
    <use id="SliderSkin" xlink:
        href="skinScrollBar_Default.svg#SliderSkinSmall"
        x="0" y="0"/>
    <use id="ButtonLeftSkin" xlink:href=
        "skinScrollBar_Default.svg#ButtonLeftSkinSmall"
        x="0" y="0"/>
    <use id="ButtonRightSkin" xlink:href=
        "skinScrollBar_Default.svg#ButtonRightSkinSmall"
        x="0" y="0"/>
    <g id="corner">
      <rect x="0" y="0" width="10" height="10" style="fill:
          #FFFFFF;stroke:#000000" display="none"/>
    </g>
  </g>
</g>
<g id="ButtonLeftSkinSmall">
  <g id="up" display="all">
    <rect x="1" y="1" width="10" height="10" style="fill-
        rule:evenodd;clip-rule:evenodd;fill:#FFFFFF;stroke:
        #B3B3B3;stroke-width:1.0001;stroke-miterlimit:
        2.6131;"/>
    <rect x="0" y="0" width="10" height="10" style="fill:
        #FFFFFF;stroke:#000000"/>
    <text x="5" y="5" style="font-family:'Tahoma';stroke:
        none;font-size:12;text-anchor:middle"></text>
    <path d="M 8 2 1-6 3 163 z" style="fill:#000000;stroke:
        #FF0000;stroke-width:0"/>
  </g>
  <g id="down" display="none">
    <rect x="1" y="1" width="10" height="10" style="fill-
        rule:evenodd;clip-rule:evenodd;fill:#FFFFFF;stroke:
        #B3B3B3;stroke-width:1.0001; stroke-miterlimit:
        2.6131;"/>
    <rect x="1" y="1" width="10" height="10" style="fill:
        #FFFFFF;stroke:#000000"/>
    <text x="5" y="5" style="font-family:'Tahoma';stroke:
        none;font-size:12;text-anchor:middle"></text>
    <path d="M 9 3 1-6 3 1 6 3 z" style="fill:#FF0000;
        stroke:#FF0000;stroke-width:0"/>
  </g>
<g>
<g id="SliderSkinSmall">
  <g id="up" display="all">
    <rect id="SkinSliderSmallBorder" x="0" y="0"
        width="200" height="10" opacity="0"/>
    <g id="body">
      <rect id="SkinSliderSmallBase" style="fill-rule:
          evenodd;clip-rule:evenodd;fill:#FFFFFF;stroke:
          #B3B3B3;stroke-width:1.0001;stroke-miterlimit:
          2.6131;" x="1" y="1" width="444" height="10"/>
      <rect id="SliderSkinSmallBar" style="fill:
          #FFFFFF;stroke:#000000" x="0" y="0"
          width="444" height="10"/>
    </g>
    <g id="SliderSkinSmallThumb">
      <rect id="sliderThumbBar" style="fill:#B3B3B3;
          stroke:#000000;stroke-width:0" x="0" y="0"
          width="10" height="10"/>
    </g>
    <g id="tickMajor" display="none">
      <text x="0" y="11" id="tickLabelMajor" xml:
          space="preserve" style="font-face:Arial;font-
          size:8;fill:black; stroke:1;text-anchor:middle">
          </text>
    <g>
  </g>
  <g id="mask">
    <rect id="sliderMask" x=" " y="0" width="444"
        height="18" opacity="0"/>
  </g>
</g>
<g id="ButtonRightSkinSmall">
  <g id="up" display="all">
    <rect x="1" y="1" width="10" height="10" style="fill-
        rule:evenodd;clip-rule:evenodd;fill:#FFFFFF;stroke:
        #B3B3B3;stroke-width:1.0001;stroke-miterlimit:
        2.6131;"/>
    <rect x="0" y="0" width="10" height="10" style="fill:
        #FFFFFF;stroke:#000000"/>
```

101

```
<text x="5" y="5" style="font-family:'Tahoma';stroke:
    none;font-size:12;text-anchor:middle"></text>
    <path d="M 2 2 1 6 3 1-6 3 z" style="fill:#000000;
        stroke:#FF0000;stroke-width:0"/>
</g>
<g id="down" display="none">
    <rect x="1" y="1" width="10" height="10" style="fill-
        rule:evenodd;clip-rule:evenodd;fill:#FFFFFF;stroke:
        #B3B3B3;stroke-width:1.0001;stroke-miterlimit:2
        6131;"/>
    <rect x="1" y="1" width="10" height="10" style="fill:
        #FFFFFF;stroke:#000000"/>
    <text x="5" y="5" style="font-family:'Tahoma';stroke:
        none;font-size:12;text-anchor:middle"></text>
    <path d="M 3 3 1 6 3 1-6 3 z" style="fill:#FF0000;
        stroke:#FF0000;stroke-width:0"/>
</g>
</g></svg>
skinScrollBar_ListView.svg
<?xml version="1.0"?>
<svg>
    <g id="skinScrollBarSmall">
        <use id="SliderSkin" xlink:
            href="skinScrollBar_Default.svg#SliderSkinSmall"
            x="0" y="0"/>
        <use id="ButtonLeftSkin" xlink:href=
            "skinScrollBar_Default.svg#ButtonLeftSkinSmall"
            x="0" y="0"/>
        <use id="ButtonRightSkin" xlink:href=
            "skinScrollBar_Default.svg#ButtonRightSkinSmall"
            x="0" y="0"/>
        <g id="corner">
            <rect x="0" y="0" width="10" height="10" style="fill:
                #FFFFFF;stroke:#000000" display="none"/>
        </g>
    </g>
    <g id="ButtonLeftSkinSmall">
        <g id="up" display="all">
            <rect x="1" y="1" width="10" height="10" style="fill-
                rule:evenodd;clip-rule:evenodd;fill:#FFFFFF;stroke:
                #B3B3B3;stroke-width:1.0001;stroke-miterlimit:
                2.6131;"/>
            <rect x="0" y="0" width="10" height="10" style="fill:
                #FFFFFF;stroke:#000000"/>
            <text x="5" y="5" style="font-family:'Tahoma';stroke:
                none;font-size:12;text-anchor:middle"></text>
            <path d="M 8 2 1-6 3 1 6 3 z" style="fill:#000000;
                stroke:#FF0000;stroke-width:0"/>
        <g>
        <g id="down" display="none">
            <rect x="1" y="1" width="10" height="10" style="fill-
                rule:evenodd;clip-rule:evenodd;fill:#FFFFFF;stroke:
                #B3B3B3;stroke-width:1.0001;stroke-miterlimit:
                2.6131;"/>
            <rect x="1" y="1" width="10" height="10" style="fill:
                #FFFFFF;stroke:#000000"/>
            <text x="5" y="5" style="font-family:'Tahoma';stroke:
                none;font-size:12;text-anchor:middle"></text>
            <path d="M 9 3 1-6 3 1 6 3 z" style="fill:#FF0000;
                stroke:#FF0000;stroke-width:0"/>
        </g>
    </g>
    <g id="SliderSkinSmall">
        <g id="up" display="all">
            <rect id="SkinSliderSmallBorder" x="0" y="0"
                width="200" height="10" opacity="0"/>
            <g id="body">
```

102

```
            <rect id="SkinSliderSmallBase" style="fill-rule:
                evenodd;clip-rule:evenodd;fill:#FFFFFF;stroke:
                #B3B3B3;stroke-width:1.0001;stroke-miterlimit:
                2.6131;" x="1" y="1" width="444" height="10"/>
            <rect id="SliderSkinSmallBar" style="fill:
                #FFFFFF;stroke:#000000" x="0" y="0"
                width="444" height="10"/>
        </g>
        <g id="SliderSkinSmallThumb">
            <rect id="sliderThumbBar" style="fill:#B3B3B3;
                stroke:#000000;stroke-width:0" x="0" y="0"
                width="10" height="10"/>
        <g>
        <g id="tickMajor" display="none">
            <text x="0" y="11" id="tickLabelMajor" xml:
                space="preserve" style="font-face:Arial;font-
                size:8;fill:black;stroke:1;text-anchor:middle">
            </text>
        </g>
    </g>
    <g id="mask">
        <rect id="sliderMask" x=" " y="0" width="444"
            height="18" opacity="0"/>
    <g>
    </g>
    <g id="ButtonRightSkinSmall">
    <g id="up" display="all">
        <rect x="1" y="1" width="10" height="10" style="fill-
            rule:evenodd;clip-rule:evenodd;fill:#FFFFFF;stroke:
            #B3B3B3;stroke-width:1.0001;stroke-miterlimit:
            2.6131;"/>
        <rect x="0" y="0" width="10" height="10" style="fill:
            #FFFFFF;stroke:#000000"/>
        <text x="5" y="5" style="font-family:'Tahoma';stroke:
            none;font-size:12;text-anchor:middle"></text>
        <path d="M 2 2 1 6 3 1-63 z" style="fill:#000000;
            stroke:#FF0000;stroke-width:0"/>
    </g>
    <g id="down" display="none">
        <rect x="1" y="1" width="10" height="10" style="fill-
            rule:evenodd;clip-rule:evenodd;fill:#FFFFFF;stroke:
            #B3B3B3;stroke-width:1.0001; stroke-miterlimit:
            2.6131;"/>
        <rect x="1" y="1" width="10" height="10" style="fill:
            #FFFFFF;stroke:#000000"/>
        <text x="5" y="5" style="font-family:'Tahoma';stroke:
            none;font-size:12;text-anchor:middle"></text>
        <path d="M 3 3 1 6 3 1-6 3 z" style="fill:#FF0000;
            stroke:#FF0000;stroke-width:0"/>
    </g>
</g></svg>
skinSlider_Default.svg
<?xml version="1.0"?>
<svg xmlns:dsvg="http://corel.org/dsvg">
    <g id="skinSlider">
        <g id="label">
            <text id="skinComboBoxDefault_bodyText" x="0"
                y="-6" fill="black"></text>
            <dsvg:constraint scaleImmunity="true" hAlign="left"
                vAlign="bottom"/>
        </g>
        <g id="up" display="all">
            <rect id="skinSliderBorder" x="0" y="0" width="200"
                height="18" fill="none" stroke="none" pointer-
                events="fill"/>
            <g id="body">
```

```xml
<rect id="skinSliderBase" fill="#EEEEEE"
    stroke="none" x="0" y="7" width="200"
    height="4"/>
<rect id="skinSliderBar" fill="#EEEEEE"
    stroke="none" x="0" y="7" width="200"
    height="4"/>
<line x1="0" y1="7" x2="200" y2="7"
    style="stroke:#B3B3B3"/>
</g>
<g id="skinSliderThumb">
    <circle cx="3" cy="3" r="3" style="fill:black;stroke:
        none"/>
    <circle cx="3" cy="15" r="3" style="fill:black;
        stroke:none"/>
    <rect style="fill:rgb(230,230,230);stroke:none"
        x="0" y="3" width="6" height="12"/>
    <line x1="0" y1="3" x2="0" y2="15" style="stroke:
        #B3B3B3;stroke-width:1"/>
    <line x1="1.5" y1="3" x2="1.5" y2="15"
        style="stroke:white;stroke-width:2"/>
    <line x1="6" y1="3" x2="6" y2="15" style="stroke:
        #B3B3B3;stroke-width:1"/>
</g>
<g id="tickMajor" display="none">
    <line x1="0" y1="7" x2="0" y2="17" style="stroke:
        #B3B3B3"/>
    <text id="tickLabelMajor" x="0" y="12" xml:
        space="preserve" style="font-face:Arial;font-
        size:8;fill:#B3B3B3;stroke-width:1"></text>
</g>
<g id="tickMinor" display="none">
    <line x1="0" y1="7" x2="0" y2="11" style="stroke:
        #B3B3B3"/>
</g>
</g>
<g id="down" display="none">
    <rect id="skinSliderBorder" x="0" y="0" width="200"
        height="18" fill="none" stroke="none" pointer-
        events="fill"/>
    <g id="body">
        <rect id="skinSliderBase" fill="#EEEEEE"
            stroke="none" x="0" y="7" width="200"
            height="4"/>
        <rect id="skinSliderBar" fill="#EEEEEE"
            stroke="none" x="0" y="7" width="200"
            height="4"/>
        <line x1="0" y1="7" x2="200" y2="7"
            style="stroke:black"/>
    </g>
    <g id="skinSliderThumb">
        <circle cx="3" cy="3" r="3" style="fill:#199DBF;
            stroke:none"/>
        <circle cx="3" cy="15" r="3" style="fill:#199DBF;
            stroke:none"/>
        <rect style="fill:rgb(230,230,230);stroke:none"
            x="0" y="3" width="6" height="12"/>
        <line x1="0" y1="3" x2="0" y2="15" style="stroke:
            #B3B3B3;stroke-width:1"/>
        <line x1="1.5" y1="3" x2="1.5" y2="15"
            style="stroke:white;stroke-width:2"/>
        <line x1="6" y1="3" x2="6" y2="15" style="stroke:
            #B3B3B3;stroke-width:1"/>
    </g>
    <g id="tickMajor" display="none">
        <line x1="0" y1="7" x2="0" y2="17" style="stroke:
            black"/>
        <text id="tickLabelMajor" x="0" y="12" xml:
            space="preserve" style="font-face:Arial;font-
            size:8;fill:black;stroke-width:1"></text>
    </g>
    <g id="tickMinor" display="none">
        <line x1="0" y1="7" x2="0" y2="11" style="stroke:
            black"/>
    </g>
</g>
<g id="hover" display="none">
    <rect id="skinSliderBorder" x="0" y="0" width="200"
        height="18" fill="none" stroke="none" pointer-
        events="fill"/>
    <g id="body">
        <rect id="skinSliderBase" fill="#EEEEEE"
            stroke="none" x="0" y="7" width="200"
            height="4"/>
        <rect id="skinSliderBar" fill="#EEEEEE"
            stroke="none" x="0" y="7" width="200"
            height="4"/>
        <line x1="0" y1="7" x2="200" y2="7"
            style="stroke:black"/>
    </g>
    <g id="skinSliderThumb">
        <circle cx="3" cy="3" r="3" style="fill:#199DBF;
            stroke:none"/>
        <circle cx="3" cy="15" r="3" style="fill:#199DBF;
            stroke:none"/>
        <rect style="fill:rgb(230,230,230);stroke:none"
            x="0" y="3" width="6" height="12"/>
        <line x1="0" y1="3" x2="0" y2="15" style="stroke:
            #B3B3B3;stroke-width:1"1>
        <line x1="1.5" y1="3" x2="1.5" y2="15"
            style="stroke:white;stroke-width:2"/>
        <line x1="6" y1="3" x2="6" y2="15" style="stroke:
            #B3B3B3;stroke-width:1"/>
    </g>
    <g id="tickMajor" display="none">
        <line x1="0" y1="7" x2="0" y2="17" style="stroke:
            black"/>
        <text id="tickLabelMajor" x="0" y="12" xml:
            space="preserve" style="font-face:Arial;font-
            size: 8;fill:black;stroke-width: 1"></text>
    </g>
    <g id="tickMinor" display="none">
        <line x1="0" y1="7" x2="0" y2="11" style="stroke:
            black"/>
    </g>
</g>
<g id="disabled" display="none">
    <rect id="skinSliderBorder" x="0" y="0" width="200"
        height="18" fill="none" stroke="none" pointer-
        events="fill"/>
    <g id="body">
        <rect id="skinSliderBase" fill="#EEEEEE"
            stroke="none" x="0" y="7" width="200"
            height="4"/>
        <rect id="skinSliderBar" fill="#EEEEEE"
            stroke="none" x="0" y="7" width="200"
            height="4"/>
        <line x1="0" y1="7" x2="200" y2="7"
            stroke="#B3B3B3"/>
    </g>
    <g id="skinSliderThumb">
        <circle cx="3" cy="3" r="3" style="fill:black;stroke:
            none"/>
```

```xml
        <circle cx="3" cy="15" r="3" style="fill:black;
            stroke:none"/>
        <rect    style="fill:rgb(230,230,230);stroke:none"
            x="0" y="3" width="6" height="12"/>
        <line x1="0" y1="3" x2="0" y2="15" style="stroke:
            B3B3B3;stroke-width:1"/>
        <line   x1="1.5"   y1="3"   x2="1.5"   y2="15"
            style="stroke:white;stroke-width:2"/>
        <line x1="6" y1="3" x2="6" y2="15" style="stroke:
            black"/>
      </g>
      <g id="tickMajor" display="none">
        <line x1="0" y1="7" x2="0" y2="17" style="stroke:
            #B3B3B3"/>
        <text  id="tickLabelMajor"  x="0"  y="12"  xml:
            space="preserve"      style="font-face:Arial;font-
            size:8;fill:#B3B3B3;stroke-width:1"></text>
      </g>
      <g id="tickMinor" display="none">
        <line    x1="0"    y1="7"    x2="0"    y2="11"
            stroke="#B3B3B3"/>
      </g>
    </g>
    <g id="mask">
      <rect id="skinSliderMask" x="-4" y="0" width="208"
          height="18"  fill="none"  stroke="none"  pointer-
          events="fill"/>
    </g>
  </g>
</svg>
skinSlider_Windows.svg
<?xml version="1.0"?>
<svg xmlns:dsvg="http://corel.org/dsvg">
  <g id="skinSlider">
    <g id="label">
      <text id="skinComboBoxDefault_bodyText" x="0"
          y="-6" fill="black"></text>
      <dsvg:constraint scaleImmunity="true" hAlign="left"
          vAlign="bottom"/>
    </g>
    <g id="up" display="all">
      <rect id="skinSliderBorder" x="0" y="0" width="200"
          height="18"  fill="none"  stroke="none"  pointer-
          events="fill"/>
      <g id="body">
        <rect  id="skinSliderBase"  style="fill:#FFFFFF;
            stroke:none"    x="0"    y="7"    width="200"
            height="4"/>
        <rect   id="skinSliderBar"   style="fill:#FFFFFF;
            stroke:none"    x="0"    y="7"    width="200"
            height="4"/>
        <line    x1="0"    y1="7"    x2="200"    y2="7"
            style="stroke:#B3B3B3"/>
      </g>
      <g id="skinSliderThumb">
        <circle cx="3" cy="3" r="3" style="fill:black;stroke:
            none"/>
        <circle cx="3" cy="15" r="3" style="fill:black;
            stroke:none"/>
        <rect    style="fill:rgb(230,230,230);stroke:none"
            x="0" y="3" width="6" height="12"/>
        <line x1="0" y1="3" x2="0" y2="15" style="stroke:
            #B3B3B3;stroke-width:1"/>
        <line   x1="1.5"   y1="3"   x2="1.5"   y2="15"
            style="stroke:white;stroke-width:2"/>
        <line x1="6" y1="3" x2="6" y2="15" style="stroke:
            #B3B3B3;stroke-width:1"/>
      </g>
      <g id="tickMajor" display="none">
        <line x1="0" y1="7" x2="0" y2="17" style="stroke:
            #B3B3B3"/>
        <text  id="tickLabelMajor"  x="0"  y="12"  xml:
            space="preserve"      style="font-face:Arial;font-
            size:8;fill:#B3B3B3;stroke:1;text-anchor:
            middle"></text>
      </g>
      <g id="tickMinor" display="none">
        <line x1="0" y1="7" x2="0" y2="11" style="stroke:
            #B3B3B3"/>
      </g>
    </g>
    <g id="down" display="none">
      <rect id="skinSliderBorder" x="0" y="0" width="200"
          height="18"  fill="none"  stroke="none"  pointer-
          events="fill"/>
      <g id="body">
        <rect  id="skinSliderBase"  style="fill:#FFFFFF;
            stroke:none"    x="0"    y="7"    width="200"
            height="4"/>
        <rect   id="skinSliderBar"   style="fill:#FFFFFF;
            stroke:none"    x="0"    y="7"    width="200"
            height="4"/>
        <line    x1="0"    y1="7"    x2="200"    y2="7"
            style="stroke:black"/>
      </g>
      <g id="skinSliderThumb">
        <circle cx="3" cy="3" r="3" style="fill:#199DBF;
            stroke:none"/>
        <circle cx="3" cy="15" r="3" style="fill:#199DBF;
            stroke:none"/>
        <rect    style="fill:rgb(230,230,230);stroke:none"
            x="0" y="3" width="6" height="12"/>
        <line x1="0" y1="3" x2="0" y2="15" style="stroke:
            #B3B3B3;stroke-width:1"/>
        <line   x1="1.5"   y1="3"   x2="1.5"   y2="15"
            style="stroke:white;stroke-width:2"/>
        <line x1="6" y1="3" x2="6" y2="15" style="stroke:
            #B3B3B3;stroke-width:1"/>
      </g>
      <g id="tickMajor" display="none">
        <line x1="0" y1="7" x2="0" y2="17" style="stroke:
            black"/>
        <text  id="tickLabelMajor"  x="0"  y="12"  xml:
            space="preserve"      style="font-face:Arial;font-
            size:8;fill:black;stroke:1;text-anchor:middle">
            </text>
      <g>
      <g id="tickMinor" display="none">
        <line x1="0" y1="7" x2="0" y2="11" style="stroke:
            black"/>
      </g>
    <g>
    <g id="hover" display="none">
      <rect id="skinSliderBorder" x="0" y="0" width="200"
          height="18"  fill="none"  stroke="none"  pointer-
          events="fill"/>
      <g id="body">
        <rect  id="skinSliderBase"  style="fill:#FFFFFF;
            stroke:none"    x="0"    y="7"    width="200"
            height="4"/>
        <rect   id="skinSliderBar"   style="fill:#FFFFFF;
            stroke:none"    x="0"    y="7"    width="200"
            height="4"/>
```

```
        <line   x1="0"   y1="7"   x2="200"   y2="7"
            style="stroke:black"/>
    </g>
    <g id="skinSliderThumb">
        <circle cx="3" cy="3" r="3" style="fill:#199DBF;
            stroke:none"/>
        <circle cx="3" cy="15" r="3" style="fill:#199DBF;
            stroke:none"/>
        <rect    style="fill:rgb(230,230,230);stroke:none"
            x="0" y="3" width="6" height="12"/>
        <line x1="0" y1="3" x2="0" y2="15" style="stroke:
            #B3B3B3;stroke-width:1"/>
        <line    x1="1.5"   y1="3"   x2="1.5"   y2="15"
            style="stroke:white;stroke-width:2"/>
        <line x1="6" y1="3" x2="6" y2="15" style="stroke:
            #B3B3B3;stroke-width:1"/>
    </g>
    <g id="tickMajor" display="none">
        <line x1="0" y1="7" x2="0" y2="17" style="stroke:
            black"/>
        <text  id="tickLabelMajor"   x="0"   y="12"   xml:
            space="preserve"     style="font-face:Arial;font-
            size:8;fill:black;stroke:1;text-anchor:middle">
            </text>
    </g>
    <g id="tickMinor" display="none">
        <line x1="0" y1="7" x2="0" y2="11" style="stroke:
            black"/>
    </g>
</g>
<g id="disabled" display="none">
    <rect id="skinSliderBorder" x="0" y="0" width="200"
        height="18"   fill="none"   stroke="none"   pointer-
        events="fill"/>
    <g id="body">
        <rect   id="skinSliderBase"    style="fill:#FFFFFF;
            stroke:none"    x="0"     y="7"     width="200"
            height="4"/>
        <rect    id="skinSliderBar"    style="fill:#FFFFFF;
            stroke:none"    x="0"     y="7"     width="200"
            height="4"/>
        <line   x1="0"   y1="7"   x2="200"   y2="7"
            style="stroke:#B3B3B3"/>
    <g>
    <g id="skinSliderThumb">
        <circle cx="3" cy="3" r="3" style="fill:black;stroke:
            none"/>
        <circle  cx="3"  cy="15"  r="3"  style="fill:black;
            stroke:none"/>
        <rect    style="fill:rgb(230,230,230);stroke:none"
            x="0" y="3" width="6" height="12"/>
        <line    x1="0"    y1="3"    x2="0"    y2="15"
            style="#stroke:B3B3B3;stroke-width:1"/>
        <line    x1="1.5"   y1="3"   x2="1.5"   y2="15"
            style="stroke:white;stroke-width:2"/>
        <line    x1="6"    y1="3"    x2="6"    y2="15"
            style="#stroke: 000000;stroke-width:1">
    </g>
    <g id="tickMajor" display="none">
        <line x1="0" y1="7" x2="0" y2="17" style="stroke:
            #B3B3B3"/>
        <text  id="tickLabelMajor"   x="0"   y="12"   xml:
            space="preserve"     style="font-face:Arial;font-
            size:8;fill:#B3B3B3;stroke:1;text-anchor:
            middle"></text>
    <g>
    <g id="tickMinor" display="none">
        <line x1="0" y1="7" x2="0" y2="11" style="stroke:
            #B3B3B3"/>
        </g>
    <g>
    <g id="mask">
        <rect id="skinSliderMask" x="-4" y="0" width="208"
            height="18"   fill="none"   stroke="none"   pointer-
            events="fill"/>
    </g>
    </g>
</svg>
skinSpin_Composite.svg
<?xml version="1.0"?>
<svg xmlns:dsvg="http://corel.org/dsvg">
    <g id="skinSpin">
        <use           id="TextBoxSkin"           xfink:
            href="skinTextBox_Spin_Short.svg#skinTextbox"
            x="0" y="0"/>
        <use           id="ButtonSkinUp"           xlink:
            href="skinSpin_Composite.svg#skinSpinButtonUp"
            x="100" y="-1"/>
        <use          id="ButtonSkinDown"          xfink:
            href="skinSpin_Composite.svg#skinSpinButtonDown"
            x="100" y="8"/>
        <g id="label">
            <text x="0" y="-6" style="font-size:12;fill:black">
                <dsvg:constraint     preserveAspectRatio="vertical"
                    hAlign="middle"/>
            </text>
        </g>
    </g>
    <g id="skinSpinButtonUp">
    <g id="up" display="all">
        <rect x="0" y="0" width="18" height="9" style="fill:
            rgb(230,230,230);stroke:none"/>
        <polyline points="0,9 0,0 18,0" style="stroke-width:1;
            stroke:white;fill:none"/>
        <polyline points="0,9 18,9 18,0" style="stroke-width:
            1;stroke:black;fill:none"/>
        <polygon points="3,6 9,3 15,6" style="stroke-width:
            1;stroke:black;fill:black"/>
    </g>
    <g id="down" display="none">
        <rect x="0" y="0" width="18" height="9" style="fill:
            rgb(230,230,230);stroke:none"/>
        <polyline points="0,9 0,0 18,0" style="stroke-width:1;
            stroke:black; fill: none"/>
        <polyline points="0,9 18,9 18,0" style="stroke-width:
            1; stroke: white; fill: none"/>
        <polygon points="3,6 9,3 15,6" style="stroke-width:1;
            stroke:#199DBF;fill:#199DBF"/>
    </g>
    <g id="hover" display="none">
        <rect x="0" y="0" width="18" height="9" style="fill:
            rgb(230,230,230);stroke:none"/>
        <polyline points="0,9 0,0 18,0" style="stroke-width:2;
            stroke:white;fill:none"/>
        <polyline points="0,9 18,9 18,0" style="stroke-width:
            2;stroke:black;fill:none"/>
        <polygon points="3,6 9,3 15,6" style="stroke-width:1;
            stroke:#199DBF;fill:#199DBF"/>
    </g>
    <g  id="disabled"  style="opacity:0.5"  transform="scale
        (0.5)" display="none">
        <rect x="0" y="0" width="18" height="9" style="fill:
            rgb(230,230,230);stroke:none"/>
```

```
        <polyline points="0,9 0,0 18,0" style="stroke-width:1;
            stroke:white;fill:none"/>
        <polyline points="0,9 18,9 18,0" style="stroke-width:
            1;stroke:black;fill:none"/>
        <polygon points="3,6 9,3 15,6" style="stroke-width:1;
            stroke:black;fill:black"/>
    <g>
    </g>
<g id="skinSpinButtonDown">
    <g id="up" display="all">
        <rect x="0" y="0" width="18" height="9" style="fill:
            rgb(230,230,230);stroke:none"/>
        <polyline points="0,9 0,0 18,0" style="stroke-width:
            1;stroke:white;fill:none"/>
        <polyline points="0,9 18,9 18,0" style="stroke-width:
            1;stroke:black;fill:none"/>
        <polygon points="3,3 9,6 15,3" style="stroke-width:
            1;stroke:black;fill:black"/>
    </g>
    <g id="down" display="none">
        <rect x="0" y="0" width="18" height="9" style="fill:
            rgb(230,230,230);stroke:none"/>
        <polyline points="0,9 0,0 18,0" style="stroke-width: 1;
            stroke:black;fill:none"/>
        <polyline points="0,9 18,9 18,0" style="stroke-width:
            1;stroke:white;fill:none"/>
        <polygon points="3,3 9,6 15,3" style="stroke-width: 1;
            stroke:#199DBF;fill:#199DBF"/>
    </g>
    <g id="hover" display="none">
        <rect x="0" y="0" width="18" height="9" style="fill:
            rgb(230,230,230);stroke:none"/>
        <polyline points="0,9 0,0 18,0" style="stroke-width:2;
            stroke:white;fill:none"/>
        <polyline points="0,9 18,9 18,0" style="stroke-width:
            2;stroke:black;fill:none"/>
        <polygon points="3,3 9,6 15,3" style="stroke-width: 1;
            stroke:#199DBF;fill:#199DBF"/>
    <g>
    <g id="disabled" style="opacity:0.5" display="none">
        <rect x="0" y="0" width="18" height="9" style="fill:
            rgb(230,230,230);stroke:none"/>
        <polyline points="0,9 0,0 18,0" style="stroke-width: 1;
            stroke:white;fill:none"/>
        <polyline points="0,9 18,9 18,0" style="stroke-width:
            1; stroke:black;fill:none"/>
        <polygon points="3,3 9,6 15,3" style="stroke-width:1;
            stroke:black;fill:black"/>
    <g>
    <g>
</svg>
skinTextBox_Combobox.svg
<?xml version="1.0"?>
<svg xmlns:dsvg="http://corel.org/dsvg">
    <g id="skinTextbox">
        <g id="up" style="fill-rule:nonzero;clip-rule:nonzero;
            stroke:#000000;stroke-miterlimit:4;" display="all">
            <rect x="0" y="0" width="200" height="17"
                style="fill:#FFFFFF;stroke:#A3A3A3;stroke-width:
                1"/>
        </g>
        <g id="hover" style="fill-rule:nonzero;clip-rule:nonzero;
            stroke:#000000;stroke-miterlimit:4;" display="none">
            <rect x="0" y="0" width="200" height="17"
                style="fill:#FFFFFF;stroke:#A3A3A3;stroke-width:
                1"/>
        <g>
        <g id="down" style="fill-rule:nonzero;clip-rule:nonzero;
            stroke:#000000;stroke-miterlimit:4;" display="none">
            <rect x="0" y="0" width="200" height="17"
                style="fill:#FFFFFF;stroke:#A3A3A3;stroke-width:
                1"/>
        <line id="skinTextbox_cursor" x1="3" y1="2" x2="3"
            y2="16" style="stroke:black">
            <animate attributeType="CSS"
                attributeName="opacity" values="0;0;0;0;0;0;1;1;1;
                1;1;1" dur="1s" repeatCount="indefinite"/>
        </line>
        <g>
        <g id="disabled" style="fill-rule:nonzero;clip-rule:non-
            zero;stroke:#000000;stroke-miterlimit:4;opacity:0.5;"
            display="none">
            <rect x="0" y="0" width="200" height="17"
                style="fill:#FFFFFF;stroke:#A3A3A3;stroke-width:
                1"/>
        </g>
        <clipPath id="skinTextbox_textView">
            <rect id="skinTextbox_textArea" x="3" y="3"
                width="205" height="12"/>
        </clipPath>
        <text clip-path="url(#skinTextbox_textView)"
            id="skinTextbox_text" xml:space="preserve" x="3"
            y="15" style="font-face:Arial;font-size:12;fill:black;
            stroke:1"></text>
    </g>
</svg>
skinTextBox_Combobox_Short.svg
<?xml version="1.0"?>
<svg xmlns:dsvg="http://corel.org/dsvg">
    <g id="skinTextbox">
        <g id="up" style="fill-rule:nonzero;clip-rule:nonzero;
            stroke:#000000;stroke-miterlimit:4;" display="all">
            <rect x="0" y="0" width="133" height="17"
                style="fill:#FFFFFF;stroke:#A3A3A3;stroke-width:
                1">
        </g>
        <g id="hover" style="fill-rule:nonzero;clip-rule:nonzero;
            stroke:#000000;stroke-miterlimit:4;" display="none">
            <rect x="0" y="0" width="133" height="17"
                style="fill:#FFFFFF;stroke:#A3A3A3;stroke-width:
                1"/>
        </g>
        <g id="down" style="fill-rule:nonzero;clip-rule:nonzero;
            stroke:#000000;stroke-miterlimit:4;" display="none">
            <rect x="0" y="0" width="133" height="17"
                style="fill:#FFFFFF;stroke:#A3A3A3;stroke-width:
                1"/>
        <line id="skinTextbox_cursor" x1="3" y1="2" x2="3"
            y2="16" style="stroke:black">
            <animate attributeType="CSS"
                attributeName="opacity" values="0;0;0;0;0;0;1;1;1;
                1;1;1" dur="1s" repeatCount="indefinite"/>
        <line>
        <g>
        <g id="disabled" style="fill-rule:nonzero;clip-rule:non-
            zero;stroke:#000000;stroke-miterlimit:4;opacity:0.5;"
            display="none">
            <rect x="0" y="0" width="133" height="17"
                style="fill:#FFFFFF;stroke:#A3A3A3;stroke-width:
                1"/>
        <g>
        <clipPath id="skinTextbox_textView">
```

```
            <rect   id="skinTextbox_textArea"   x="3"   y="3"
              width="138" height="12"/>
        </clipPath>
        <text          clip-path="url(#skinTextbox_textView)"
          id="skinTextbox_text" xml:space="preserve" x="3"
          y="15"   style="font-face:Arial;font-size:12;fill:black;
          stroke:1"></text>
      </g>
</svg>
skinTextBox_Default.svg
<?xml version="1.0"?>
<svg xmlns:dsvg="http://corel.org/dsvg">
    <g id="skinTextbox">
      <g  id="up"   style="fill-rule:nonzero;clip-rule:nonzero;
        stroke:#000000;stroke-miterlimit:4;stroke-width:1"
        display="all">
          <rect    style="fill-rule:evenodd;clip-rule:evenodd;fill:
            #FFFFFF;stroke:#B3B3B3;stroke-miterlimit:
            2.6131;" x="3" y="3" width="228" height="18"/>
          <rect   style="fill:white;stroke:grey"   x="0"   y="0"
            width="228" height="18"/>
          <dsvg:constraint       propertyName="stroke-width"
            scaleImmunity="true"/>
      </g>
      <g id="hover" style="fill-rule:nonzero;clip-rule:nonzero;
        stroke:#000000;stroke-miterlimit:4;stroke-width:1;"
        display="none">
          <rect    style="fill-rule:evenodd;clip-rule:evenodd;fill:
            #FFFFFF;stroke:#B3B3B3;stroke-miterlimit:
            2.6131;" x="3" y="3" width="228" height="18"/>
          <rect style="fill:white;stroke:#000000" x="0" y="0"
            width="228" height="18"/>
          <dsvg:constraint       propertyName="stroke-width"
            scaleImmunity="true"/>
      <g>
      <g id="down" style="fill-rule:nonzero;clip-rule:nonzero;
        stroke:#000000;stroke-miterlimit:4;stroke-width:1;"
        display="none">
          <rect    style="fill-rule:evenodd;clip-rule:evenodd;fill:
            #FFFFFF;stroke:#B3B3B3;stroke-miterlimit:
            2.6131;" x="3" y="3" width="228" height="18"/>
          <rect style="fill:white;stroke:#000000" x="0" y="0"
            width="228" height="18"/>
          <line id="skinTextbox_cursor" x1="3" y1="2" x2="3"
            y2="16" style="stroke:black">
            <animate              attributeType="CSS"
              attributeName="opacity"  values="0;0;0;0;0;0;1;
              1;1;1;1" dur="1s" repeatCount="indefinite"/>
            <dsvg:constraint        scaleImmunity="true"
              hAlign="left" vAlign="top"/>
          </line>
          <dsvg:constraint       propertyName="stroke-width"
            scaleImmunity="true"/>
      <g>
      <g id="disabled" style="fill-rule:nonzero;clip-rule:non-
        zero;stroke:#000000;stroke-miterlimit:4;opacity:0.5;
        stroke-width:1;" display="none">
          <rect    style="fill-rule:evenodd;clip-rule:evenodd;fill:
            #FFFFFF;stroke:#B3B3B3;stroke-miterlimit:
            2.6131;" x="3" y="3" width="228" height="18"/>
          <rect style="fill:gray;stroke:#000000" x="0" y="0"
            width="228" height="18"/>
          <dsvg:constraint       propertyName="stroke-width"
            scaleImmunity="true"/>
      <g>
      <g id="label" style="font-family:'Tahoma';stroke:none;
        font-size:12">
          <text x="0" y="-6" fill="black"></text>
          <dsvg:constraint scaleImmunity="true" hAlign="left"
            vAlign="bottom"/>
      <g>
      <clipPath id="skinTextbox_textView">
          <rect   id="skinTextbox_textArea"   x="3"   y="3"
            width="222" height="12"/>
      </clipPath>
      <text          clip-path="url(#skinTextbox_textView)"
        id="skinTextbox_text" xml:space="preserve" x="3"
        y="15"   style="font-face:Arial;font-size:12;fill:black;
        stroke:1"><dsvg:constraint     scaleImmunity="true"
        hAlign="left" vAlign="top"/></text>
      <g>
      <g id="skinTextboxMultiLine">
        <g  id="up"   style="fill-rule:nonzero;clip-rule:nonzero;
          stroke:#000000;stroke-miterlimit:4;" display="all">
            <rect    style="fill-rule:evenodd;clip-rule:evenodd;fill:
              #FFFFFF;stroke:#B3B3B3;stroke-width:1.0001;
              stroke-miterlimit:2.6131;"      x="3"      y="3"
              width="228" height="54"/>
            <rect   style="fill:white;stroke:grey"   x="0"   y="0"
              width="228" height="54"/>
        </g>
        <g id="hover" style="fill-rule:nonzero;clip-rule:nonzero;
          stroke:#000000;stroke-miterlimit:4;" display="none">
            <rect    style="fill-rule:evenodd;clip-rule:evenodd;fill:
              #FFFFFF;stroke:#B3B3B3;stroke-width:1.0001;
              stroke-miterlimit:2.6131;"      x="3"      y="3"
              width="228" height="54"/>
            <rect style="fill:white;stroke:#000000" x="0" y="0"
              width="228" height="54"/>
        </g>
        <g id="down" style="fill-rule:nonzero;clip-rule:nonzero;
          stroke:#000000;stroke-miterlimit:4;" display="none">
            <rect    style="fill-rule:evenodd;clip-rule:evenodd;fill:
              #FFFFFF;stroke:#B3B3B3;stroke-width:1.0001;
              stroke-miterlimit:2.6131;"      x="3"      y="3"
              width="228" height="54"/>
            <rect style="fill:white;stroke:#000000" x="0" y="0"
              width="228" height="54"/>
            <line   id="skinTextboxMultiLine_cursor"   x1="3"
              y1="2" x2="3" y2="16" style="stroke:black">
              <animate              attributeType="CSS"
                attributeName="opacity"  values="0;0;0;0;0;0;1;
                1;1;1;1" dur="1s" repeatCount="indefinite"/>
              <dsvg:constraint        scaleImmunity="true"
                hAlign="left" vAlign="top"/>
            </line>
        <g>
        <g  id="disabled"  style="fill-rule:nonzero;clip-rule:non-
          zero;stroke:#000000;stroke-miterlimit:4;opacity:0.5;"
          display="none">
            <rect    style="fill-rule:evenodd;clip-rule:evenodd;fill:
              #FFFFFF;  stroke  1B3B3B3;stroke-width:1.0001;
              stroke-miterlimit:2.6131;"      x="3"      y="3"
              width="228" height="54"/>
            <rect style="fill:gray;stroke:#000000" x="0" y="0"
              width="228" height="54"/>
        </g>
        <g id="label" style="font-family:'Tahoma';stroke:none;
          font-size:12">
            <text x="0" y="-6" fill="black"></text>
            <dsvg:constraint scaleImmunity="true" hAlign="left"
              vAlign="bottom"/>
        </g>
        <clipPath id="skinTextboxMultiLine_textView">
```

```
        <rect        id="skinTextboxMultiLine_textArea"
            fill="green" x="3" y="3" width="222"
            height="48"/>
    </clipPath>
    <text clip-path="url(#skinTextboxMultiLine_textView)"
        id="skinTextboxMultiLine_text"           xml:
        space="preserve" x="3" y="15" style="font-face:Arial;
        font-size:12;fill:black;stroke:none"><dsvg:constraint
        scaleImmunity="true" hAlign="left" vAlign="top"/>
    </text>
  </g>
</svg>
skinTextBox_Listbox.svg
<?xml version="1.0"?>
<svg xmlns:dsvg="http://corel.org/dsvg">
  <g id="skinTextbox">
    <g id="up" style="fill-rule:nonzero;clip-rule:nonzero;
        stroke:#000000;stroke-miterlimit:4;" display="all">
        <rect   x="0"   y="0"   width="200"   height="17"
            style="fill:#FFFFFF;stroke:#A3A3A3;stroke-width:
            1"/>
    </g>
    <g id="hover" style="fill-rule:nonzero;clip-rule:nonzero;
        stroke:#000000;stroke-miterlimit:4;" display="none">
        <rect   x="0"   y="0"   width="200"   height="17"
            style="fill:#FFFFFF;stroke:#A3A3A3;stroke-width:
            1"/>
    </g>
    <g id="down" style="fill-rule:nonzero;clip-rule:nonzero;
        stroke:#000000;stroke-miterlimit:4;" display="none">
        <rect   x="0"   y="0"   width="200"   height="17"
            style="fill:#FFFFFF;stroke:#A3A3A3;stroke-width:
            1"/>
    </g>
    <line id="skinTextbox_cursor" x1="3" y1="2" x2="3"
        y2="16" style="stroke:black">
        <animate            attributeType="CSS"
            attributeName="opacity" values="0;0;0;0;0;0;1;1;1;
            1;1;1" dur="1s" repeatCount="indefinite"/>
    </line>
    <g>
    <g id="disabled" style="fill-rule:nonzero;clip-rule:non-
        zero;stroke:#000000;stroke-miterlimit:4;opacity:0.5;"
        display="none">
        <rect   x="0"   y="0"   width="200"   height="17"
            style="fill:#FFFFFF;stroke:#A3A3A3;stroke-width:
            1"/>
    <g>
    <clipPath id="skinTextbox_textView">
        <rect   id="skinTextbox_textArea"   x="3"   y="3"
            width="205" height="12"/>
    </clipPath>
    <text         clip-path="url(#skinTextbox_textView)"
        id="skinTextbox_text" xml:space="preserve" x="3"
        y="15" style="font-face:Arial;font-size:12;fill:black;
        stroke:1"></text>
    </g>
</svg>
skinTextBox_Spin_Short.svg
<?xml version="1.0"?>
<svg xmlns:dsvg="http://corel.org/dsvg">
  <g id="skinTextbox">
    <g id="up" style="fill-rule:nonzero;clip-rule:nonzero;
        stroke:#000000;stroke-miterlimit:4;" display="all">
        <rect   x="0"   y="0"   width="100"   height="17"
            style="fill:#FFFFFF;stroke:#A3A3A3;stroke-width:
            1"/>
    </g>
    <g id="hover" style="fill-rule:nonzero;clip-rule:nonzero;
        stroke:#000000;stroke-miterlimit:4;" display="none">
        <rect   x="0"   y="0"   width="100"   height="17"
            style="fill:#FFFFFF;stroke:#A3A3A3;stroke-width:
            1"/>
    </g>
    <g id="down" style="fill-rule:nonzero;clip-rule:nonzero;
        stroke:#000000;stroke-miterlimit:4;" display="none">
        <rect   x="0"   y="0"   width="100"   height="17"
            style="fill:#FFFFFF;stroke:#A3A3A3;stroke-width:
            1"/>
    <line id="skinTextbox_cursor" x1="3" y1="2" x2="3"
        y2="16" style="stroke:black">
        <animate            attributeType="CSS"
            attributeName="opacity" values="0;0;0;0;0;0;1;1;1;
            1;1;1" dur="1s" repeatCount="indefinite"/>
    </line>
    </g>
    <g id="disabled" style="fill-rule:nonzero;clip-rule:non-
        zero;stroke:#000000;stroke-miterlimit:4;opacity:0.5;"
        display="none">
        <rect   x="0"   y="0"   width="133"   height="17"
            style="fill:#FFFFFF;stroke:#A3A3A3;stroke-width:
            1"/>
    </g>
    <clipPath id="skinTextbox_textView">
        <rect   id="skinTextbox_textArea"   x="3"   y="3"
            width="108" height="12"/>
    </clipPath>
    <text         clip-path="url(#skinTextbox_textView)"
        id="skinTextbox_text" xml:space="preserve" x="3"
        y="15" style="font-face:Arial;font-size:12;fill:black;
        stroke:1"></text>
    <g>
</svg>
skinTextBox_vp.svg
<?xml version="1.0"?>
<svg>
  <g id="skinTextbox">
    <g id="up" style="fill-rule:nonzero;clip-rule:nonzero;
        stroke:#000000;stroke-miterlimit:4;" display="all">
        <rect   style="fill-rule:evenodd;clip-rule:evenodd;fill:
            #FFFFFF;stroke:#B3B3B3;stroke-width:1.0001;
            stroke-miterlimit:2.6131;"   x="3"   y="3"
            width="228" height="18"/>
        <rect   style="fill:white;stroke:grey"   x="0"   y="0"
            width="228" height="18"/>
    </g>
    <g id="hover" style="fill-rule:nonzero;clip-rule:nonzero;
        stroke:#000000;stroke-miterlimit:4;" display="none">
        <rect   style="fill-rule:evenodd;clip-rule:evenodd;fill:
            #FFFFFF;stroke:#B3B3B3;stroke-width:1.0001;
            stroke-miterlimit:2.6131;"   x="3"   y="3"
            width="228" height="18"/>
        <rect style="fill:white;stroke:#000000" x="0" y="0"
            width="228" height="18"/>
    </g>
    <g id="down" style="fill-rule:nonzero;clip-rule:nonzero;
        stroke:#000000;stroke-miterlimit:4;" display="none">
        <rect   style="fill-rule:evenodd;clip-rule:evenodd;fill:
            #FFFFFF;stroke:#B3B3B3;stroke-width:1.0001;
            stroke-miterlimit:2.6131;"   x="3"   y="3"
            width="228" height="18"/>
        <rect style="fill:white;stroke:#000000" x="0" y="0"
            width="228" height="18"/>
        <line id="skinTextbox_cursor" x1="3" y1="2" x2="3"
            y2="16" style="stroke:black">
```

```
            <animate         attributeType="CSS"
                attributeName="opacity" values="0;0;0;0;0;0;1;
                1;1;1;1;1" dur="1s" repeatCount="indefinite"/>
        </line>
    </g>
    <g id="disabled" style="fill-rule:nonzero;clip-rule:non-
        zero;stroke:#000000;stroke-miterlimit:4;opacity:0.5;"
        display="none">
        <rect     style="fill-rule:evenodd;clip-rule:evenodd;fill:
            #FFFFFF;stroke:#B3B3B3;stroke-width:1.0001;
            stroke-miterlimit:2.6131;"    x="3"    y="3"
            width="228" height="18"/>
        <rect style="fill:gray;stroke:#000000" x="0" y="0"
            width="228" height="18"/>
    </g>
    <g id="label">
        <text   x="238"   y="14"   style="font-size:12;fill:
            black"></text>
    </g>
    <clipPath id="skinTextbox_textView">
        <rect   id="skinTextbox_textArea"   x="3"   y="3"
            width="222" height="12"/>
    </clipPath>
    <text         clip-path="url(#skinTextbox_textView)"
        id="skinTextbox_text" xml:space="preserve" x="3"
        y="15"    style="font-face:Arial;font-size:12;fill:black;
        stroke:1"></text>
<g>
<g id="skinTextboxMultiLine">
<g id="up" display="all">
    <rect stroke="#EEEEEE" stroke-width="2" fill="white"
        x="0" y="-5" width="380" height="195"/>
    <line  stroke="black"  x1="1"  y1="-4"  x2="380"  y2=
        "-4"/>
    <line   stroke="black"    x1="1"    y1="-4"    x2="1"
        y2="191"/>
    <rect   stroke="black"   fill="white"   x="2"   y="-3"
        width="377" height="192"/>
<g>
<g id="hover" display="none">
    <rect stroke="#EEEEEE" stroke-width="2" fill="white"
        x="0" y="-5" width="380" height="195"/>
    <line  stroke="black"  x1="1"  y1="-4"  x2="380"  y2=
        "-4"/>
    <line   stroke="black"    x1="1"    y1="-4"    x2="1"
        y2="191"/>
    <rect   stroke="black"   fill="white"   x="2"   y="-3"
        width="377" height="192"/><g>
<g id="down" display="none">
    <rect stroke="#EEEEEE" stroke-width="2" fill="white"
        x="0" y="-5" width="380" height="195"/>
    <line  stroke="black"  x1="1"  y1="-4"  x2="380"  y2=
        "-4"/>
    <line   stroke="black"    x1="1"    y1="-4"    x2="1"
        y2="191"/>
    <rect   stroke="black"   fill="white"   x="2"   y="-3"
        width="377" height="192"/>
    <line   id="skinTextboxMultiLine_cursor"   x1="3"
        y1="2" x2="3" y2="16" style="stroke:black">
        <animate         attributeType="CSS"
            attributeName="opacity" values="0;0;0;0;0;0;1;
            1;1;1;1;1" dur="1s" repeatCount="indefinite"/>
        </line>
    </g>
    <g id="disabled" display="none">
        <rect   stroke="gray"   fill="white"   x="0"   y="-5"
width="380" height="195"/>
```

```
    </g>
    <clipPath id="skinTextboxMultiLine_textView">
        <rect      id="skinTextboxMultiLine_textArea"
            fill="green"    x="3"    y="3"    width="373"
            height="185"/>
    </clipPath>
    <text clip-path="url(#skinTextboxMultiLine_textView)"
        id="skinTextboxMultiLine_text"          xml:
        space="preserve" x="7" y="15" style="font-face:Arial;
        font-size:12;fill:black;stroke:none"></text>
    </g>
</svg>
skinTextScroll_Default.svg
<?xml version="1.0"?>
<svg>
    <g id="skinTextboxScroll">
        <use        id="TextBoxSkin"        xlink:href=
            "skinTextBox_Default.svg#skinTextboxMultiLine"
            x="0" y="0"/>
        <use           id="VertScrollSkin"           xlink:
            href="skinScrollBar_Default.svg#skinScrollBarSmall"
            x="0" y="0"/>
        <use           id="HorizScrollSkin"          xlink:
            href="skinScrollBar_Default.svg#skinScrollBarSmall"
            x="0" y="0"/>
    </g>
    <g id="label" style="font-family:'Tahoma';stroke:none;
font-size:12">
        <text x="0" y="-6" fill="black"></text>
        <dsvg:constraint  scaleImmunity="true"  hAlign="left"
            vAlign="bottom"/>
    </g>
<svg>
skinTooltip.svg
<?xml version="1.0"?>
<svg>
    <g id="skinTooltip_annotation">
        <path      style="fill:#FFFF00;fill-opacity:0.7;stroke:
            #1F1A17;stroke-width:3"
            d="M0 96 198 0-56-96 106 96 202 0 0 167-352 0
            0-167z"/>
        <text    x="10"    y="150"    style="font-size:16;fill:
            black">tip<text>
    </g>
    <g id="skinTooltip_traditional" pointer-events="none">
        <rect x="0" y="0" width="150" height="15" style="fill:
            rgb(255,255,225);fill-opacity:0.9"     stroke="black"
            stroke-width="1"/>
        <text     x="5"    y="12"    style="font-size:12;fill:
            black">tip</text>
    </g>
    <g id="skinTooltip_special" pointer-events="none">
        <rect x="0" y="0" width="150" height="15" style="fill:
            rgb(130,130,130);fill-opacity:0.5"    stroke="black"
            stroke-width="1"/>
        <text    x="5"    y="12"    style="font-size:    12;fill:
            black">tip</text>
    <g>
</svg>
```

What is claimed is:

1. A method of controlling user interface features of a web application, the method comprising the steps of:

describing the web application using a presentation markup language that has been extended to include a collection of user interface control elements to create an extended presentation markup language, the web application description including a user interface control comprising a name element for associating the user interface control of the web application with a user interface control element of the collection of user interface control elements;

searching, in a document object model (DOM) of the web application, for user interface controls of the web application, each user interface control identified by a namespace associated with user interface control elements of the collection of user interface control elements included in the extended presentation markup language, the namespace including a prefix identifying the collection of user interface control elements as part of the extended presentation markup language and allowing a presentation markup language parser to identify them as part of the DOM;

for each located user interface control;
    generating a function name for the located user interface control element following a predetermined naming convention comprising adding the prefix to a unique name associated with the located user interface control element;
    calling a predetermined set of user interface control instructions associated with the located user interface control element using the generated function name, the predetermined set of user interface control instructions defining the behavior of the located user interface control element and comprising a first portion relating uniquely to the located user interface control element, a second portion commonly relating to multiple user interface control elements, and an attribute relating to a skin template controlling the display of the located user interface control; and
    rendering the DOM of the web application described in the extended presentation markup language, including rendering the located user interface control of the web application based on at least the predetermined set of user interface control instructions.

2. The method as claimed in claim 1, wherein the step of searching includes the steps of:
    traversing each node in the document object model; and
    determining whether the node has a name which matches a designated naming convention.

3. The method as claimed in claim 1, wherein the step of calling a script includes the steps of:
    dynamically generating a function name associated with the designated element;
    passing an object associated with the designated control element as a parameter of the generated function name;
    retrieving the attributes of the object; and
    performing a function stored in memory having the generated function name.

4. The method as claimed in claim 3, wherein the step of generating a function name includes the steps of:
    determining if the name of the designated element contains a designated prefix;
    generating a function name comprising the name of the designated element;
    assigning an object associated with the designated element as the parameter of the function name; and
    assigning the control instructions of the designated element as steps for the function to perform.

5. The method as claimed in claim 1, further comprising the steps of:
    searching for a control attribute of a user interface control element in the document object model; and
    calling control attribute instructions associated with the control attribute.

6. The method as claimed in claim 5, wherein the step of searching for the control attribute comprises the steps of:
    searching attributes of the user interface control element in the document object model; and
    determining whether the attribute has a name which follows a designated naming convention.

7. The method as claimed in claim 6, wherein the step of calling the control attribute instructions includes the steps of:
    determining if the name of the control attribute includes a designated prefix;
    generating a function name comprising the name of the control attribute;
    assigning an object associated with the control attribute as the parameter of the function name; and
    assigning the control attribute instructions of the designated attribute as steps for a function having the function name to perform.

8. The method as claimed in claim 1, further comprising the steps of:
    adding a behavior element as a child of a user interface control element;
    receiving an event which is equal to an event attribute setting in the behavior element; and
    calling behavior element instructions associated with the behavior element.

9. A system for controlling user interface features of a web application, the system comprising:
    a collection of user interface control elements including a user interface control element associated with a user interface control identified in the web application, the user interface control comprising a name element for associating the user interface control of the web application with the user interface control element of the collection of user interface control elements, the web application described in a presentation markup language that has been extended to include the collection of user interface control elements to create an extended presentation markup language, each of the user interface control elements of the collection comprising:
        a namespace for associating the user interface control element with the user interface control of the web application, the namespace including a prefix for identifying the user interface control of the web application associated with the user interface control element as part of the extended presentation markup language and having names following a predetermined naming convention and allowing a parser to identify them as part of a document object model (DOM) of the web application; and
        a set of core attributes common to all of the user interface control elements in the collection of user interface control elements;
    a collection of skin templates, each of the skin templates associated with one of the user interface control elements through one of the core attributes of the user interface control elements, each of the skin templates describing how to display the user interface control element associated with the skin template, each of the skin templates described in the presentation markup language;
    the parser for parsing the web application described in the extended presentation markup language, the parser parsing the user interface control of the web application associated with the user interface control element into the DOM of the web application;
    a viewer for rendering the DOM of the web application described in the extended presentation markup language, including rendering the user interface control of the web application based on at least one of the skin templates associated with the user interface control elements, the viewer comprising a collection of user interface control instructions, each of the user interface control instructions associated with respective user interface control elements through a control function name, each of the control function names based on the namespace of the associated user interface control element, each of the user interface control instructions defining the behavior of the user interface control element to control user interface features of the web application; and an initialization function associated with the viewer for directing the processing of one or more control elements in the DOM of the web application, the initialization function comprising instructions for:

traversing each node in the DOM of the web application searching for a node identified by the prefix of the namespace associated with the user interface control elements;

generating a function name based on the namespace of the user interface control element of the identified node, the function name generated following a predetermined naming convention comprising adding the prefix to a unique name associated with the user interface control element of the identified node, the generated function name corresponding to one of the control function names;

calling a predetermined set of user interface control instructions associated with the located user interface control element using the generated function name, the predetermined set of user interface control instructions defining the behavior of the located user interface control element and comprising a first portion relating uniquely to the located user interface control element, a second portion commonly relating to multiple user interface control elements, and an attribute relating to a predetermined skin template of the collection of skin templates for the user interface control; and causing the viewer to render the DOM of the web application described in the extended presentation markup language, including rendering the located user interface control of the web application based on at least the predetermined set of user interface control elements.

10. The system as claimed in claim 9, wherein the skin template is associated with the user interface control element by a reference attribute that comprises a reference to a location of a skin template file comprising the collection of presentation markup language describing the user interface control element.

11. The system as claimed in claim 9, wherein the user interface control element is associated with an extensible markup language (XML) based element.

12. The system as claimed in claim 11, wherein the user interface control element is a parent of an extensible markup language based element.

13. The system as claimed in claim 11, wherein the user interface control element is a child of an extensible markup language based element.

14. The system as claimed in claim 9, further comprising:

a collection of control attributes for adding to the core attributes, the control attributes following the predetermined naming convention; and a collection of control attribute instructions for performing actions associated with the collection of control attributes, each instruction associated with a control attribute.

15. The system as claimed in claim 14, wherein the initialization function contains instructions for traversing each node in the document object model and for searching and calling functions associated with the user interface control elements and the control attributes having names following the predetermined naming convention.

16. The system as claimed in claim 9, wherein the core attributes comprise state attributes for specifying the identification of a <state> child element of the user interface control element.

17. The system as claimed in claim 9, wherein the core attributes comprise one or more of:

an identification attribute for referencing the control element;

a label attribute for associating text control;

an x attribute for specifying the x-coordinate of the left edge of the control element;

a y attribute for specifying the y-coordinate of the top edge of the control element;

a width attribute for specifying the width of the control element;

a height attribute for specifying the height of the control element;

a preserve aspect ratio attribute for preserving the aspect ratio of the control element when either the width attribute or height attribute is known;

a label X attribute for specifying the x-coordinate of the left edge of the label, relative to the y attribute;

a label Y attribute for specifying the y-coordinate of the bottom edge of the label, relative to the x attribute;

a disabled attribute for specifying whether the control element is disabled and cannot be used;

a state hover attribute for specifying the identification of a <state> child element of the control element, the state hover attribute used to override the appearance of a hover state as defined in a skin of the control element;

a state focus attribute for specifying the identification of a<state> child element of the control element, the state focus attribute used to override the appearance of a focus state as defined in a skin of the control element;

a state up attribute for specifying the identification of a <state> child element of the control element, the state up attribute used to override the appearance of an up state as defined in a skin of the control element;

a state down attribute for specifying the identification of a <state> child element of the control element, the state down attribute used to override the appearance of a down state as defined in a skin of the control element;

a state hit attribute for specifying the identification of a <state> child element of the control element, the state hit attribute used to override the appearance of a hit state as defined in a skin of the control element;

a state disabled up attribute for specifying the identification of a <state> child element of the control element, the state disabled up attribute used to override the appearance of a disabled up state as defined in the skin of the control element; and a state disabled down attribute for specifying the identification of a <state> child element of the control element, the state disabled down attribute used to override the appearance of a disabled down state as defined in a skin of the control element.

18. The system as claimed in claim 17, wherein the collection of user interface control elements comprises one or more of:
- a dsvg:button control element for defining a control that is clicked to trigger an action, the dsvg:button control element comprising control attributes including:
  - a toggle attribute for specifying whether the button is a toggle or a sticky button;
  - a group attribute for specifying the name of a group to which the button control element belongs; and
  - a checked attribute for specifying whether the button control element is down/checked or up/unchecked;
- a dsvg:comboBox control element for defining a control that is clicked to trigger an action, the dsvg:comboBox control element comprising control attributes including:
  - a dropdown attribute for specifying whether the comboBox control element has a dropdown list;
  - an editable attribute for specifying whether the comboBox control element is editable;
  - a value attribute for specifying the value of the label attribute of a currently selected item;
  - a name attribute for specifying the value of a name attribute of a currently selected item; and
  - a selected identification attribute for specifying the value of the identification attribute of a currently selected item;
- a dsvg:listBox control element for defining a control that is clicked to trigger an action, the dsvg:listBox control element comprising control attributes including:
  - a multi select attribute for specifying whether more than one item can be selected;
  - an editable attribute for specifying whether the listBox control element is editable;
  - a value attribute for specifying the value of the label attribute of a currently selected item;
  - a name attribute for specifying the value of a name attribute of a currently selected item; and
  - a selected identification attribute for specifying the value of the identification attribute of a currently selected item;
- a dsvg:listView control element for defining a control that is clicked to trigger an action, the dsvg:listView control element comprising control attributes including:
  - a multi select attribute for specifying whether more than one item can be selected;
  - an editable attribute for specifying whether the comboBox control element is editable;
  - a display attribute for specifying a semicolon-delimited list of the names of the attributes in all of the <item> children of a control element;
  - an anything attribute for specifying an attribute name in which to store data; and
  - a selected identification attribute for specifying the value of the identification attribute of a currently selected item;
- a dsvg:contextMenu control element for defining a control that is clicked to trigger an action, the dsvg:contextMenu control element comprising control attributes including:
  - an event source attribute for specifying the identification of an element that triggered the contextMenu control element to appear;
  - a value attribute for specifying the value of the label attribute of currently selected item;
  - a name attribute for specifying the value of a name attribute of a currently selected item; and
  - a selected identification attribute for specifying the value of the identification attribute of a currently selected item;
- a dsvg:item control element for defining a control that is clicked to trigger an action, the dsvg:item control element comprising control attributes including:
  - an access key attribute for specifying a shortcut key which, when pressed, selects this item; and
  - an anything attribute for specifying an attribute name in which to store data;
- a dsvg:textbox control element for defining a control that is clicked to trigger an action, the dsvg:textbox control element comprising control attributes including:
  - a value attribute for specifying default text within the textbox control element;
  - a num lines attribute for specifying a number of lines allowed in the textbox control element;
  - a max length attribute for specifying a maximum number of characters allowed in the textbox control element;
  - a wrap attribute for specifying whether to auto-wrap text;
  - a read only attribute for specifying if the textbox control element is non-editable;
  - a secret attribute for specifying whether text is secret;
  - a data type attribute for specifying a type of data that is allowed to be entered;
  - a mask attribute for specifying a pattern that allows extra characters to be inserted into data as it is entered and for only allowing specific characters in specific locations; and
  - a case attribute for specifying the case of data entered into the textbox control element;
- a dsvg:slider control element for defining a control that is clicked to trigger an action, the dsvg: slider control element comprising control attributes including:
  - a min attribute for specifying a minimum value of the slider control element;
  - a max attribute for specifying a maximum value of the slider control element;
  - a min position attribute for specifying a minimum allowed value of a thumb;
  - a max position attribute for specifying a maximum allowed value of a thumb;
  - a value attribute for specifying an initial value of the slider control element;
  - an increment attribute for specifying allowed values that the slider control element can create;
  - a page increment attribute for specifying an amount that a thumb moves;
  - an orientation attribute for specifying a rotation angle of the slider control attribute;
  - a ticks major attribute for specifying an interval at which major tick marks are displayed; and
  - a ticks minor attribute for specifying an interval at which minor tick marks are displayed;
- a dsvg:scrollbar control element for defining a control that is clicked to trigger an action, the dsvg:scrollbar control element comprising control attributes including:
  - a bars attribute for specifying the appearance of a horizontal scrollbar or a vertical scrollbar; and
- a dsvg:spin control element for defining a control that is clicked to trigger an action, the dsvg: spin control element comprising control attributes including:
  - a min attribute for specifying a minimum value of the spin control element;

a max attribute for specifying a maximum value of the spin control element;
a value attribute for specifying an initial value of the spin control element; and
an increment attribute for specifying allowed values that the spin control element can create.

* * * * *